(12) United States Patent
Freeman

(10) Patent No.: US 10,482,439 B2
(45) Date of Patent: Nov. 19, 2019

(54) KEY DUPLICATION SYSTEM

(71) Applicant: The Hillman Group, Inc., Cincinnati, OH (US)

(72) Inventor: Daniel Freeman, Calabasas, CA (US)

(73) Assignee: The Hillman Group, Inc., Cincinnati, OH (US)

( * ) Notice: Subject to any disclaimer, the term of this patent is extended or adjusted under 35 U.S.C. 154(b) by 41 days.

(21) Appl. No.: 15/885,366

(22) Filed: Jan. 31, 2018

(65) Prior Publication Data
US 2018/0154459 A1   Jun. 7, 2018

Related U.S. Application Data

(63) Continuation of application No. 13/964,017, filed on Aug. 9, 2013, now abandoned, which is a
(Continued)

(51) Int. Cl.
*G06Q 20/18* (2012.01)
*B23C 3/35* (2006.01)
(Continued)

(52) U.S. Cl.
CPC .............. *G06Q 20/18* (2013.01); *B23C 3/35* (2013.01); *B23P 15/005* (2013.01); *B23Q 35/00* (2013.01);
(Continued)

(58) Field of Classification Search
CPC ... B23C 3/35; B23C 2235/12; B23C 2235/28; B23P 15/005; B23Q 35/00; G05B 15/02;
(Continued)

(56) References Cited

U.S. PATENT DOCUMENTS

| 1,461,171 A | 7/1923 | Barnes |
| 1,752,468 A | 4/1930 | Stull |
| (Continued) | | |

FOREIGN PATENT DOCUMENTS

| EA | 200801858 | 12/2008 |
| ES | 2017240 | 1/1991 |
| (Continued) | | |

OTHER PUBLICATIONS

Office Action dated Mar. 10, 2017 in U.S. Appl. No. 15/191,071, filed Jun. 23, 2016.
(Continued)

*Primary Examiner* — Crystal J Barnes-Bullock
(74) *Attorney, Agent, or Firm* — Finnegan, Henderson, Farabow, Garrett & Dunner LLP

(57) ABSTRACT

A key-duplicating system comprises a network that includes a multiplicity of kiosks at a multiplicity of different locations, each of the kiosks having a customer interface and a processor coupled to the customer interface. A remote central server coupled to the kiosks is adapted to receive, from the kiosks, information identifying master keys to be duplicated. A key analysis module uses the information identifying master keys to be duplicated to derive information required to produce duplicates of the identified master keys, and a key duplicating module uses that information to produce duplicates of said identified master keys.

14 Claims, 61 Drawing Sheets

Related U.S. Application Data continuation-in-part of application No. 13/155,994, filed on Jun. 8, 2011, now Pat. No. 8,634,951, which is a continuation-in-part of application No. 13/153,065, filed on Jun. 3, 2011, now Pat. No. 8,979,446.

(60) Provisional application No. 61/351,046, filed on Jun. 3, 2010.

(51) Int. Cl.
  *B23P 15/00* (2006.01)
  *B23Q 35/00* (2006.01)
  *G05B 15/02* (2006.01)
  *G07F 11/70* (2006.01)

(52) U.S. Cl.
  CPC .............. *G05B 15/02* (2013.01); *G07F 11/70* (2013.01); *B23C 2235/12* (2013.01); *B23C 2235/28* (2013.01); *Y10T 409/300952* (2015.01); *Y10T 409/301624* (2015.01)

(58) Field of Classification Search
  CPC .......... G06Q 20/18; Y10T 409/300952; Y10T 409/301624
  See application file for complete search history.

(56) References Cited

U.S. PATENT DOCUMENTS

| | | |
|---|---|---|
| 2,038,949 A | 4/1936 | Mintz |
| 2,148,667 A | 2/1939 | Yoskowitz |
| 2,266,864 A | 12/1941 | Hausknecht |
| 2,398,659 A | 4/1946 | Mead |
| 2,582,012 A | 1/1952 | Currier |
| 2,809,566 A | 10/1957 | Orchard |
| 3,116,665 A | 1/1964 | Reisner |
| 3,245,149 A | 4/1966 | Haggstrom |
| 3,323,420 A | 6/1967 | Roxburgh |
| 3,358,561 A | 12/1967 | Roxburgh et al. |
| 3,442,174 A | 5/1969 | Weiner et al. |
| 3,625,111 A | 12/1971 | Carlo et al. |
| 3,675,536 A | 7/1972 | Hungerford et al. |
| 3,792,639 A | 2/1974 | Richens et al. |
| 3,796,130 A | 3/1974 | Garnter |
| 3,810,416 A | 5/1974 | Nelms, Jr. |
| 3,865,011 A | 2/1975 | Patriguin |
| 3,870,136 A | 3/1975 | Voegeli |
| 3,880,321 A | 4/1975 | Braginetz |
| 3,884,330 A | 5/1975 | Chalabian |
| 3,956,968 A | 5/1976 | Crasnianski |
| 3,958,081 A | 5/1976 | Ehrsam et al. |
| 3,962,539 A | 6/1976 | Ehrsam et al. |
| 3,978,764 A | 9/1976 | Patriquin |
| 4,012,991 A | 3/1977 | Uyeda |
| 4,051,748 A | 10/1977 | Sherman |
| 4,090,303 A | 5/1978 | Uyeda |
| 4,092,806 A | 6/1978 | Wich |
| 4,117,763 A | 10/1978 | Uyecia |
| 4,203,693 A | 5/1980 | Schwartz et al. |
| 4,338,849 A | 7/1982 | Turner |
| 4,423,655 A | 1/1984 | Turner |
| 4,426,179 A | 1/1984 | Jefferson |
| 4,614,465 A | 9/1986 | Wu |
| 4,646,590 A | 3/1987 | Jones |
| 4,663,721 A | 5/1987 | Herscovici |
| 4,666,351 A | 5/1987 | Marchal |
| 4,780,032 A | 10/1988 | Uyeda et al. |
| 4,878,630 A | 11/1989 | Schmid |
| 4,898,504 A | 2/1990 | Agius et al. |
| 4,899,391 A | 2/1990 | Cimino et al. |
| 4,929,129 A | 5/1990 | Dickson |
| 4,937,623 A | 6/1990 | Nishimori et al. |
| 4,969,782 A | 11/1990 | Castain |
| 5,122,018 A | 6/1992 | Zion |
| 5,127,532 A | 7/1992 | Cimino et al. |
| 5,128,531 A | 7/1992 | Fadel |
| 5,133,127 A | 7/1992 | Bush |
| 5,144,452 A | 9/1992 | Abuyama |
| 5,167,171 A | 12/1992 | Heredia |
| 5,171,112 A | 12/1992 | Roland |
| 5,201,048 A | 4/1993 | Coulter et al. |
| 5,259,708 A | 11/1993 | Brice |
| 5,271,698 A | 12/1993 | Heredia et al. |
| 5,314,274 A | 5/1994 | Heredia et al. |
| 5,331,474 A | 7/1994 | Lee |
| 5,351,409 A | 10/1994 | Heredia |
| 5,441,369 A | 8/1995 | Foscan et al. |
| 5,443,339 A | 8/1995 | Heredia et al. |
| 5,493,880 A | 2/1996 | Jang |
| 5,496,138 A | 3/1996 | Drori |
| 5,538,374 A | 7/1996 | Cole et al. |
| 5,556,240 A | 9/1996 | Almblad |
| 5,569,003 A | 10/1996 | Goldman et al. |
| 5,607,267 A | 3/1997 | Heredia et al. |
| 5,627,549 A | 5/1997 | Park |
| 5,660,509 A | 8/1997 | Cole et al. |
| 5,676,504 A | 10/1997 | Mueller et al. |
| 5,807,042 A | 9/1998 | Almblad et al. |
| 5,833,406 A | 11/1998 | Chies et al. |
| 5,906,365 A | 5/1999 | Wu |
| 5,908,273 A | 6/1999 | Titus et al. |
| 5,951,218 A | 9/1999 | Wu |
| 5,964,554 A | 10/1999 | Drori |
| 5,997,224 A | 12/1999 | Beauregard et al. |
| 6,064,747 A | 5/2000 | Wills et al. |
| 6,065,911 A | 5/2000 | Almblad et al. |
| 6,152,662 A | 11/2000 | Titus et al. |
| 6,185,311 B1 | 2/2001 | Yanovsky et al. |
| 6,406,227 B1 | 6/2002 | Titus et al. |
| 6,449,381 B1 | 9/2002 | Yanovsky et al. |
| 6,543,972 B1 | 4/2003 | Cimino |
| 6,588,995 B2 | 7/2003 | Will et al. |
| 6,595,045 B1 | 7/2003 | Fuglewicz et al. |
| 6,602,030 B1 | 8/2003 | Markbreit |
| 6,606,602 B1 | 8/2003 | Kolls |
| 6,641,339 B2 | 11/2003 | Chies et al. |
| 6,647,300 B1 | 11/2003 | Prejean |
| 6,782,725 B2 | 8/2004 | Linares |
| 6,839,449 B1 | 1/2005 | Campbell et al. |
| 6,895,100 B1 | 5/2005 | Pacenzia et al. |
| 7,114,894 B2 | 10/2006 | Mueller et al. |
| 7,218,991 B2 | 5/2007 | Walker et al. |
| 7,331,521 B2 | 2/2008 | Sorenson et al. |
| 7,346,562 B2 | 3/2008 | Inoue |
| 7,890,878 B2 | 2/2011 | Bass et al. |
| 7,891,919 B2 | 2/2011 | Bass et al. |
| 7,894,935 B1 | 2/2011 | Hagen et al. |
| 8,287,215 B2 | 10/2012 | Freeman et al. |
| 8,532,809 B2 | 9/2013 | Freeman |
| 8,626,331 B2 | 1/2014 | Marsh et al. |
| 8,634,951 B2 | 1/2014 | Freeman |
| 8,682,468 B2 | 3/2014 | Marsh et al. |
| 8,688,579 B1 | 4/2014 | Ethington |
| 8,979,446 B2 | 3/2015 | Freeman |
| 9,199,318 B2 | 12/2015 | Freeman |
| 9,323,237 B2 * | 4/2016 | Freeman .................. B23C 3/35 |
| 9,515,997 B1 | 12/2016 | Westman |
| 9,808,900 B2 * | 11/2017 | Gardner ................. G01B 11/24 |
| 9,914,179 B2 * | 3/2018 | Freeman .................. B23C 3/35 |
| 9,987,715 B2 * | 6/2018 | Gardner ................. G01B 11/24 |
| 10,252,392 B2 * | 4/2019 | Gardner ................. B23Q 35/00 |
| 2002/0031251 A1 | 3/2002 | Campbell |
| 2003/0033054 A1 | 2/2003 | Yamazaki |
| 2004/0199426 A1 | 10/2004 | Prorock |
| 2005/0043011 A1 | 2/2005 | Murray et al. |
| 2005/0135891 A1 | 6/2005 | Ryai, Sr. et al. |
| 2006/0048553 A1 | 3/2006 | Almquist |
| 2007/0050266 A1 | 3/2007 | Barber et al. |
| 2007/0136125 A1 | 6/2007 | Godwin et al. |
| 2007/0224008 A1 | 9/2007 | Bass et al. |
| 2008/0145163 A1 | 6/2008 | Freeman et al. |
| 2009/0257091 A1 | 10/2009 | Shelton et al. |
| 2010/0057871 A1 | 3/2010 | Kaplan et al. |
| 2010/0138037 A1 | 6/2010 | Adelberg et al. |

(56) References Cited

U.S. PATENT DOCUMENTS

| | | | |
|---|---|---|---|
| 2011/0297691 A1 | 12/2011 | Freeman | |
| 2013/0138243 A1 | 5/2013 | Freeman | |
| 2013/0173044 A1 | 7/2013 | Marsh | |
| 2013/0294857 A1 | 11/2013 | Bass | |
| 2013/0297431 A1 | 11/2013 | Deubell | |
| 2013/0297670 A1 | 11/2013 | Lundberg | |
| 2013/0331976 A1* | 12/2013 | Freeman | G07F 11/70 700/117 |
| 2014/0064597 A1 | 3/2014 | Fagan | |
| 2014/0064598 A1 | 3/2014 | Fagan | |
| 2018/0207733 A1* | 7/2018 | Mutch | B23C 3/35 |

FOREIGN PATENT DOCUMENTS

| | | |
|---|---|---|
| JP | 4-502885 | 5/1992 |
| JP | 9-216112 | 8/1997 |
| RU | 82904 | 5/2009 |
| RU | 87030 | 9/2009 |
| WO | 9505609 | 2/1995 |
| WO | 199948065 | 9/1999 |
| WO | 199950801 | 10/1999 |
| WO | 2004012893 | 2/2004 |
| WO | 2008066857 | 6/2008 |

OTHER PUBLICATIONS

Office Action dated Feb. 23, 2017 in U.S. Appl. No. 14/920,060, filed Oct. 22, 2015.

Final Rejection dated Aug. 24, 2015 in U.S. Appl. No. 13/961,519, filed Aug. 7, 2013.

Office Action dated Feb. 10, 2015 in U.S. Appl. No. 13/961,519, filed Aug. 27, 2013.

Office Action dated Oct. 1, 2014 in U.S. Appl. No. 13/153,065, filed Jun. 3, 2011.

2nd Examination Report dated Sep. 5, 2014 in Australian Patent Appl. No. 2007325754.

Office Action dated Sep. 3, 2014 in Canadian Patent Appl. No. 2797774.

Office Action dated Jun. 13, 2014 in Canadian Patent Appl. No. 2801424.

Examination Report dated May 17, 2014 in Australian Patent Appl. No. 2011261228.

The Hillman Group, Inc. v. Minute Key Inc., Case No. 1:13-cv-00707, Dkt #55, filed Aug. Aug. 15, 2014 in the United States District Court for the Southern District of Ohio Western Division, "Order Granting Defendant's Motions to Dismiss (Doc. 40, 42): and Denying as Moot Plaintiff's Motion to File Amended Reply (Doc. 41)".

The Hillman Group, Inc. v. Minute Key Inc., Case No. 1:13-cv-00707, "Hillman's Invalidity Contentions" dated Jul. 7, 2014, to Dismiss (Doc. 40, 42): and Denying as Moot Plaintiff's Motion to File Amended Reply (Doc. 41).

The Hillman Group, Inc. v. Minute Key Inc., Case No. 1:13-cv-00707, "Hillman's Preliminary Claim Constructions and Identification of 35 U.S.C. § 112, ¶6 Corresponding Structures" dated Aug. 11, 2014.

The Hillman Group, Inc. v. Minute Key Inc., Case No. 1:13-cv-00707, "Hillman's Proposed Claim Terms for Construction and Identification of Claim Terms to be Governed by 35 U.S.C. § 112, ¶6" dated Jul. 21, 2014.

The Hillman Group, Inc. v. Minute Key Inc., Case No. 1:13-cv-707-SJD, "Minute Key Inc.'s Listing of Claim Terms for Construction" dated Jul. 21, 2014.

The Hillman Group, Inc. v. Minute Key Inc., Case No. 1.13-cv-707-SJD, "Minute Key Inc.'s Proposed Preliminary Claim Constructions" dated Aug. 22, 2014.

Cherkassky, Irene, "The e-volution of wireless vending", Beverage World, Feb. 15, 2000.

Kasavana, Michael, "Kiosk technology will give vending new capabilities", Automatic Merchandiser, Dec. 1, 2007.

Examination Report dated Aug. 5, 2013 in Australian Patent Appl. No. 2007325754.

Canadian Intellectual Property Office, Office Action dated Nov. 18, 2013 for Appl. No. 2801424, entitled "Fully Automatic Self-Service Key Duplicating Kiosk", 4 pages.

International Search Report dated Aug. 18, 2008 from Appl. No. PCT/US07/24522.

Written Opinion dated Aug. 18, 2008 from Appl No. PCT/US07/24522.

International Search Report dated Nov. 9, 2012 from Appl. No. PCT/US12/40656.

Written Opinion dated Nov. 9, 2012 from Appl. No. PCT/US12/40656.

International Search Report dated Nov. 29, 2011 from Appl. No. PCT/US11/39128.

Written Opinion dated Nov. 29, 2011 from Appl. No. PCT/US11/39128.

* cited by examiner

Thank you for your purchase!

| Item | Quantity | Ext |
|---|---|---|
| Key – Standard Key | 3 | $8.97 |
| Keychain – Bottle Opener | 0 | $0.00 |

Sub Total $ 8.97
Discount ($2.97)
Tax $ 0.53
Total $ 6.50

If you do not use email, but would like a receive a receipt via US Mail, Please call (800) 539-7571

[ Email Receipt ]

[ Start Over ]

FIG. 12

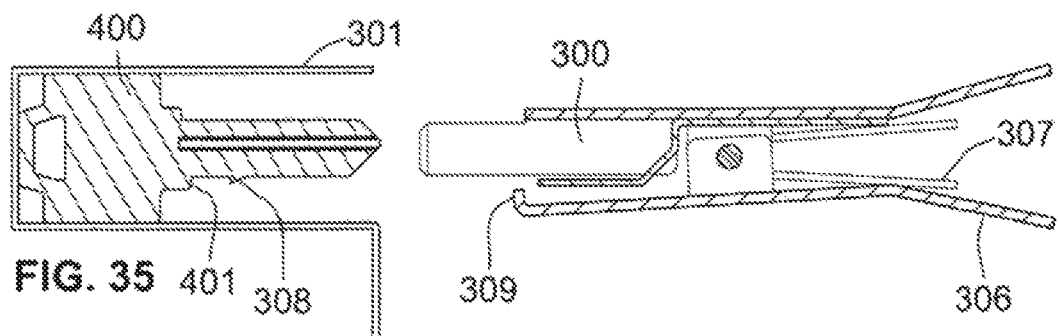
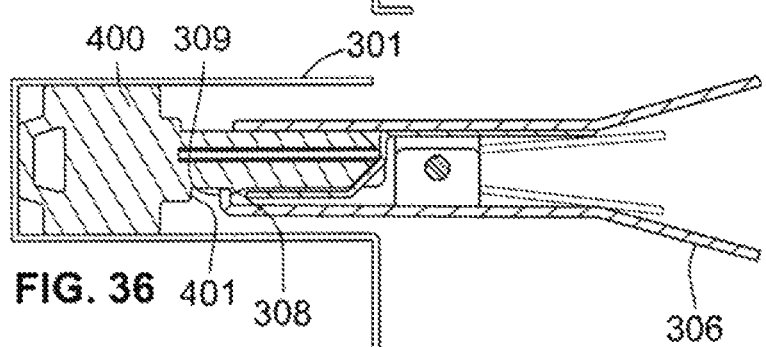
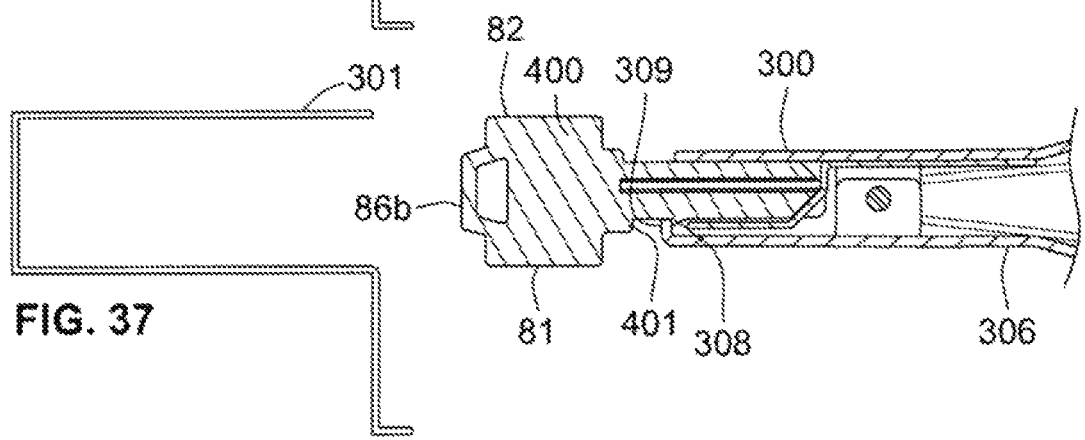
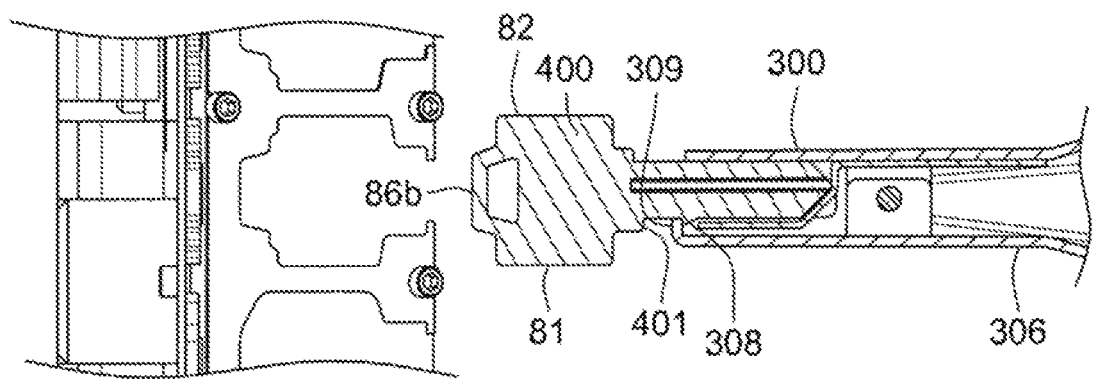

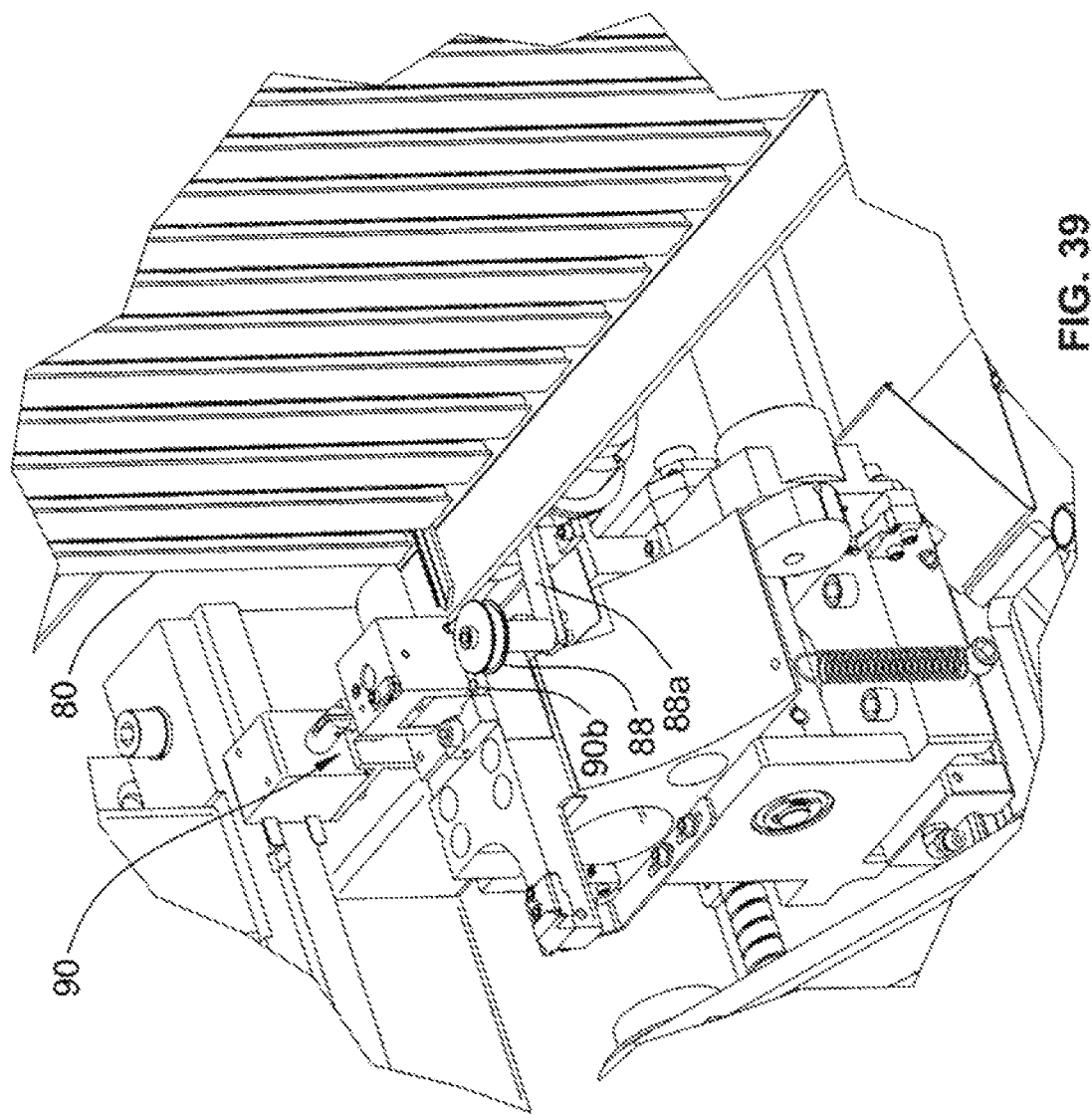

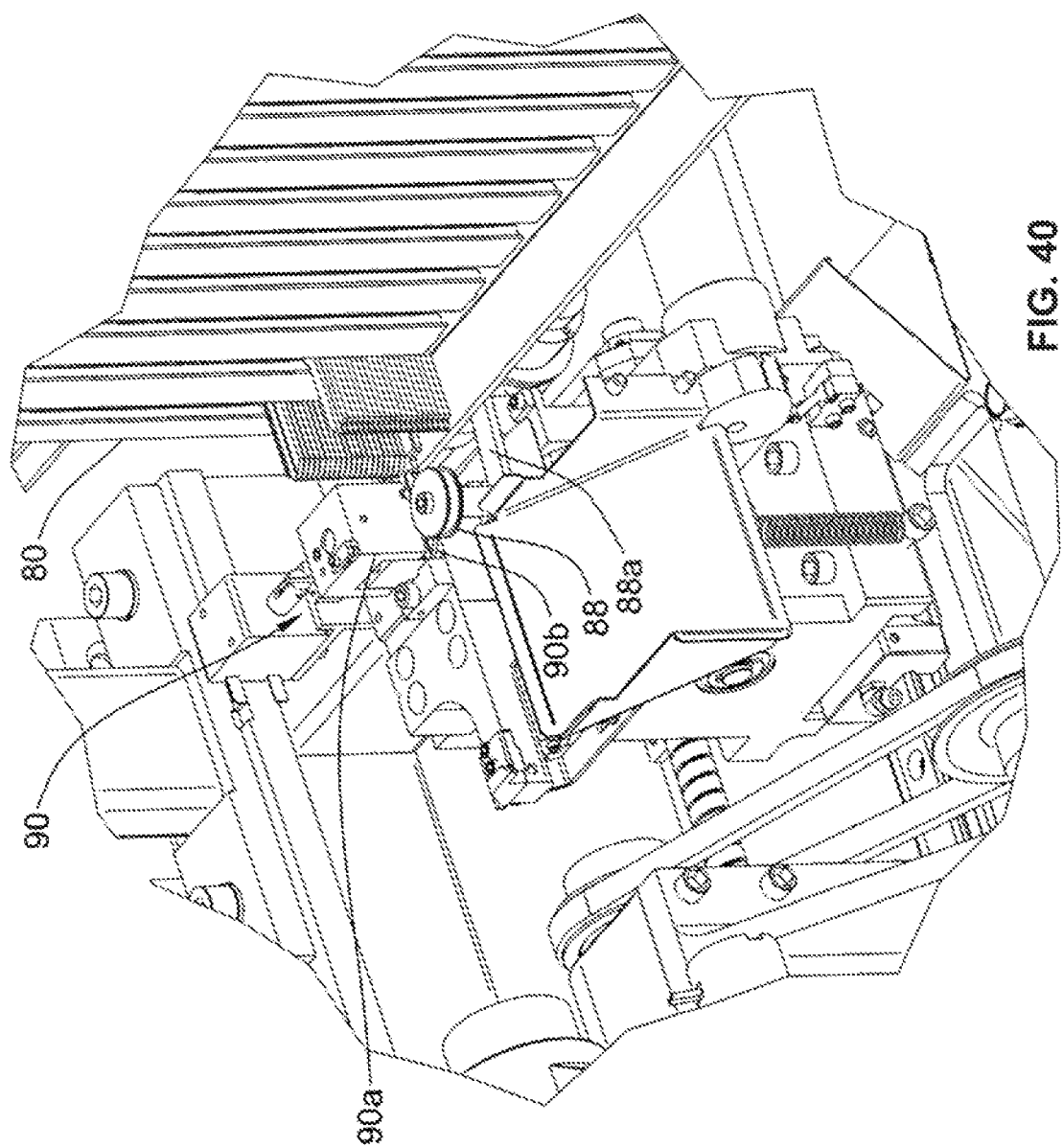

FIG. 62

KEY DUPLICATION SYSTEM

CROSS-REFERENCE TO RELATED APPLICATION

This is a continuation of U.S. patent application Ser. No. 13/964,017, filed on Aug. 9, 2013, which is a continuation-in-part of U.S. Pat. No. 8,634,951, filed Jun. 8, 2011, which is a continuation-in-part of U.S. Pat. No. 8,979,446, filed Jun. 3, 2011, which claims the benefit of U.S. Provisional Application Ser. No. 61/351,046 filed Jun. 3, 2010, all of which are incorporated herein by reference in their respective entireties.

TECHNICAL FIELD

The technology described herein is directed to the field of key duplication. More specifically, a key duplication system is provided that includes a network of kiosks and a remote central server that facilitates the purchase of duplicate keys by customers while at the same time facilitating management of the key manufacturing and distribution system.

BACKGROUND

Duplicate keys are typically cut from pre-existing master keys using a hand-operated table-top tool having two clamps, a cutting wheel, a follower and a cleaning wheel. There is a long-felt need for a fully automatic key identifying and/or duplicating machine that can provide a duplicate key for an ordinary consumer in a manner as easy as purchasing an item from a vending machine or receiving money from an automated teller machine.

SUMMARY

In accordance with one embodiment, a self-service, fully-automatic kiosk for duplicating keys includes a kiosk housing having a customer interface for receiving payment from a customer for the purchase of at least one duplicate of the customer's key. A key-receiving entry in the housing receives at least a portion of the customer's key to be duplicated, and a key analysis system within the housing analyzes the blade of a key inserted in the key-receiving entry to determine whether the inserted key matches one of a group of preselected key types and, if so, which preselected key type is matched. A key blank magazine within the housing stores key blanks for each of the preselected key types. A key blank extraction system extracts from the magazine a key blank for the preselected key type matched by the blade of the key inserted in the key-receiving entry. Then a key duplicating system within the kiosk replicates the tooth pattern of the blade of the key inserted in the key-receiving entry, on the blade of the extracted key blank. The kiosk includes a processor coupled to sensors and controllable devices within the kiosk and to a communications port for communicating with a remote central server. The processor is programmed to display multiple available manual commands in response to an input signal requesting such a display, and, in response to manual selection of the commands, to produce signals that energize and de-energize selected devices within the kiosk, thereby permitting remote manual control of the devices and mechanisms associated with those devices. The processor may also be programmed to control a video camera within the kiosk, in response to command signals received from the remote central server via the communications port, so that a remote operator can view the interior of the kiosk while manually controlling devices within the kiosk. The status of multiple devices within the kiosk may also be displayed by the processor in response to a signal from the remote computer.

BRIEF DESCRIPTION OF THE DRAWINGS

The invention will be better understood from the following description of preferred embodiments together with reference to the accompanying drawings, in which:

FIG. 12 is a screen shot of a "Thank You" screen in the display in the front wall of the kiosk of FIGS. 1 and 2.

FIG. 35 is a sectional view of a stack of key blanks contained in an opened box, with the tool shown in FIGS. 33 and 34 positioned adjacent the open end of the box.

FIG. 36 is the same sectional view shown in FIG. 35, with the tool engaging the stack of key blanks in the box.

FIG. 37 is the same sectional view shown in FIGS. 35 and 36, with the stack of key blanks removed from the box by the tool.

FIG. 38 is the same sectional view of the tool and the stack of key blanks shown in FIG. 37, but positioned adjacent the upper end of the key blank magazine.

FIG. 39 is an enlarged front perspective view of the bottom portion of the key-blank magazine, along with the key-blank clamping assembly and carrier, in the kiosk of FIGS. 1 and 2, with a single key blank being extracted from the magazine.

FIG. 40 is the same perspective view shown in FIG. 39 but with two stacks of key blanks in the magazine and showing the duplicate key discharge chute.

FIG. 62 is an first example of a Remote Management Tool display.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Key duplication requires analysis of the master key to determine the model and tooth pattern of the master key, and then reproducing that tooth pattern on a key blank of the same model as the master key.

Figure 1:
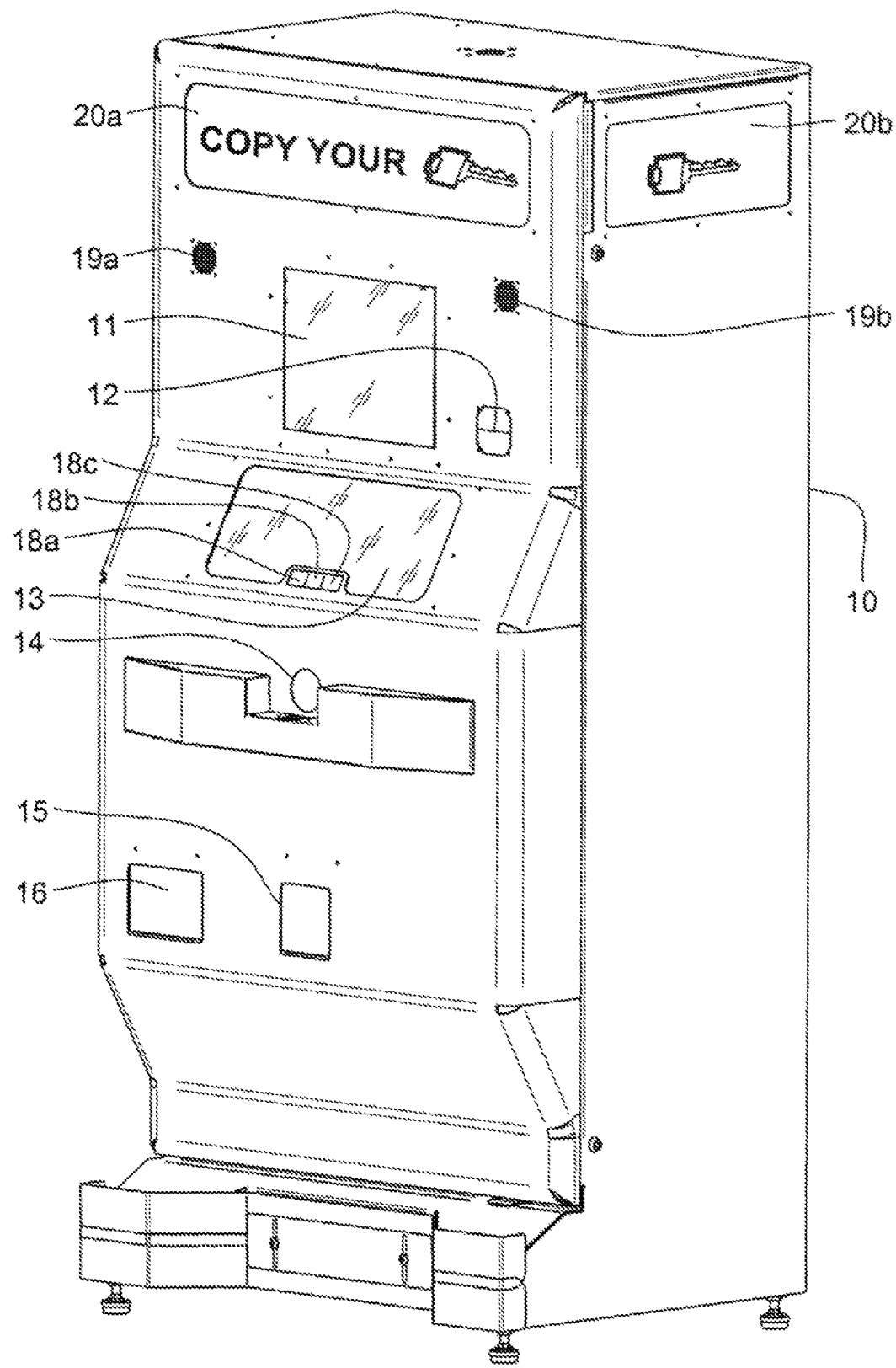
FIG. 1 is a front perspective of a key-duplicating kiosk.
Figure 2:
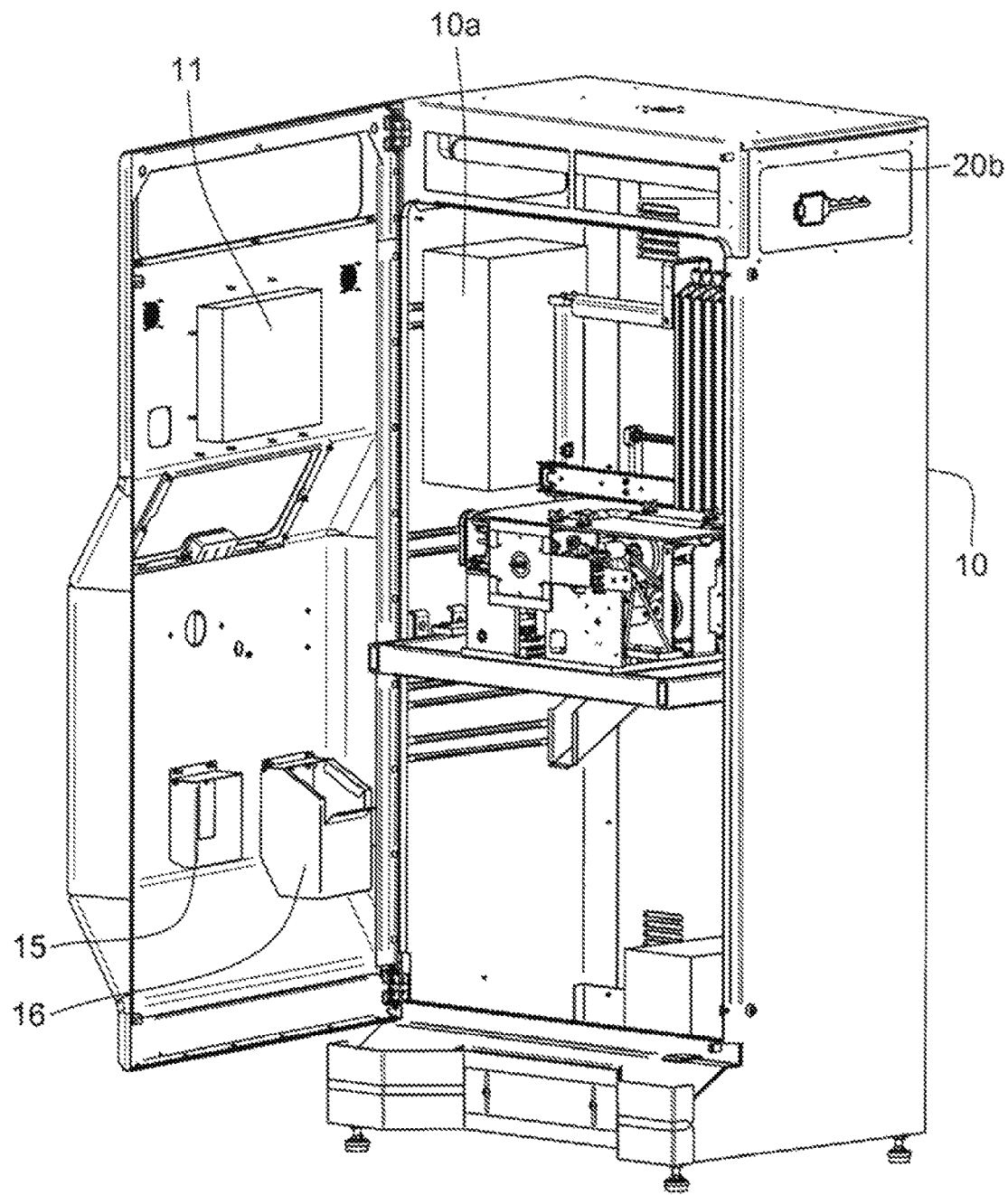
FIG. 2 is a front perspective of the same kiosk shown in FIG. 1 with the front panel opened to reveal the internal structure.

The exemplary key-duplicating kiosk shown in FIGS. 1 and 2 has a housing 10 that includes a touch-screen display 11, a payment device 12 such as a credit or debit card reader, a viewing window 13, a key-receiving entry 14 that includes a door 100 that opens to reveal a key insertion slot 104, a duplicate key discharge tray 15 and a keychain discharge tray 16. This kiosk enables a consumer to insert a master key into the slot 104 and have the master key automatically duplicated while the head of the key is always projecting from the kiosk, just as when a key is used in a door. At the base of the viewing window 13, three indicators lights 18a-18c are illuminated to inform the customer when to "Insert Key" (light 18a), "Key Accepted" (light 18b) or "Remove Key" (light 18c). The kiosk also includes a pair of speakers 19a and 19b and illuminated signs 20a and 20b to help attract customers to the kiosk. The interior of the kiosk is illuminated to facilitate viewing of the key duplicating operations through the viewing window 13.

The depth and width of the kiosk housing 10 are 25" and 34", respectively, so that the kiosk footprint is less than about 6 square feet, to minimize the floor space occupied by the kiosk in a retail store. This kiosk has the capacity of storing more than 3000 key blanks of different types and styles. For security and safety reasons, the kiosk is entirely self-contained except for an electrical power connection. Electronic communications with the processor inside the kiosk are preferably wireless. A locked door in the front of the housing 10 permits access by only authorized personnel for replenishing the supply of key blanks inside the kiosk, or for repair or maintenance purposes. Different access privileges may be provided for merchandisers (replenishment), maintenance, and removal of cash.

The touch-screen display 11 contains soft touch keys denoted by graphics on the underlying display and used to operate the kiosk 10. The touch screen preferably extends over the entire display 11 to allow customers to make displayed selections by touching the touch screen at appropriate touch keys. The display itself may take the form of a high resolution LCD, a plasma display, an LED or OLED display, a non-touch screen with selection buttons along the side, or any other type of display suitable for use in the kiosk 10.

The payment device 12 may include a bill acceptor for receiving paper currency, a coin acceptor, a change dispenser, a card reader, and/or a reader or sensor for other tangible portable credit storage devices that may also authorize access to and debit a central account, such as a cellular payment system which operates via text messages from customers' cell phones.

Figure 3:
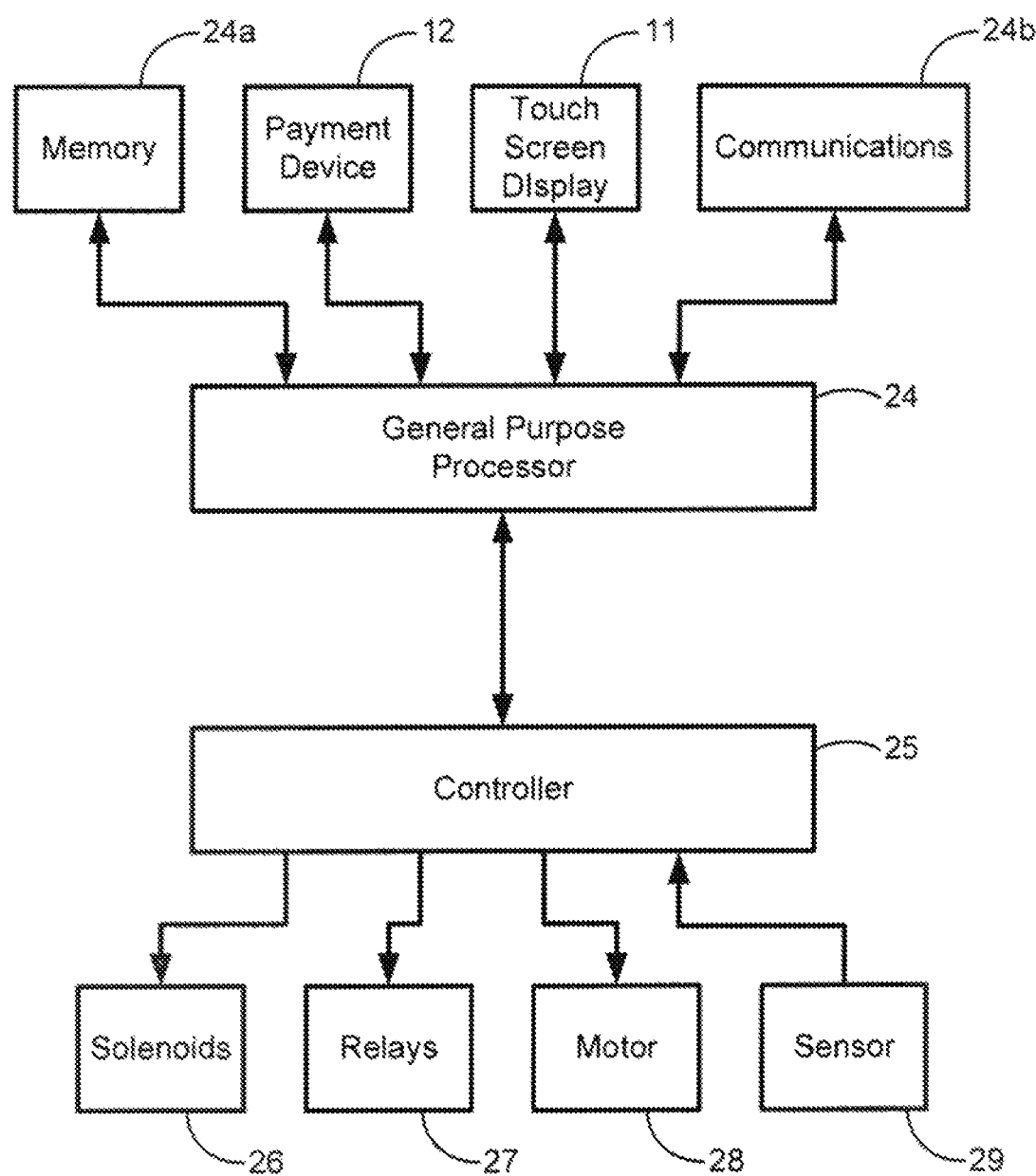
FIG. 3 is a functional block diagram of the electrical system in the kiosk of FIGS. 1 and 2.

Turning now to FIG. 3, the various components of the kiosk 10 are controlled by a general-purpose processor 24 (also referred to as a PC, central processing unit (CPU) or processor such as a microcontroller or microprocessor) contained within an electrical enclosure 10a inside the kiosk housing 10. It will be appreciated that the processor 24 may include one or more microprocessors, including but not limited to a master processor, a slave processor, and a secondary or parallel processor. The processor 24 communicates directly with a custom controller board 25 within the kiosk, as well as the payment device 12 and the touch screen display 11, and executes one or more programs stored in a computer readable storage medium or memory 24a to control the display 11, various mechanisms within the kiosk, and a communications interface 24b for communicating with remote servers and other devices. The system memory 24a may comprise a volatile memory (e.g., a random-access memory (RAM)) and a non-volatile memory (e.g., an EEPROM), and may include multiple RAM and multiple program memories. The payment device 12 signals the processor 24 when money and/or credits have been input via the payment device.

The processor 24 may include any combination of hardware, software, and/or firmware that may control the transfer of data between the kiosk and a bus, another computer, processor, or device and/or a service and/or a network. The communications interface 24b preferably couples the kiosk wirelessly to an external network, which is described in more detail below. The controller 25 receives signals from various sensors 29 within the kiosk, as described in more detail below, and generates control signals for solenoids 26, relays 27 and motors 28 within the kiosk, as also described below.

Figure 4:
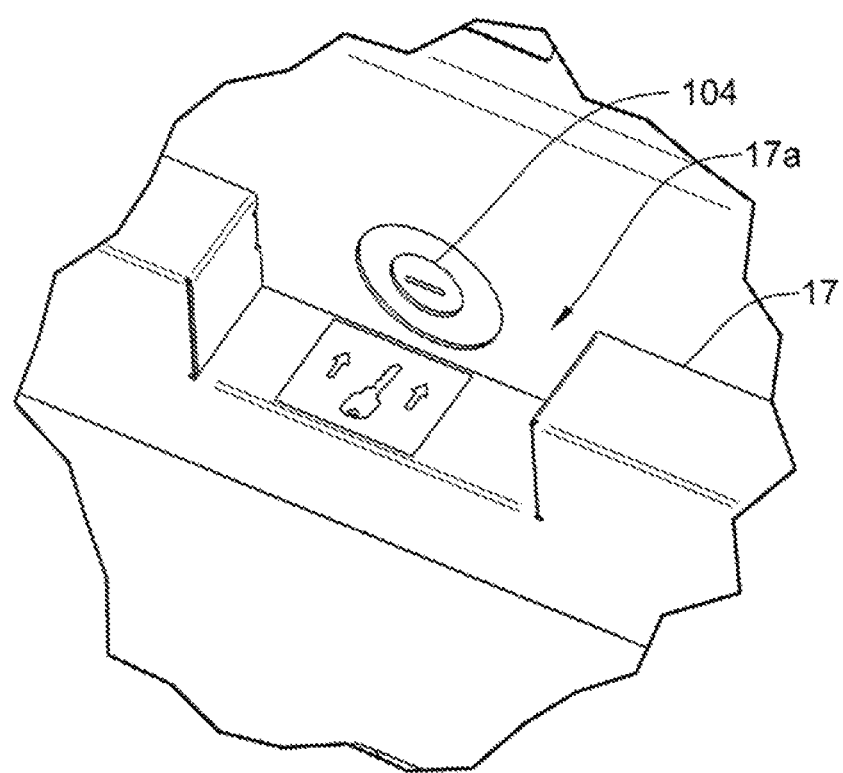
FIG. 4 is an enlarged perspective of the key entry in the front wall of the kiosk of FIGS. 1 and 2.

The key-receiving entry 14 is located in a central recess 17a of a guard 17 that protrudes from the front of the kiosk to protect the head of a key inserted in the kiosk from being bumped. The key entry area is the same height as a door lock, making the key insertion process easy and intuitive for a customer. When the customer inserts a key into the slot 104, only the blade portion of the key extends inside the kiosk, because the slot 104 is dimensioned to block the head portion of the key from entering the kiosk. This prevents the loss of a customer's key inside the kiosk, and also makes the customer comfortable because the head of the key is always visible to the customer while it is being analyzed and duplicated. Additionally, blocking the entry of the key head prevents the customer from inconveniently being forced to take the key off a keychain or remove identifiers from the key head to insert the key for analysis and duplication. As shown in FIG. 4, the base of the recess 17a includes graphics to help ensure that the customer inserts the key in the proper orientation for the receiving sensors and mechanism inside the kiosk, e.g., with the teeth on the key blade facing to the left. These graphics can be illuminated continuously or intermittently to attract the customer's attention, and may also be reinforced by audio instructions to the customer via the speakers 19a, 19b and video or graphic instructions via the display 11.

The mechanisms inside the kiosk cabinet 10 include the following mechanisms:
- a key blank magazine for storing key blanks of different types (e.g., Schlage, Kwikset, Weiser, etc.) and different styles (plain brass, colored flag pattern, colored flower pattern, etc.),
- a vandal-proof door opening, closing and latching mechanism for the key-entry door,
- devices for aligning an inserted master key clamping mechanism that holds the master key in a fixed, predetermined position while that key is being analyzed an duplicated,
- a key identification system that identifies the type of key blank needed to duplicate the master key on,
- a follower base for holding the key blank,
- a key blank extractor mechanism for loading and aligning the desired type and style of key blank from the key blank magazine into the blank clamp base, a key cutting mechanism for cutting the blade of the selected key blank to reproduce the tooth pattern of the master key, a de-burring mechanism for removing debris from the freshly cut duplicate key, and a vacuum system for managing the debris from the cutting and de-burring operations.

The processor 24 and the custom controller board 25 are programmed to carry out the following functions:

the processor controls audio outputs and the screens displayed to customers in response to actions taken by the customer and in response to signals produced by various sensors within the kiosk, the controller board controls the mechanisms within the kiosk in response to actions taken by the customer and in response to signals produced by various sensors within the kiosk, the processor collects and accumulates data regarding use of the kiosk, such as the number of duplicate keys made, the number of different types of key blanks remaining in the key-blank magazine in the kiosk, revenue generated by the kiosk by time and date, cumulative use time of parts that wear, etc., and errors that occur, and the processor communicates via the cell modem or other network connection method with one or more remote computers/servers to transmit reports, maintenance alarms, etc. to the remote computers/servers.

Figure 5:
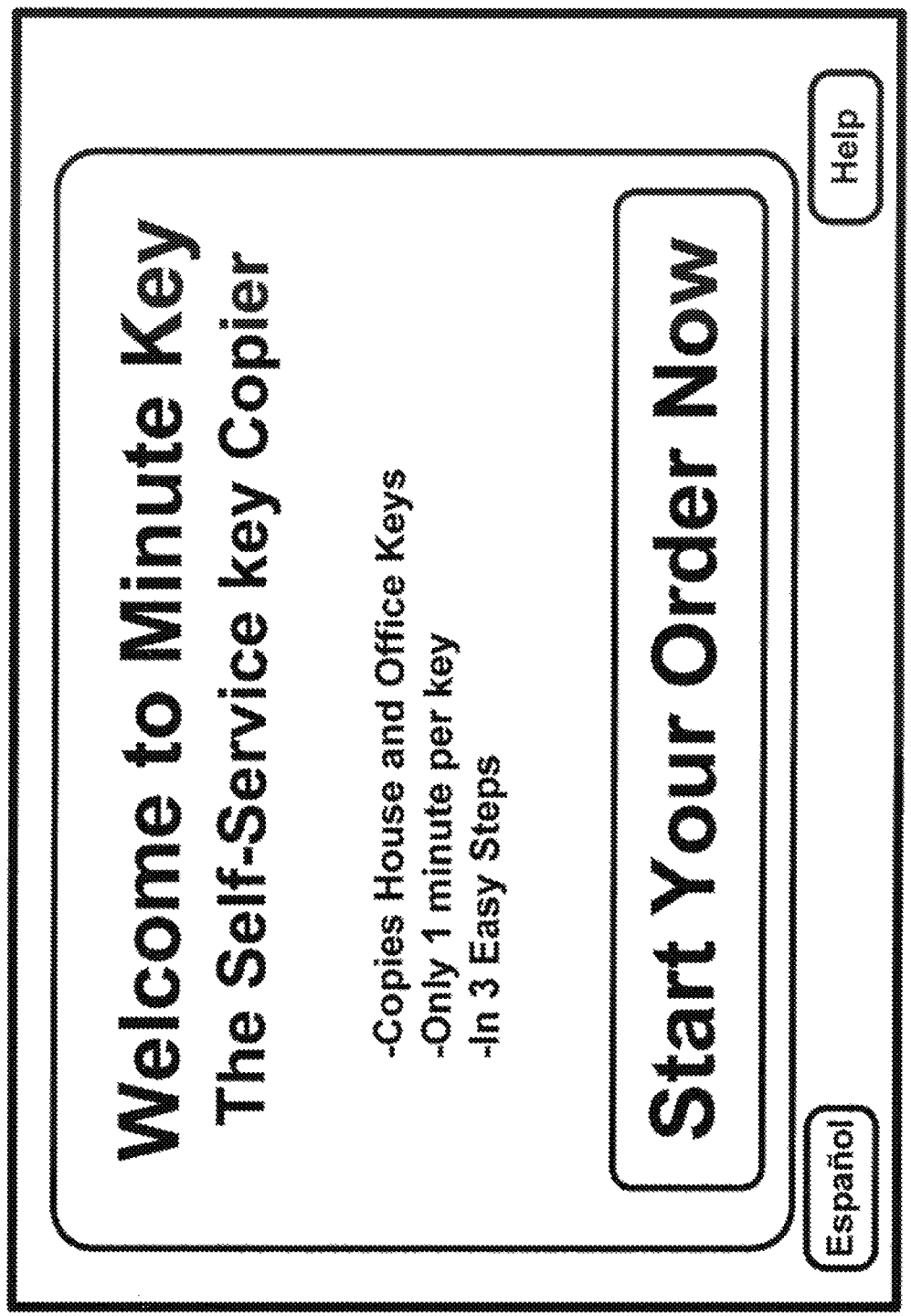
FIG. 5 is a screen shot of a "Welcome" screen in the display in the front wall of the kiosk of FIGS. 1 and 2.
Figure 6:
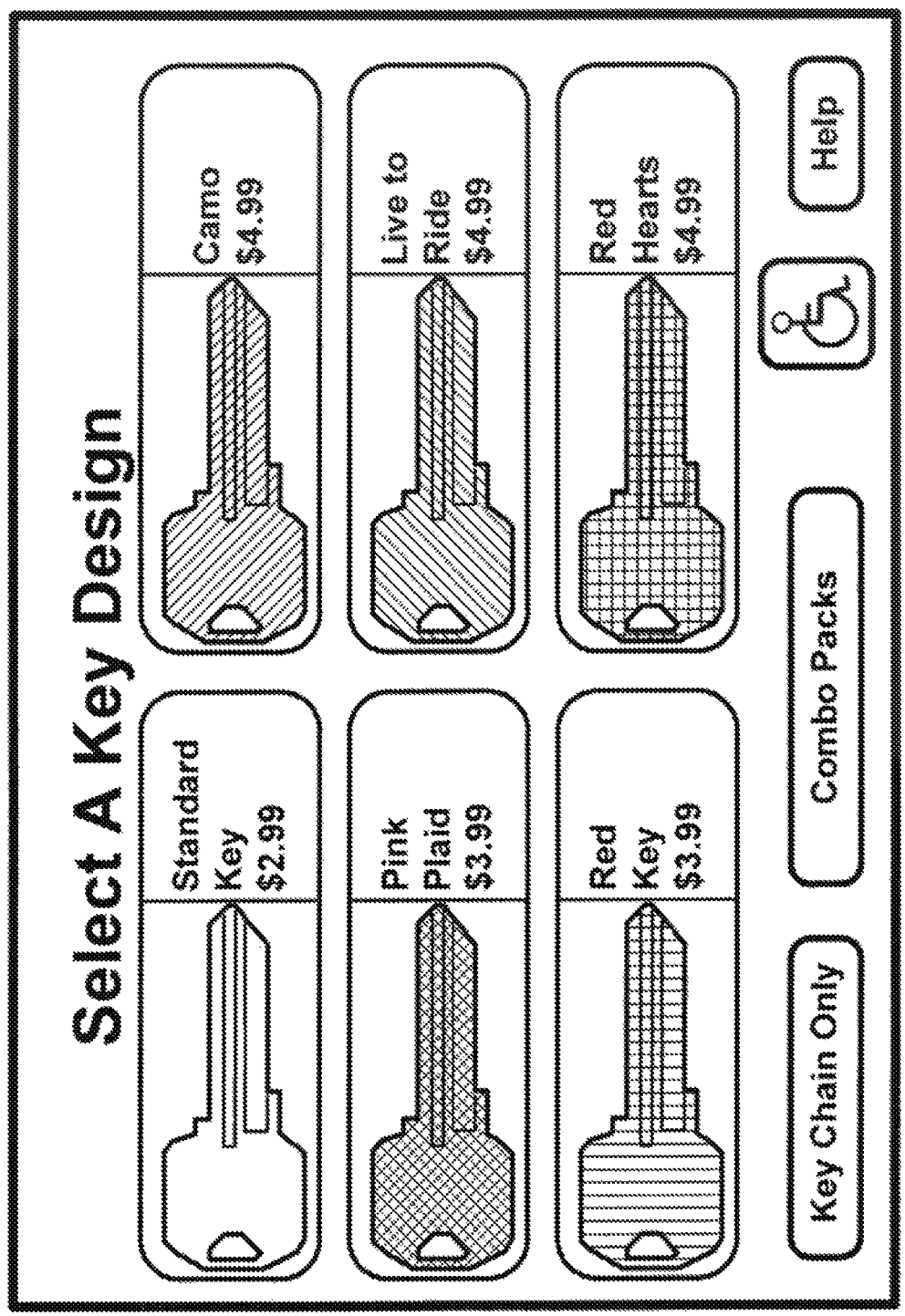
FIG. 6 is a screen shot of a "Select A Key Design" screen in the display in the front wall of the kiosk of FIGS. 1 and 2.

When the kiosk is not in use by a customer, the display 11 displays a promotion, such as "Buy 2, Get 1 Free", and a message that invites a customer to "Touch Here to Begin." The screen may also include advertising for a third party, which can be remotely managed and automatically adapted to the kiosk venue, time of day, individual customers and other factors. When a customer stands in front of the kiosk, a proximity detector (not shown) located on the front panel of the kiosk triggers the initiation of a voiceover or video demonstration on how to use the machine. When the customer touches the touch screen 11, the display changes to a welcome screen, shown in FIG. 5, that gives the customer an option to "Start Your Order Now" or select a "Help" or "Espanol" button. Selecting the "Help" button at any time displays an FAQ screen from which the customer can select a topic to obtain more information. Selecting the "Espanol" button displays the instructions in Spanish. The display may also give the customer multiple language options to choose from. Selection of the "Start Your Order Now" option changes the display to ask the customer to "Select a Key Design," as shown in FIG. 6. If the customer has difficulty reaching the options on the touch screen 11, touching a blue handicap icon at the bottom right corner of the screen changes the display to a screen that adds a numerical panel at the bottom of the screen and numbers the design choices, which facilitates selecting a key design from a wheelchair, for example. The heights of the blue handicap icon and the top of the numerical panel are preferably no more than 54 inches above the floor in front of the kiosk, to meet the requirements of ADA regulations in the U.S.

Figure 7:
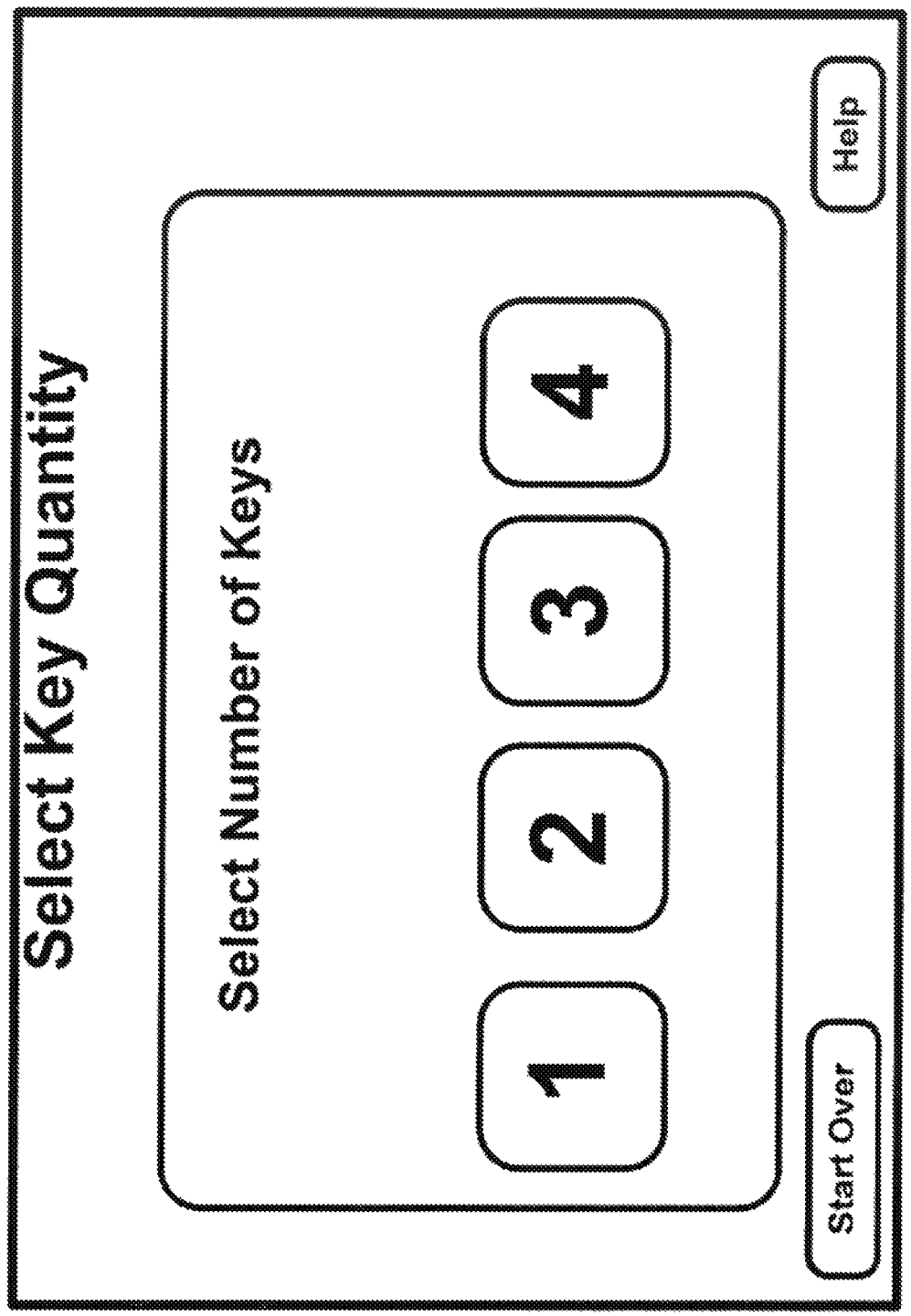
FIG. 7 is a screen shot of a "Select Key Quantity" screen in the display in the front wall of the kiosk of FIGS. 1 and 2.

The screen in FIG. 6 also includes a "Key Chain Only" option which, when touched, changes the display to a screen where the customer can select a particular style of keychain. Upon selection of a key style on the touch-screen display of FIG. 6, the display changes to the screen shown in FIG. 7, which asks the customer to select the number of keys to be purchased. This display also offers an option to "Start Over" to make any necessary changes. Promotions on keys, such as "Buy 2, Get 1 Free" or "Add Another Key at a Special Price" can also be made available to the customer on this screen, and the customer can select "Yes" or "No" to accept or reject the promotion, enter a code provided for a promotion, or swipe a retail membership or value card.

Figure 8:
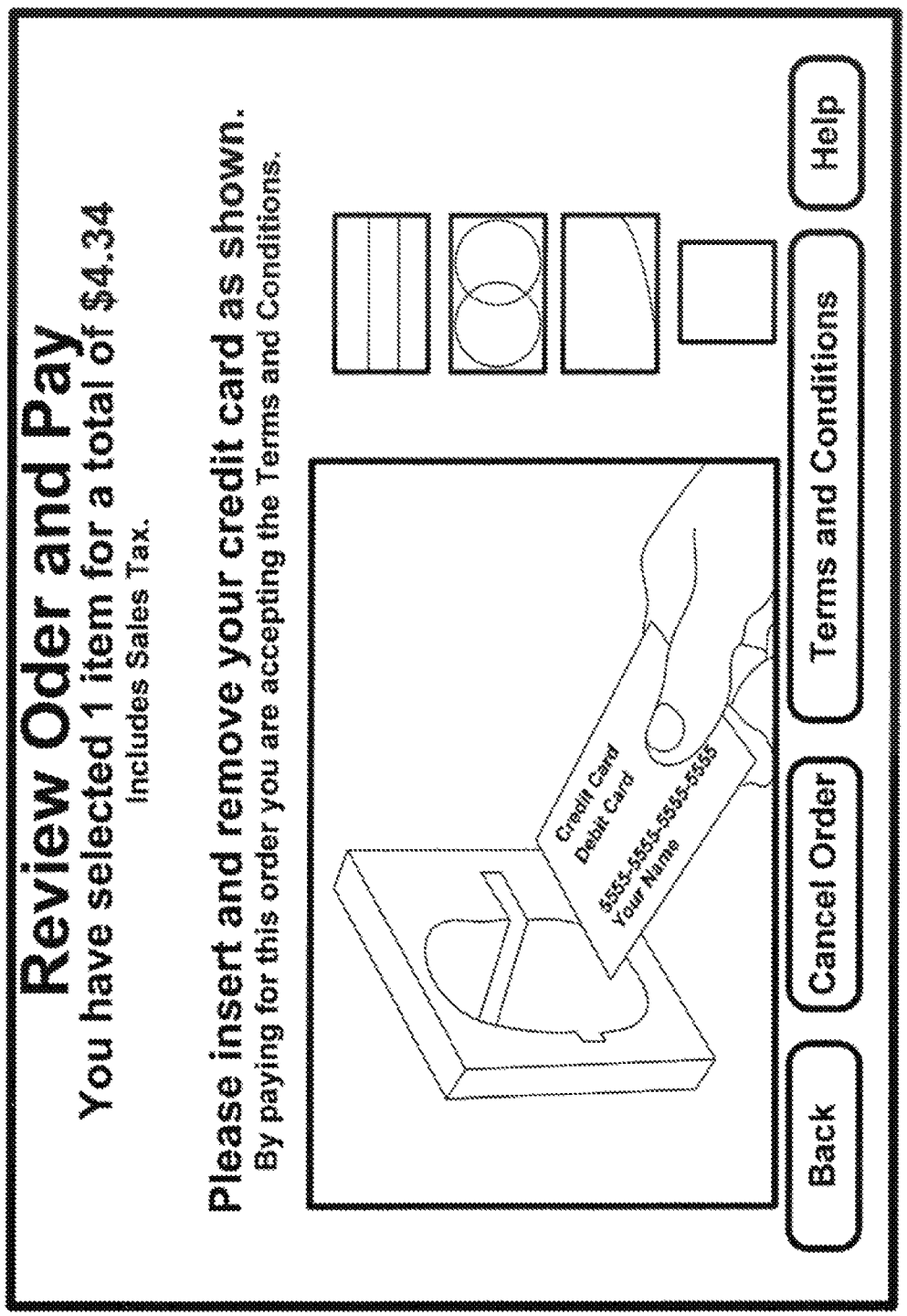
FIG. 8 is a screen shot of a "Review Order and Pay" screen in the display in the front wall of the kiosk of FIGS. 1 and 2.

When the desired quantity of duplicated keys has been selected, the display changes to the "Review Order and Pay" screen shown in FIG. 8, which gives the customer the option of selecting "Back" to make changes to the order, to go to "Help," to view the "Terms and Conditions" of the purchase, or to "Cancel Order." This screen also directs the customer to swipe a credit card through the card reader slot and illustrates how to insert the card and the types of credit cards that can be used. When a credit card is swiped through the card reader 12, the data from the credit card is automatically sent to the cell modem or other network connection for transmission to a remote server of a credit card provider for authorization of the given credit card, along with the amount of the customer's order plus a preselected additional amount to cover any additional options to be offered the customer, as discussed below, or a flat predetermined amount for any transaction by any customer. The remote credit card provider promptly returns a "yes" or "no" for the dollar amount of the customer's order to be charged to the swiped credit card.

If the response from the credit provider is a "no" (the selected credit card is not authorized for payment), the display may change to inform the customer that credit has been denied, inviting the customer to insert a different credit card. If no action is taken by the customer within a preselected time interval, the display asks "do you need more time," and if no action is taken, then the display is returned to the "Touch to Start" screen.

Figure 9:
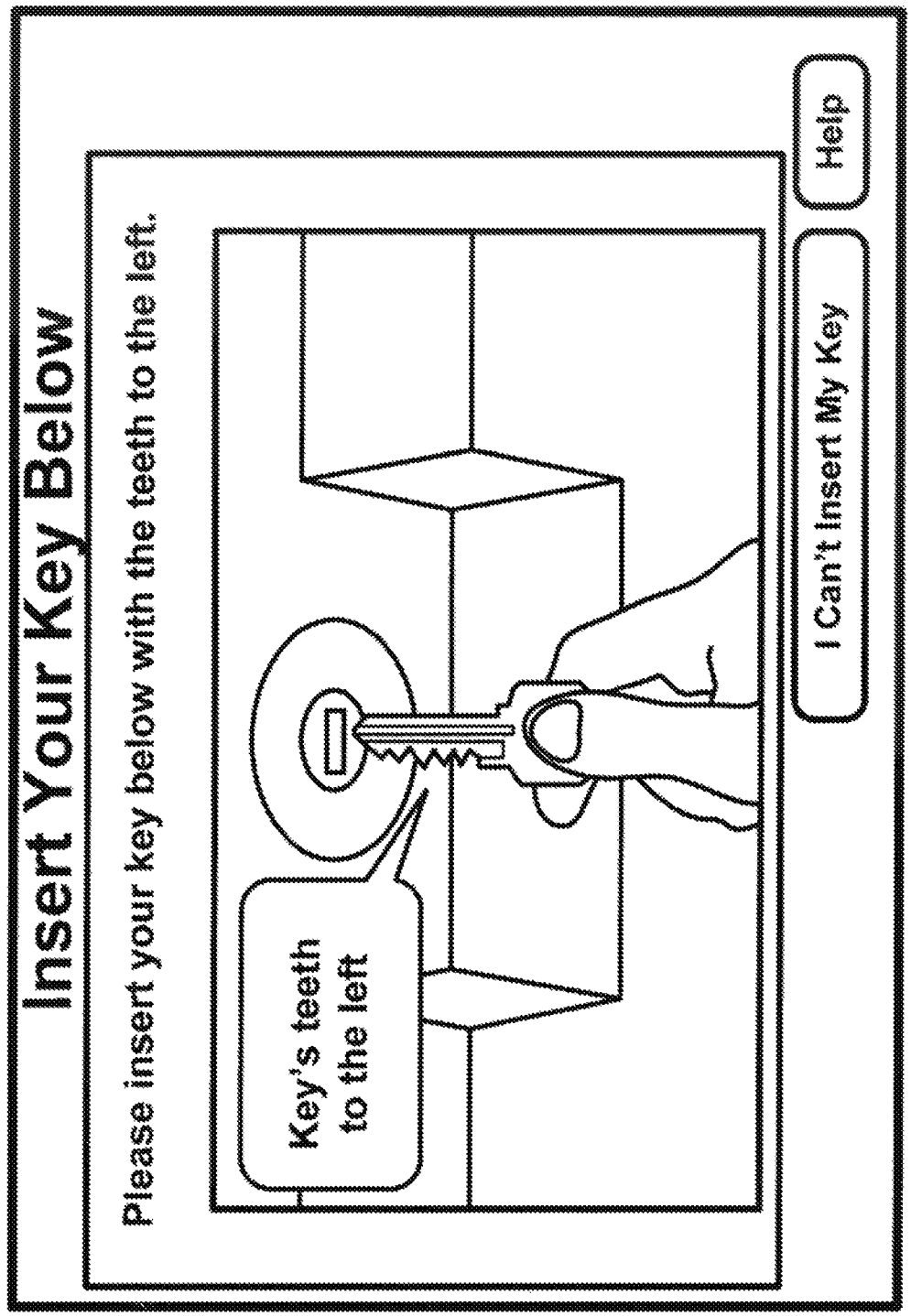
FIG. 9 is a screen shot of a "Insert Your Key Below" screen in the display in the front wall of the kiosk of FIGS. 1 and 2.
Figure 10:
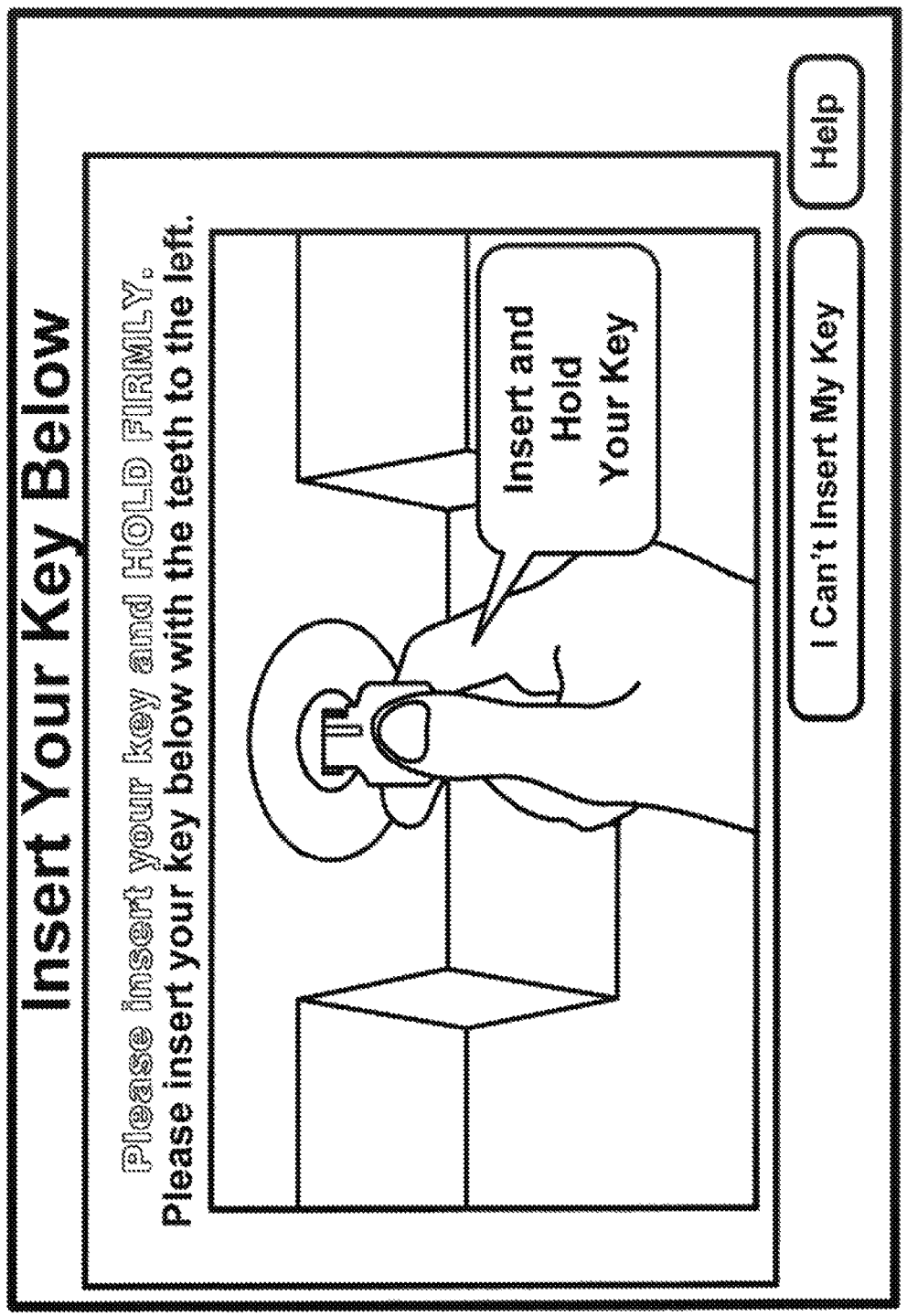
FIG. 10 is a screen shot of an "Insert and Hold Your Key" screen in the display in the front wall of the kiosk of FIGS. 1 and 2.
Figure 11:
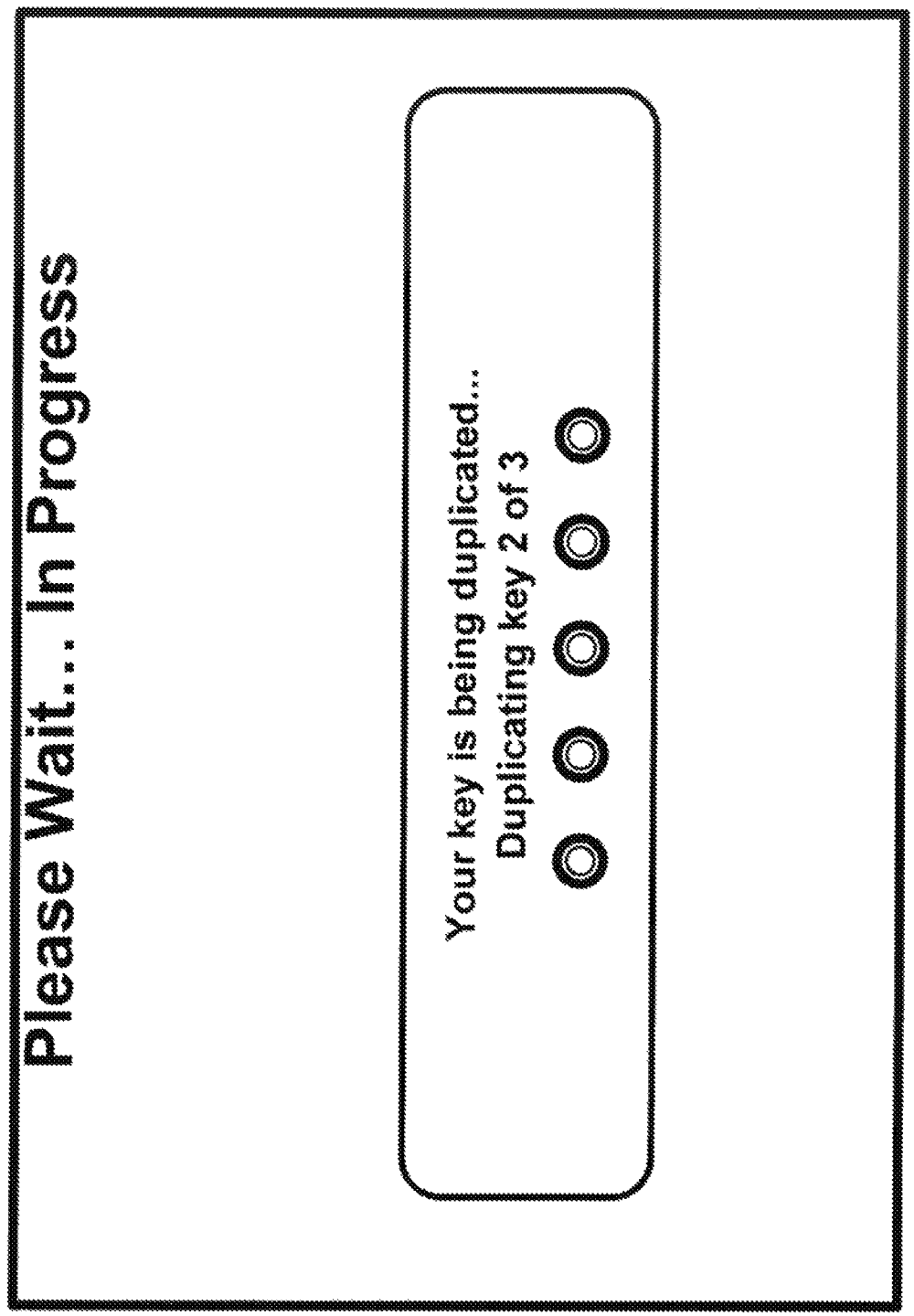
FIG. 11 is a screen shot of a "Please Wait . . . In Progress" screen in the display in the front wall of the kiosk of FIGS. 1 and 2.

If the response from the credit provider is a "yes" (the card is authorized for payment), or if the card is accepted because of a lack of connectivity with the credit provider, the system is ready to accept a key from the customer, and the door 100 is opened to permit insertion of the customer's key into a slot 104. This authorizes the charge, but the payment will only be completed at the end of the key duplication process. At the same time the door 100 is opened, the display is changed to request the customer to insert the key to be duplicated, with instructions specifying which direction the key should be facing, as shown in the screen shot in FIG. 9. This screen also has an "I can't insert my key" option, which, when touched, displays a screen that informs the customer that "Your key cannot be duplicated" FIG. 10 is a screen shot of a display that is generated if a problem is encountered during automatic alignment of the customer's key after it is inserted, as described in detail below. FIG. 11 is a screen shot of a display generated while the customer's key is being duplicated.

Figure 13:
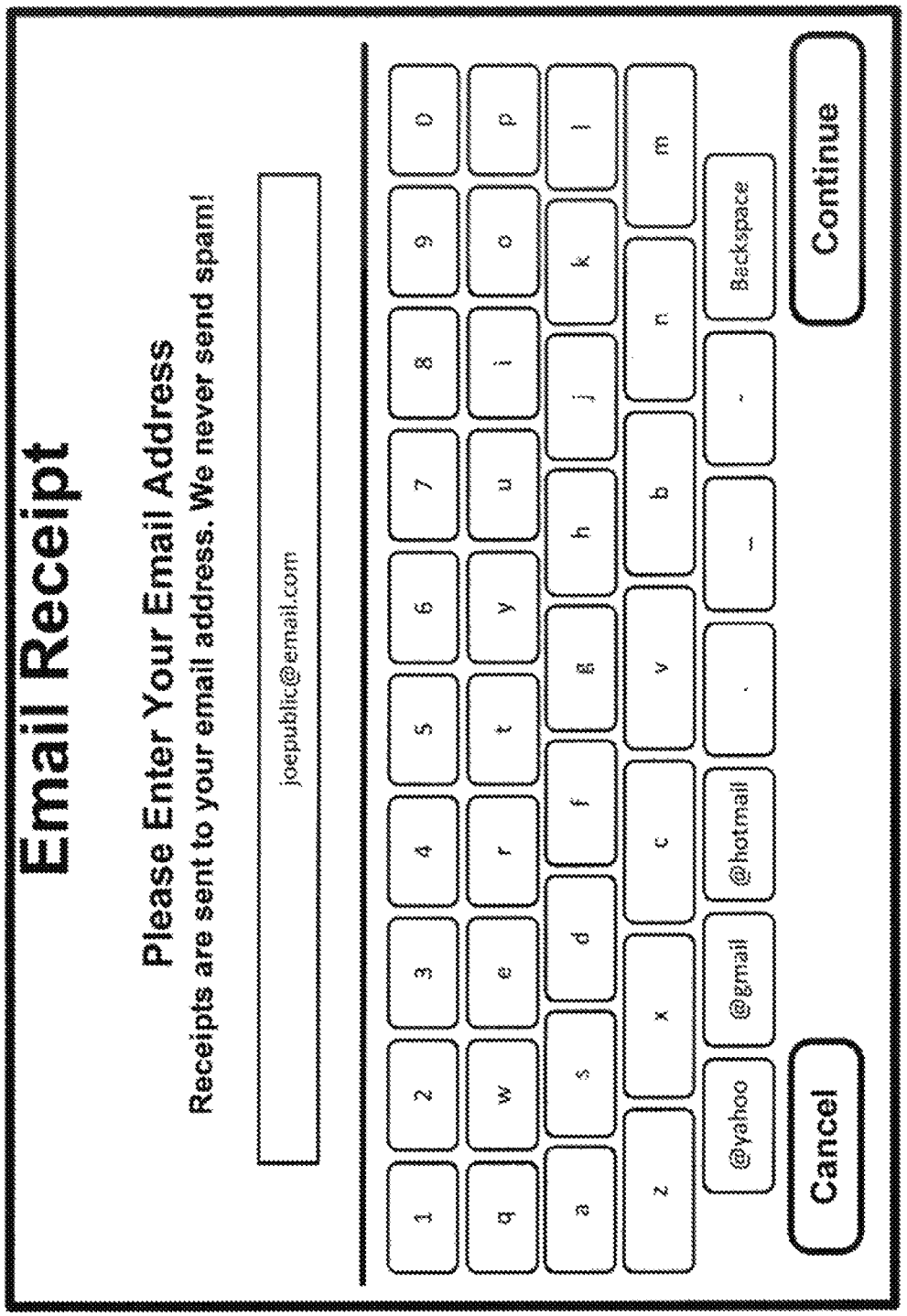
FIG. 13 is a screen shot of an "Email Receipt" screen in the display in the front wall of the kiosk of FIGS. 1 and 2.

At the end of the key duplication process the display is changed to show the customer an on-screen copy of his or her transaction receipt, as shown in FIG. 12. The interface has "Email Receipt" and "Start Over" buttons. The "Start Over" button ends the customer order session and restarts a new order. The "Email Receipt" button links the customer to a screen with a QWERTY style virtual keyboard, as shown in FIG. 13, that allows the customer to enter an email address in a field within a preselected time-out interval. Once a customer completes entering an email address into this field and touches the "Continue" button, the display changes to a screen that informs the customer that a receipt has been sent to the email address that was entered. When the transaction is complete, the display gives the customer an option to send a text or email message with a coupon code inviting another person to use the machine. The display also allows the customer to send a message from the machine to a group of people on a social network. Furthermore, the display gives high volume customers the option of enrolling in a frequent buyer program which sends the customers special promotions or discounts for future purchases.

Figure 14:
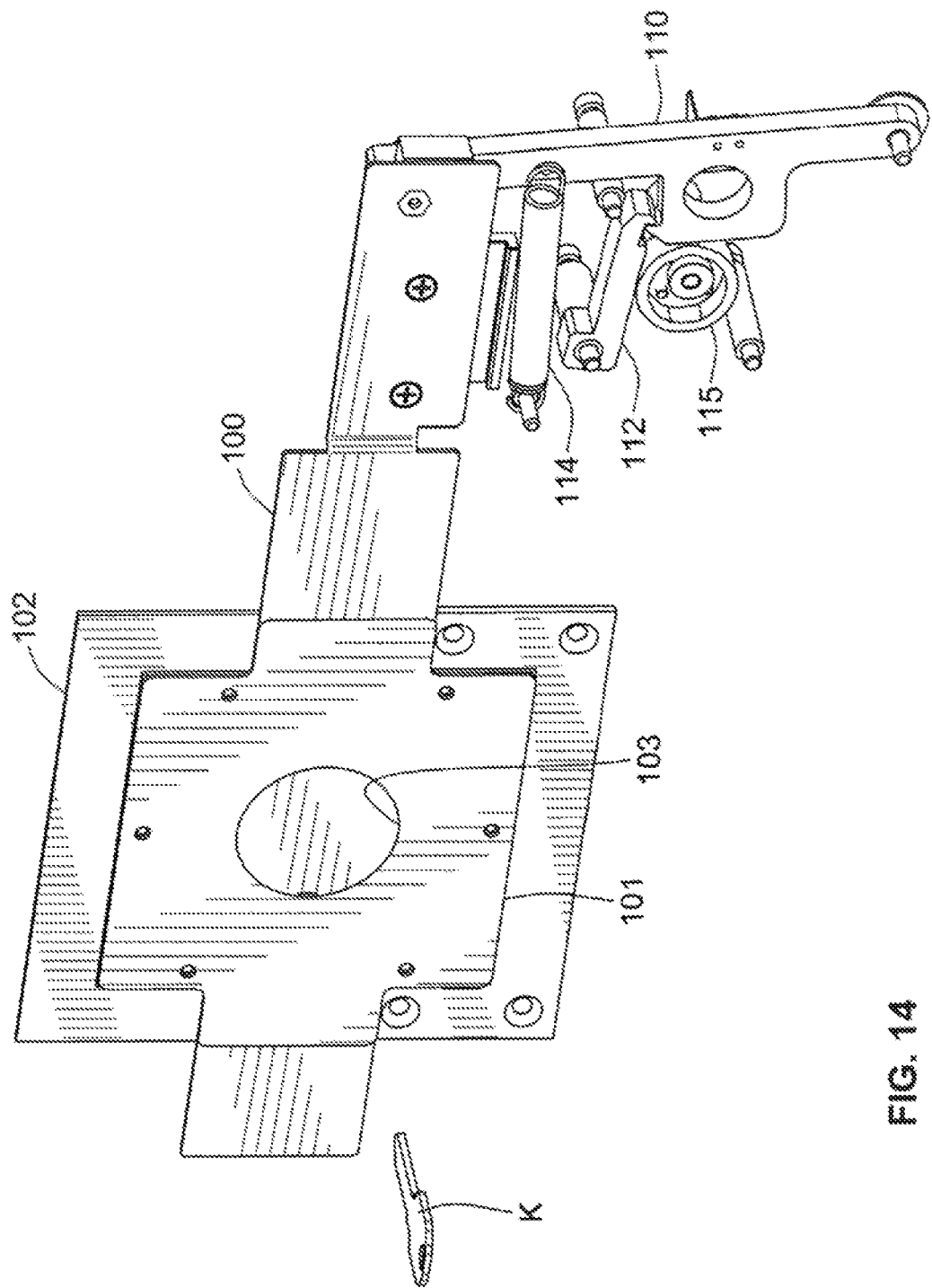
FIG. 14 is a perspective view of the key entry door mechanism shown in FIGS. 1 and 2, with the door in its closed and latched position.
Figure 15:
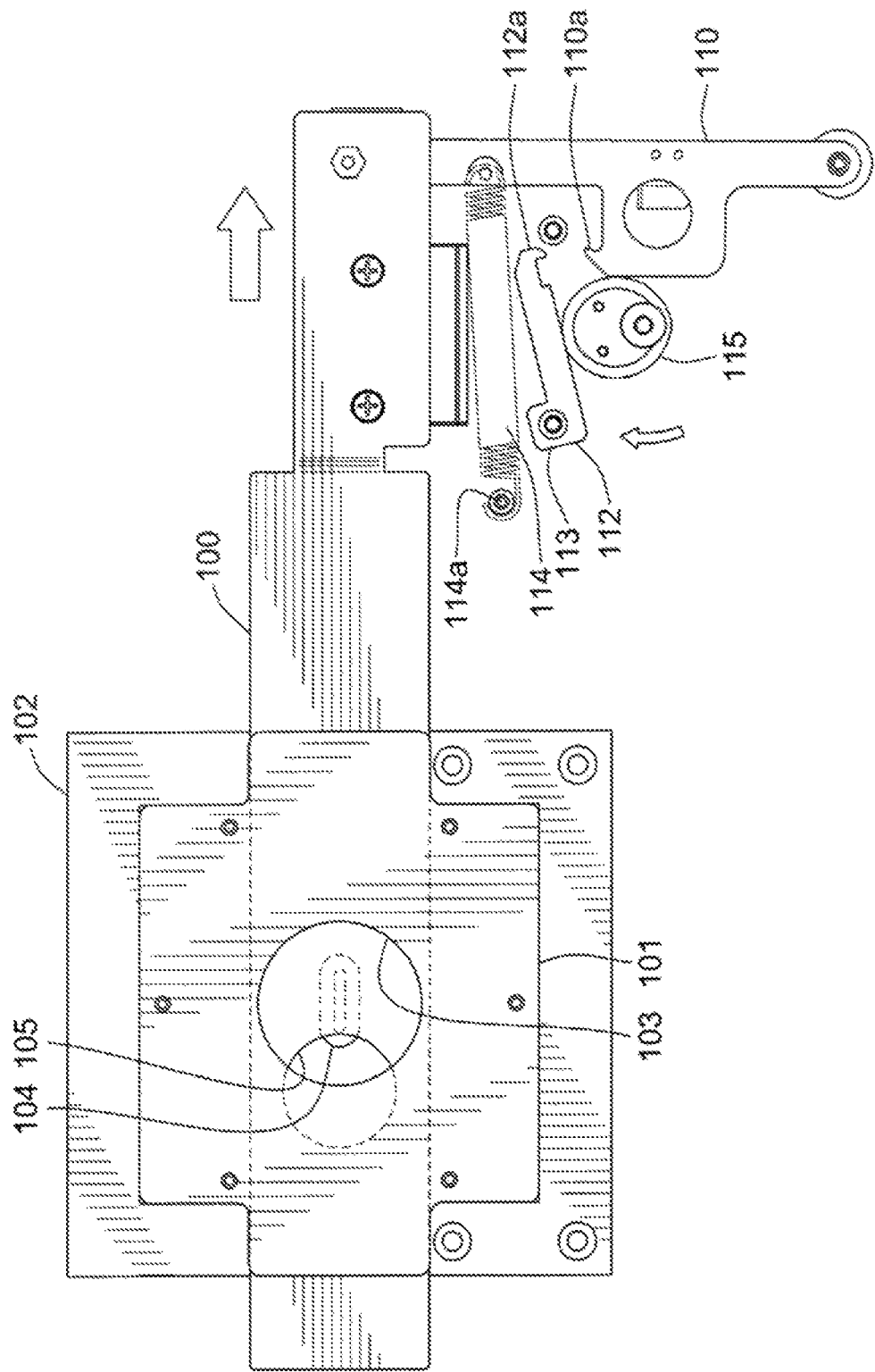
FIG. 15 is a front elevation of the key entry door mechanism shown in FIG. 14, with the door in a partially open and unlatched position.
Figure 16:
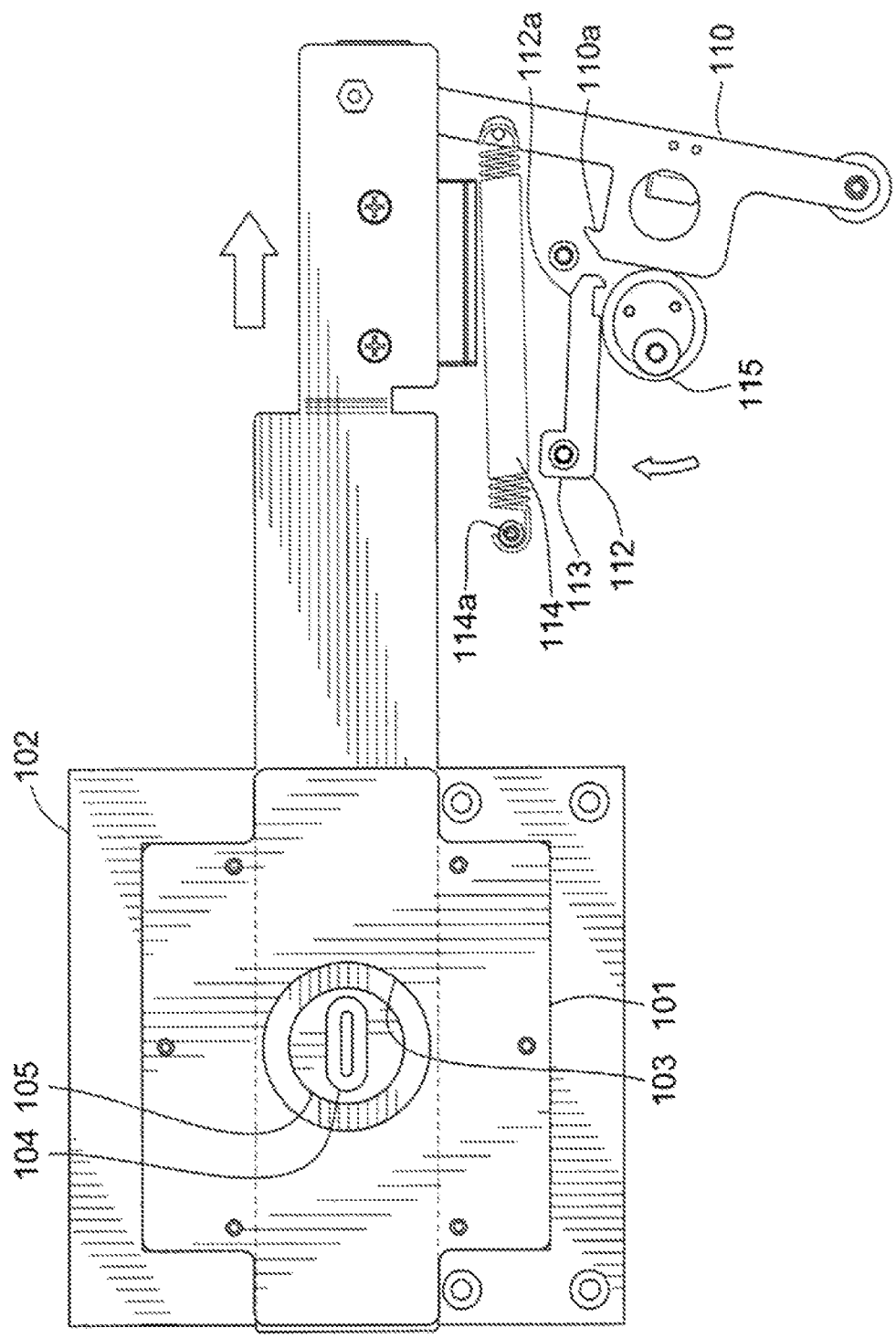
FIG. 16 is front elevation of the key entry door mechanism shown in FIG. 14, with the door in a fully open and unlatched position.

FIGS. 14-16 illustrate an automated key-entry door mechanism that includes a latch to hold the door 100 in its closed position until the customer is instructed to insert a key to be duplicated. The door 100 is formed by a horizontally elongated plate that slides between outer and inner stationary plates 101 and 102 having registered key-entry apertures 103 and 104. The aperture 104 in the inner stationary plate 104 is in the form of a horizontal key-entry slot, so that it permits the key blade to enter the kiosk but blocks entry of the head of the key. The movable plate 100 also has a key-entry aperture 105 that is slightly smaller than the aperture 102 in the outer stationary plate 101, but only when the movable plate 100 is in its open position, illustrated in FIG. 16. When the movable plate 100 is in its closed position, as illustrated in FIG. 14, a solid portion of the plate 100 covers the apertures in the two stationary plates 101 and 102.

To latch the movable plate 100 in its closed position, so that the closure of the key-receiving entry is tamper-proof, a first latch element 110 is pivotably coupled to one end of the plate 100. This first latch element 110 includes a hooked portion 110a that meshes with a second latch element 112 having a hooked portion 112a and pivotably coupled to a stationary pin 113. The first latch element 110 is urged toward the second latch element 112 by a coil spring 114 that has one end attached to the first latch element 110, and a second end attached to a stationary pin 114a. Thus, the first latch element 110 is continuously urged toward its position of latching engagement with the second latch element 112. To open the latch, a motor driven cam 115 is rotated to lift the second latch element 112 away from the first latch element 110, and then pivots the first latch element in a clockwise direction (as viewed in FIG. 15) to pull the plate 100 to the right to bring the aperture 105 into register with the apertures 103 and 104 in the stationary plates. This opens the key entry door so that a customer can insert a key into the key entry slot 104. Continued rotation of the cam allows the first latch element 110 to pivot in a counterclockwise direction, returning to its original closed position under the urging of the spring 114.

When it is desired to have the customer remove the key from the key entry slot, the drive motor for the cam 115 is energized to return the cam to its original position, thereby allowing the spring 114 to return the first latch element to its latched position, which in turn slides the plate 100 to its closed position. Returning the cam 115 to its original position also allows the second latch element 112 to return to engagement with the first latch element 110, thereby securing the movable plate 100 in its closed position. The latch provides protection against tampering or vandalism.

FIGS. 17 through 26 illustrate an alignment mechanism 30 inside the kiosk for properly positioning a key inserted by a customer, to permit that key to be accurately evaluated and duplicated. The alignment mechanism 30 is shown in FIGS. 17-26. The mechanism 30 is shown in its fully retracted position in FIG. 17; in its intermediate, low-force position in FIGS. 22 and 23; and in its fully advanced, high-force position in FIGS. 20 and 24. The alignment mechanism includes a lower block 31 that is mounted for sliding movement along a rail 32. A pair of low-force springs 33 and 34 maintain a space between the lower block 31 and an upper block 35, which in turn is attached to a drive screw 36 that is threaded through the upper block 35 so that rotation of the drive screw 36 by a drive motor 37 moves the upper block 35 along an axis parallel to the rail 32. The right-hand end of the lower block 31, as viewed in FIG. 21, forms a horizontal slot 31a that receives the toothed edge of a master key inserted into the kiosk by a customer. Three horizontal pins P1-P3 extend into the slot 31a and are urged toward the key K by light springs 51-53 similar to the tumbler springs in a lock. The upper block 35 also carries a high-force block 40 that is mounted for sliding movement on the uppermost surface of the upper block 35, with a pair of high-force springs 43 and 44 (supported on rods 42a and 42b) urging the high-force block 40 to the right as viewed in FIGS. 17, 20 and 21.

From the time the kiosk first requests the customer to insert the key to be duplicated, the customer has approximately 60 seconds to insert a key into the slot 17. During this time, the alignment mechanism 30 is in the "low-force" position, waiting for a key insertion. When the customer begins to insert a key into the slot 21, an optical sensor 22 (FIG. 18) adjacent the key-insertion slot 21 immediately detects the entry of the leading end of the key and produces a "Key Present" signal that causes the kiosk controller to start a 7-second time interval, so that action can be taken if full insertion of the key has not been completed within 7 seconds. That is, the customer is allowed 7 seconds to finish inserting the key into the slot.

Figure 19:
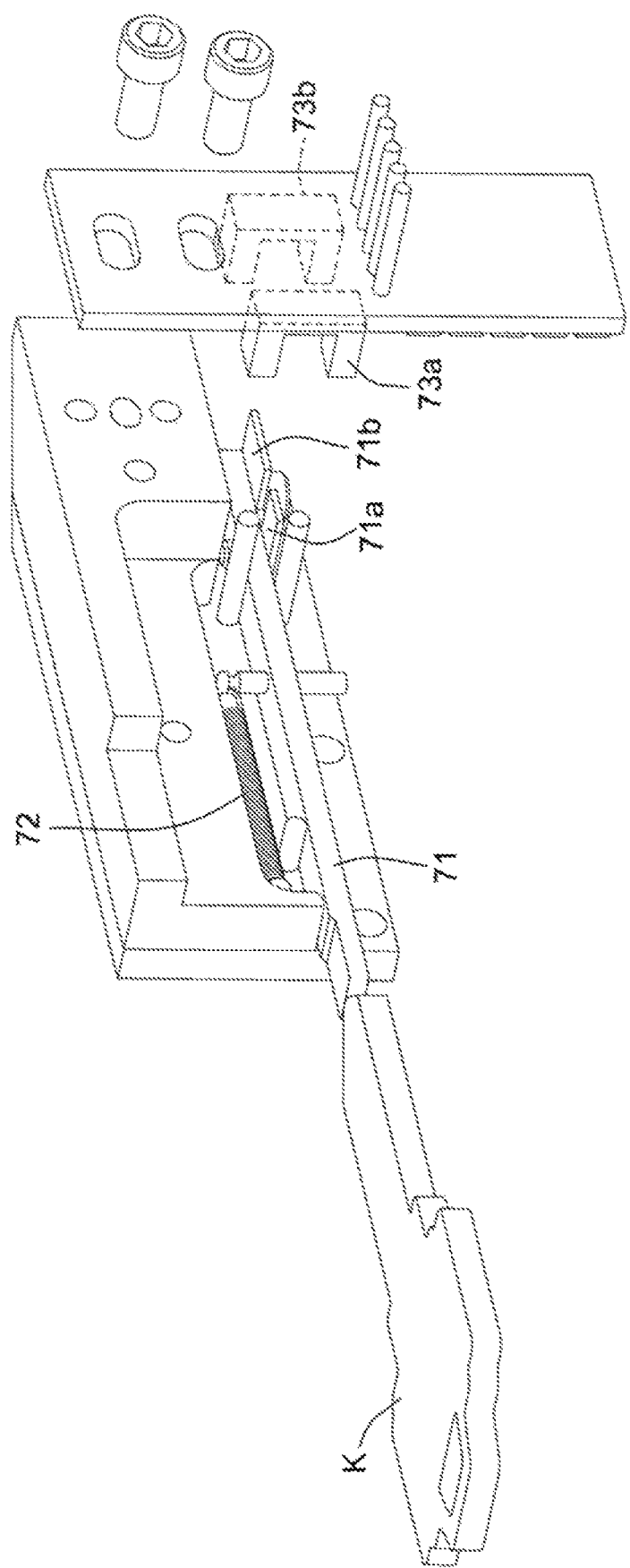
FIG. 19 is a further enlarged perspective of the master-key length sensing system in the master-key analysis system shown in FIGS. 17 and 18, with the tip of the master key engaging the length-sensing system.

While the master key K is being inserted into the kiosk, a pair of sensors produce signals that are used by the controller to determine whether the master key is possibly a type that can be duplicated by the kiosk. Specifically, as the master key K is inserted into the kiosk, the tip of the key engages and advances a slide 71 (FIG. 19) against the biasing force of a spring 72 that urges the slide against the end of the key K, as shown in FIG. 19. The slide 71 carries two tabs 71a and 71b projecting laterally from the slide 71 to pass through a pair of corresponding optical sensors 73a and 73b. The narrower tab 71a trips the sensor 73a to indicate whether the key length is within a prescribed range of acceptable key lengths, and the wider tab 71b trips the sensor 73b if the key length is too long to be duplicated by the kiosk.

Before the key K engages the slide 71, the two tabs 71a and 71b are outside their respective optical sensors 73a and 73b. After the key K engages the slide 71 and begins to advance it, to the right as viewed in FIG. 19, the narrow tab 71a enters the sensor 73a and interrupts the light beam of that sensor until the slide 43 has been advanced through a distance equal to the width of the tab 71a. Thus, the time interval during which the light beam is interrupted corresponds to a preselected range of movement of the slide 71, which in turn corresponds to a range of key lengths. If the master key K inserted by the customer falls within this range, the controller produces a "Correct Range" signal. If the master key K does not fall within this range, it is not a key type that can be duplicated by the kiosk.

The wide tab 71b enters its sensor 73b slightly before the narrow tab 71a exits from the light beam in the sensor 73a, so if the light beam in the sensor 73b is interrupted at the time the narrow tab exits from its light beam, the two sensor outputs indicate that the master key K is too long rather than too short. In this event, the controller immediately generates a signal that causes the display of a message informing the customer that "We Cannot Copy Your Key," without waiting for the time-out of the 7-second interval. As long as neither of the two light beams has been interrupted, insertion of the key might not yet be completed, so no message is generated until the 7-second interval has expired. If at that time neither light beam has been interrupted, the controller generates the "We Cannot Copy Your Key" message.

Figure 27:
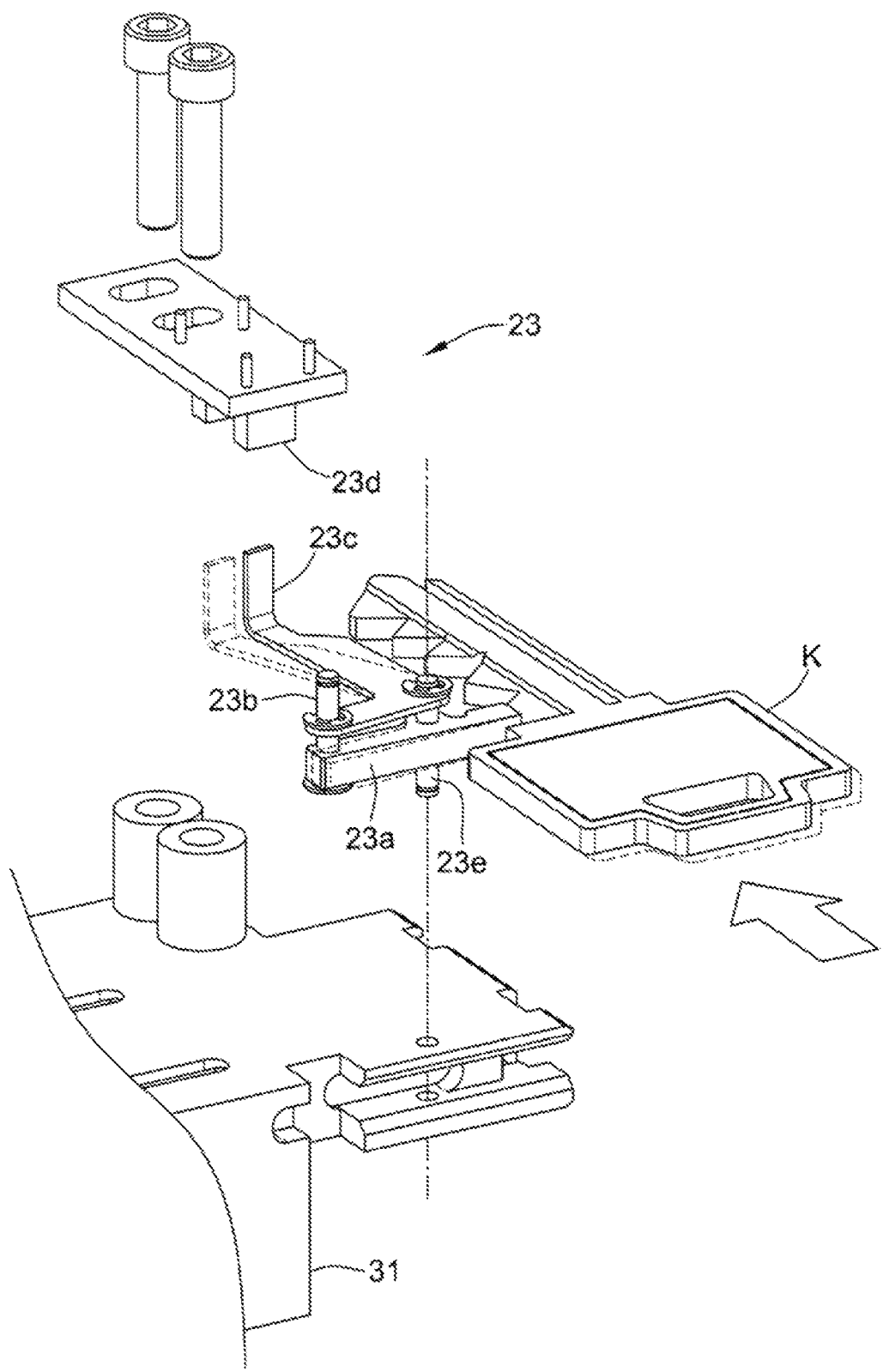
FIG. 27 is an enlarged, exploded perspective of the master key shoulder-sensing arrangement in the master-key alignment system shown in FIGS. 21-26.

Full insertion of the key is detected by a sensor 23 (see FIG. 27) that sends a signal to the kiosk controller when the top shoulder of the key K reaches a predetermined advanced position. Specifically, in the illustrated embodiment, the left-hand ("top") shoulder of the key (as viewed from the front of the kiosk) engages a first sensor arm 23a to move a stub shaft 23b to a different angular position with respect to a shaft 23e. This in turn moves a tab on the end of a second sensor arm 23c into an optical sensor 23d. This causes the optical sensor 23d to send a "Key Fully Inserted" signal to the controller to indicate that the master key has been fully inserted into the kiosk. The two sensor arms 23a and 23c both pivot around the shaft 23e, with the tab on the arm 23c being located farther from the shaft 23e than the stub shaft 23b, so that a small angular movement of the arm 23a results in a much larger angular movement of the arm 23c and its tab.

If the controller does receive a "Key Fully Inserted" signal, a "Correct Range" signal and a "Key Present" signal within the 7-second time interval, the controller changes the display to "We cannot copy your key," and the order is canceled. If the controller receives a "Key Fully Inserted" signal, a "Correct Range" signal and a "Key Present" signal within the 7-second time interval, the controller causes the key-alignment mechanism 30 to be moved to its fully advanced, "high-force" position to precisely position the fully inserted key before it is clamped in place for the duplicating process. If the controller determines that the key cannot be duplicated by the kiosk because the inserted key is too long, it immediately informs the customer that "We cannot copy your key." If the controller determines that the inserted key cannot be duplicated by the kiosk because the inserted key is too short, the kiosk controller waits until the 7-second interval has expired, and if nothing changes before that interval expires, the display is changed to inform the customer that "We cannot copy your key," and directing the customer to remove the key from the kiosk.

Figure 20:
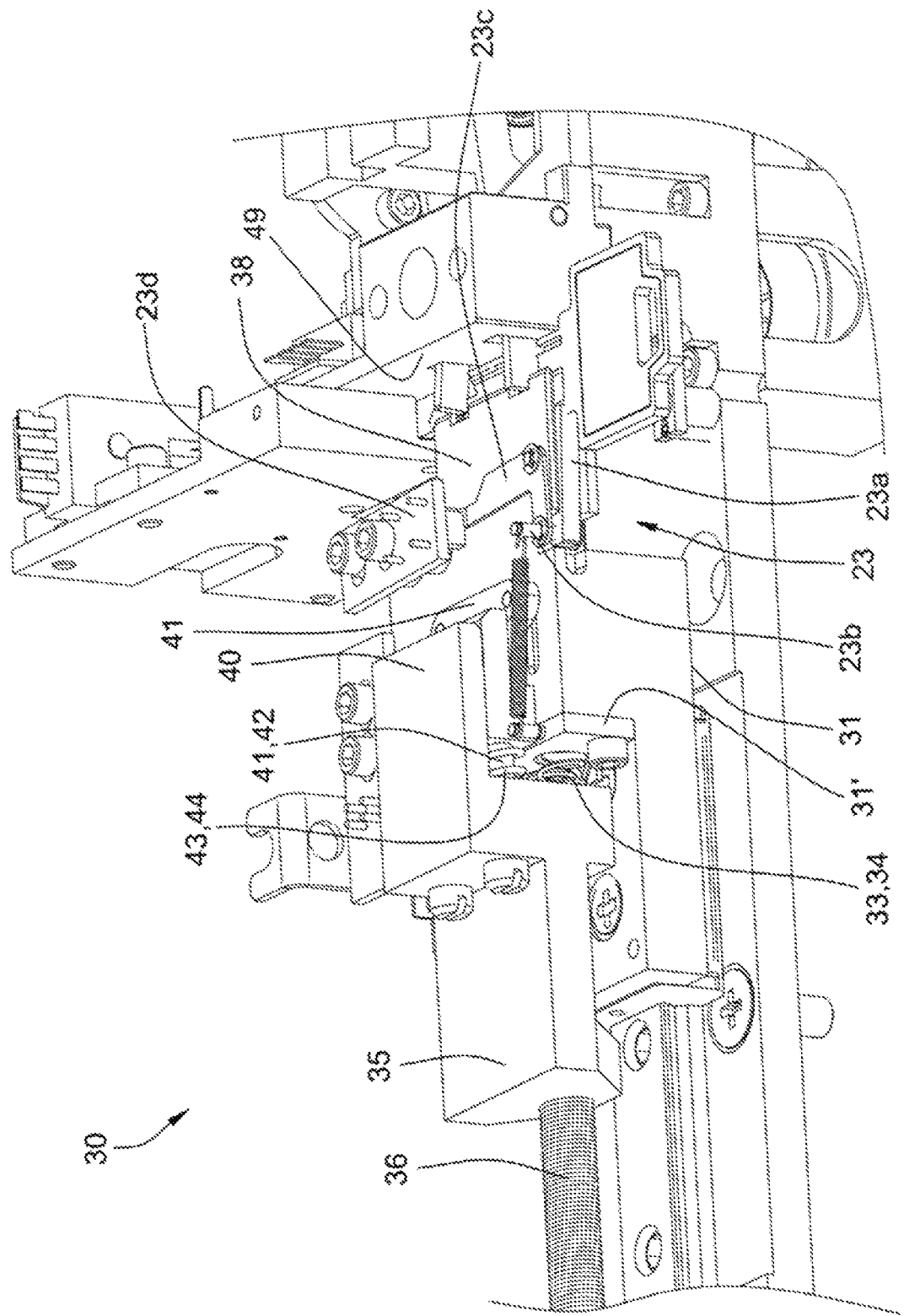
FIG. 20 is an enlarged perspective view of the left-hand portion of the systems shown in FIG. 17, with the master key-alignment system in its fully advanced position and the profile-matching gauges in their key-engaging positions.
Figure 21:
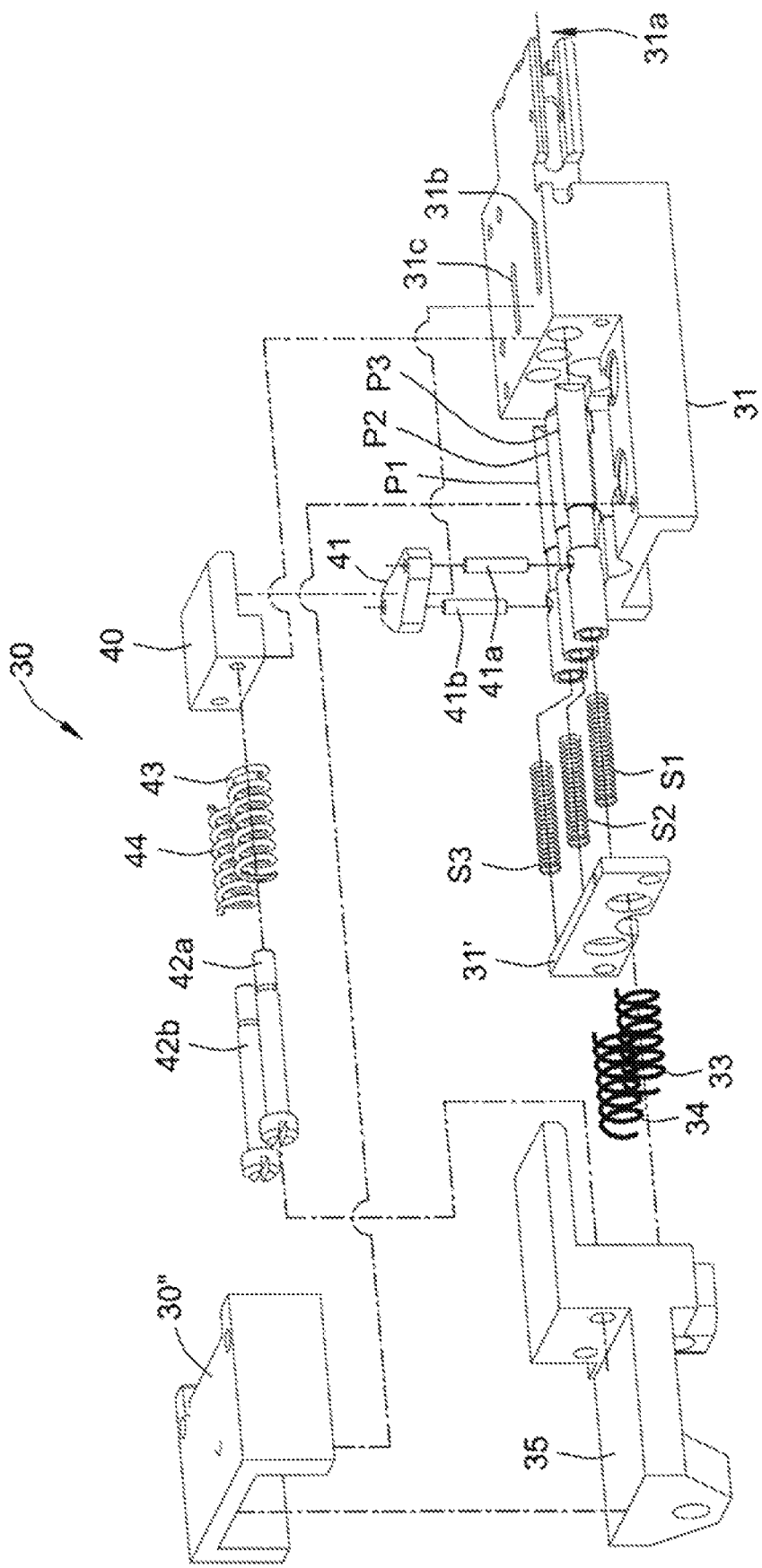
FIG. 21 is an enlarged and exploded perspective of the left-hand portion of the master-key alignment system shown in FIGS. 17 and 20.
Figure 22:
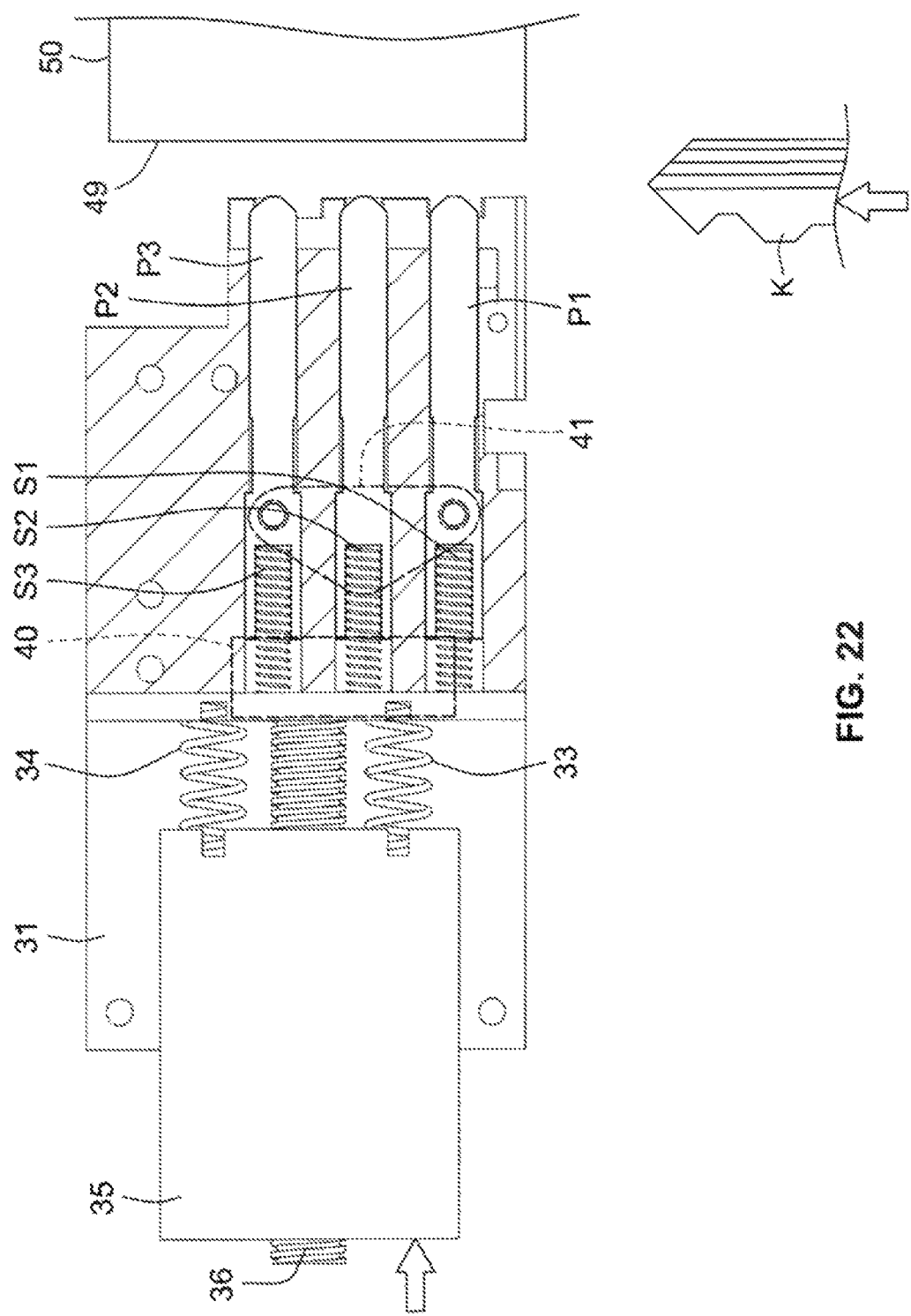
FIG. 22 is an enlarged top plan view of the master-key alignment mechanism advanced to its intermediate or "low-force" position and with the master key not yet inserted.
Figure 23:
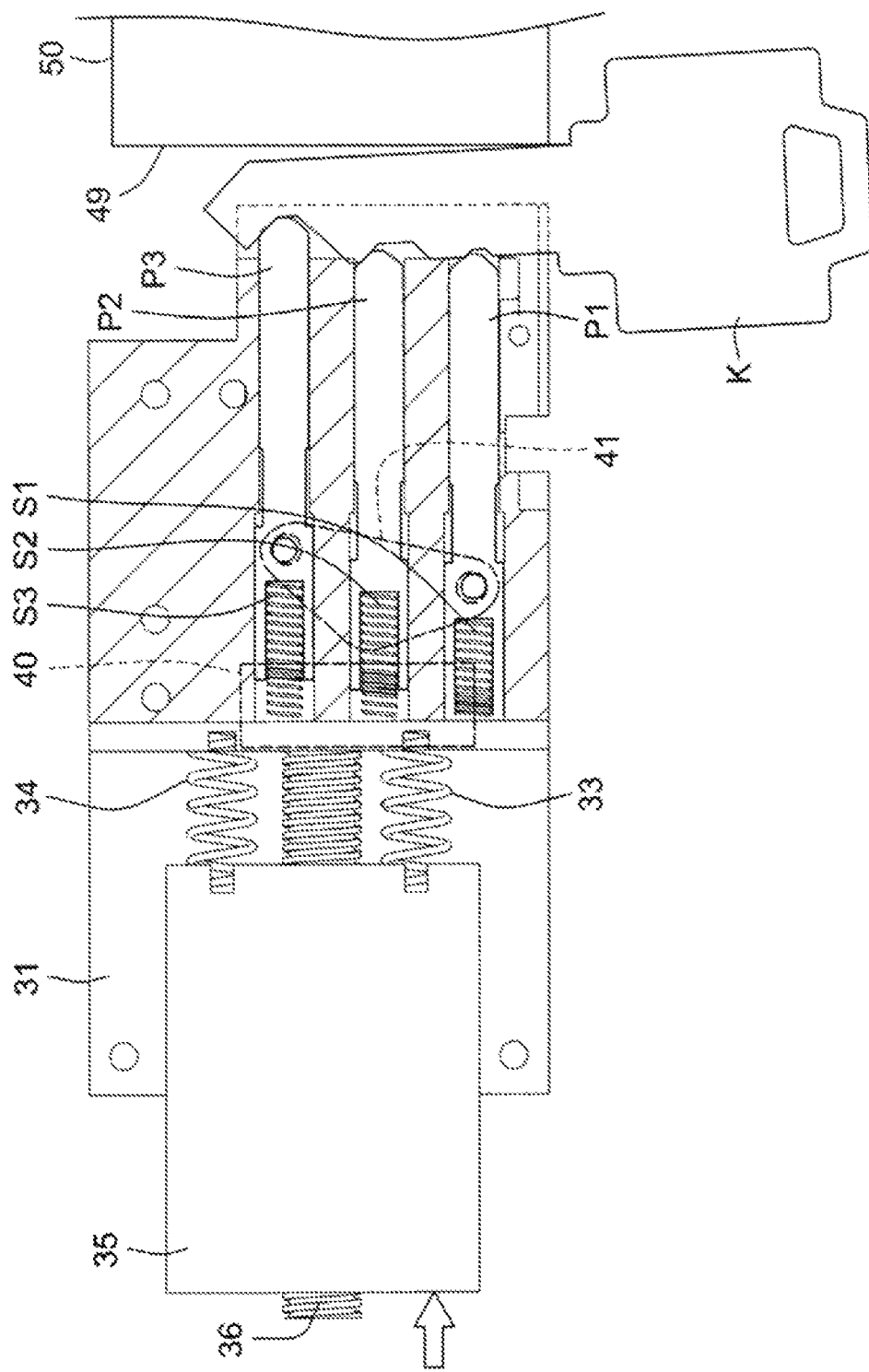
FIG. 23 is the same top plan view shown in FIG. 22 with the master key inserted but not fully aligned.
Figure 24:
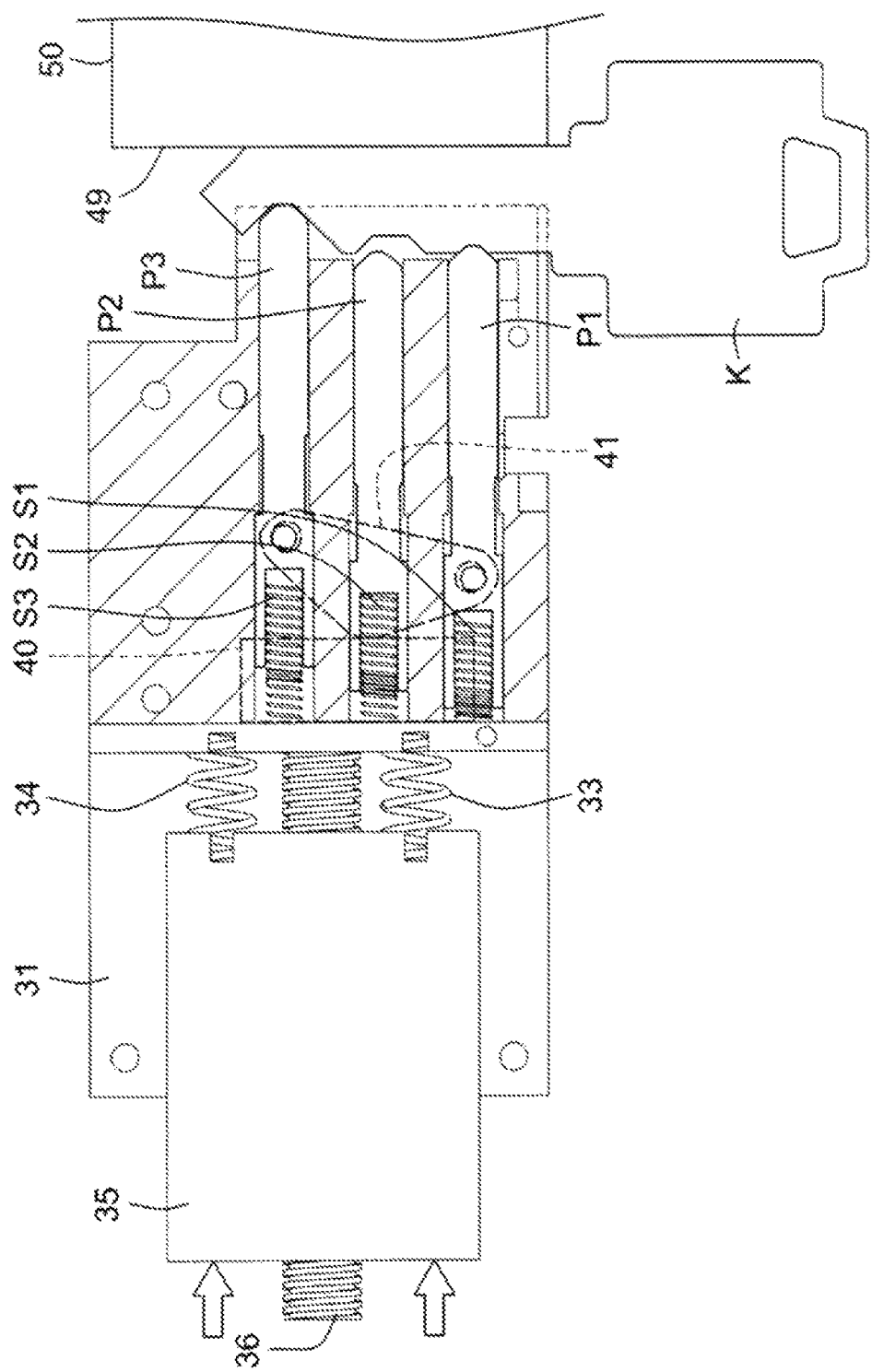
FIG. 24 is the same top plan view shown in FIG. 23 with the alignment mechanism advanced to its most advanced or "high-force" position to fully align the master key.

If the kiosk controller determines that the master key K may possibly be duplicated, the drive screw motor 37 of the alignment mechanism 30 is energized to turn the drive screw 36 to advance the upper block 35 to the position shown in FIGS. 20 and 24. In this position, the high-force springs 43 and 44 are compressed between the upper block 35 and the high-force block 40, thereby moving the high-force block 40 and a pin rocker arm 41 to the right. The rocker arm 41 slides on the top surface of the lower block 31 and is coupled to the two end pins P1 and P3 by a pair of vertical pins 41a and 41b. Thus, the force of the springs 43 and 44 is transmitted to the key K via the block 40, the rocker arm 41, and the vertical pins 41a and 41b that extend through respective slots 31a and 31b in the block 31 to permit sliding movement of the pins 41a and 41b relative to the block 31. The middle pin P2 is also biased against the key K by its spring S2, but is not subjected to the force of the springs 43 and 44. The purpose of the rocker arm 41 is to permit the two end pins P1 and P3 to move relative to each other so that they can engage notches of different depths in the toothed edge of the master key K. Thus, the force of the springs 43 and 44 is applied to the toothed edge of the key K at two spaced locations, via pins P1 and P3, thereby ensuring that the opposite (straight) edge of the master key is pressed firmly against a vertical alignment wall 49 on the lower clamp 50. This completes the precise alignment of the master key K, so that it can be clamped to prevent any movement of the master key while it is analyzed and duplicated.

Figure 25:
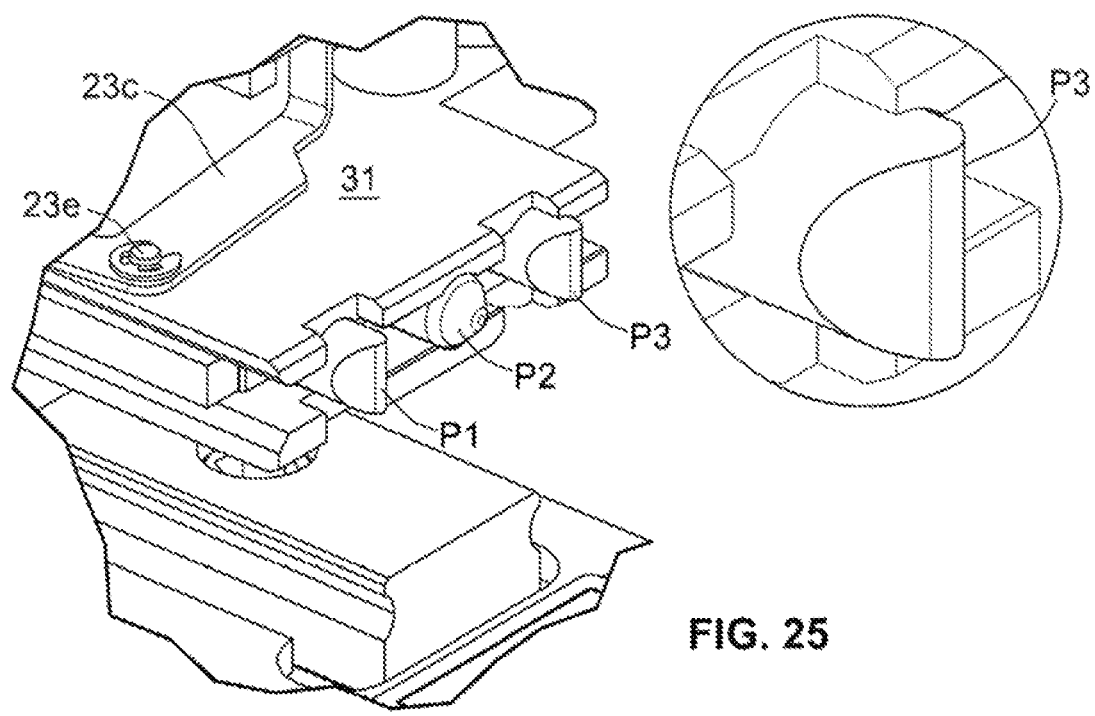
FIG. 25 is an enlarged perspective view of the right-hand end of the master-key alignment mechanism shown in FIG. 24.
Figure 26:
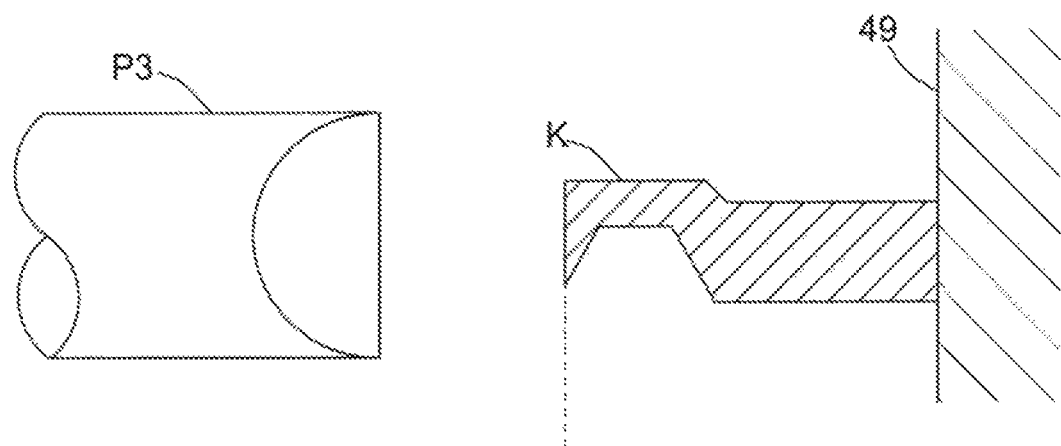
FIG. 26 is a further enlarged side elevation of a master key and one of the pins in the alignment mechanism shown in FIG. 25.

The two end pins P1 and P3 are beveled on both sides to form a straight vertical edge that engages the master key K and urges the key against the alignment wall 49. Because the vertical edges on the ends of the pins P1 and P3 engage the key K along the entire height of the edge surface of the key, there is no risk of tilting the key as it is pushed against the alignment wall 49, as depicted in FIGS. 25 and 26.

An upper clamp 51 is then lowered into engagement with the upper surface of the master key K to clamp the key tightly against the lower clamp 50. The master key remains in this firmly clamped condition while (1) the position of the clamped key is checked to determine whether the key shifted during clamping, (2) the alignment mechanism is moved to its fully retracted position if the key remained in position, (3) the cross-sectional profile of the master key is identified, (4) a blank key having the design selected by the customer and also having the same cross sectional profile (same key type) as the master key is extracted from the blank-key magazines, (5) the extracted blank key is cut to have the same tooth pattern as the master key, (6) the new key is de-burred, (7) the new key is dropped into the duplicate key discharge tray 15 for delivery to the customer and (8) any key chains or other options are dispensed if they were ordered.

Figure 17:
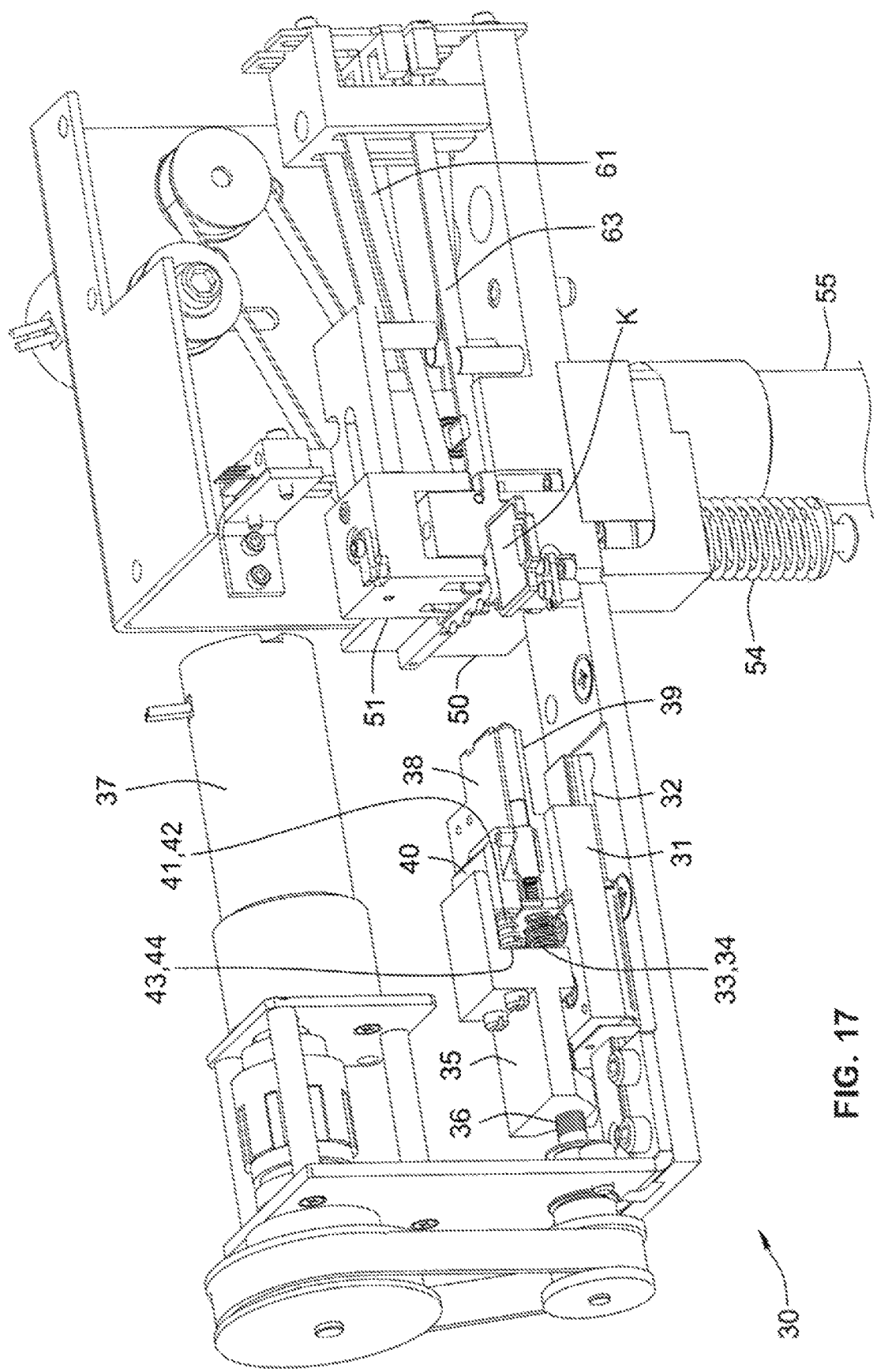
FIG. 17 is a perspective view of the master key-alignment, clamping and analysis systems in the kiosk of FIGS. 1 and 2, with a master key fully inserted.
Figure 18:
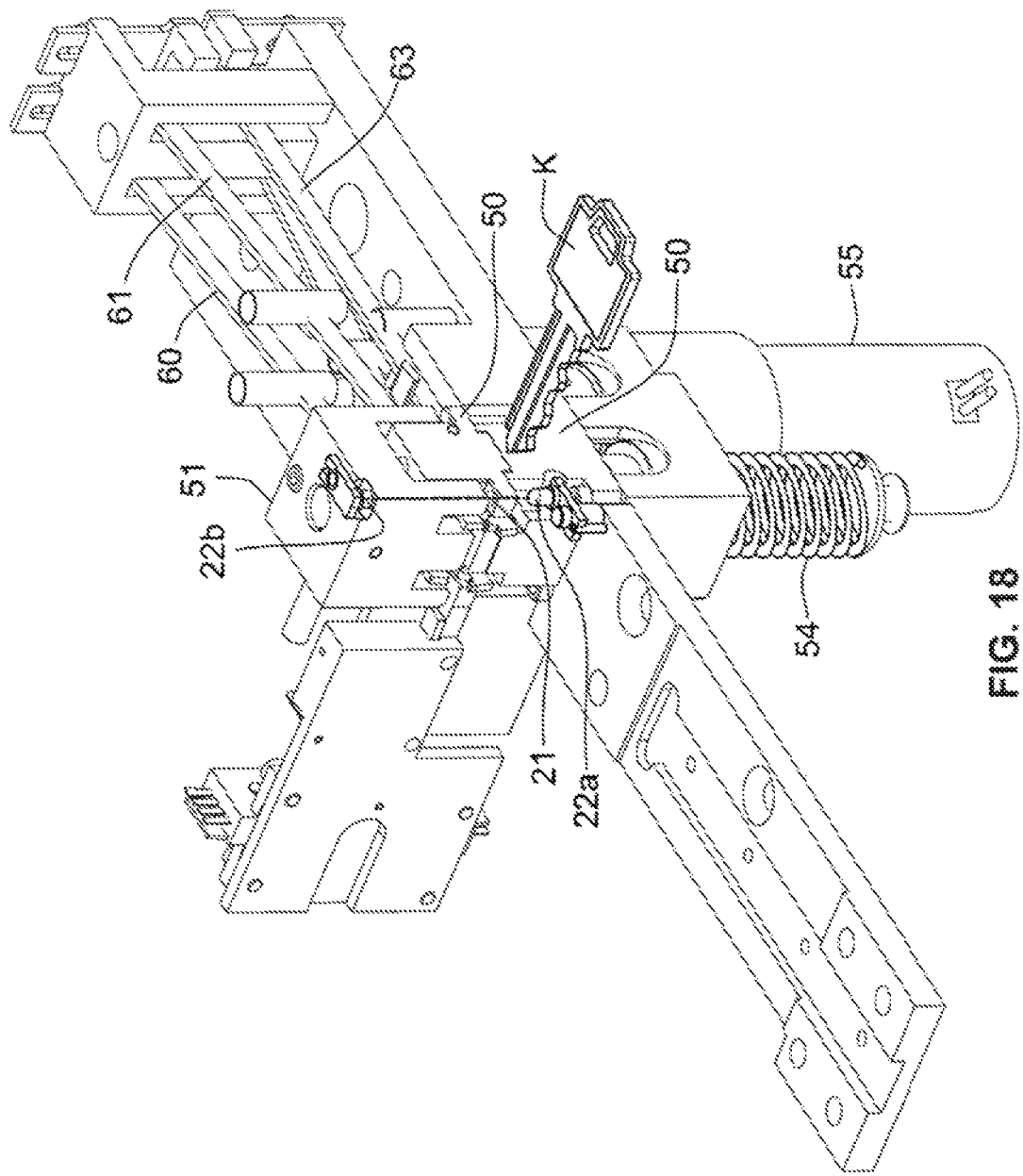
FIG. 18 is a slightly rotated and enlarged perspective view of the master-key clamping and analysis systems shown in FIG. 17, with the master key not yet inserted.
Figure 28:
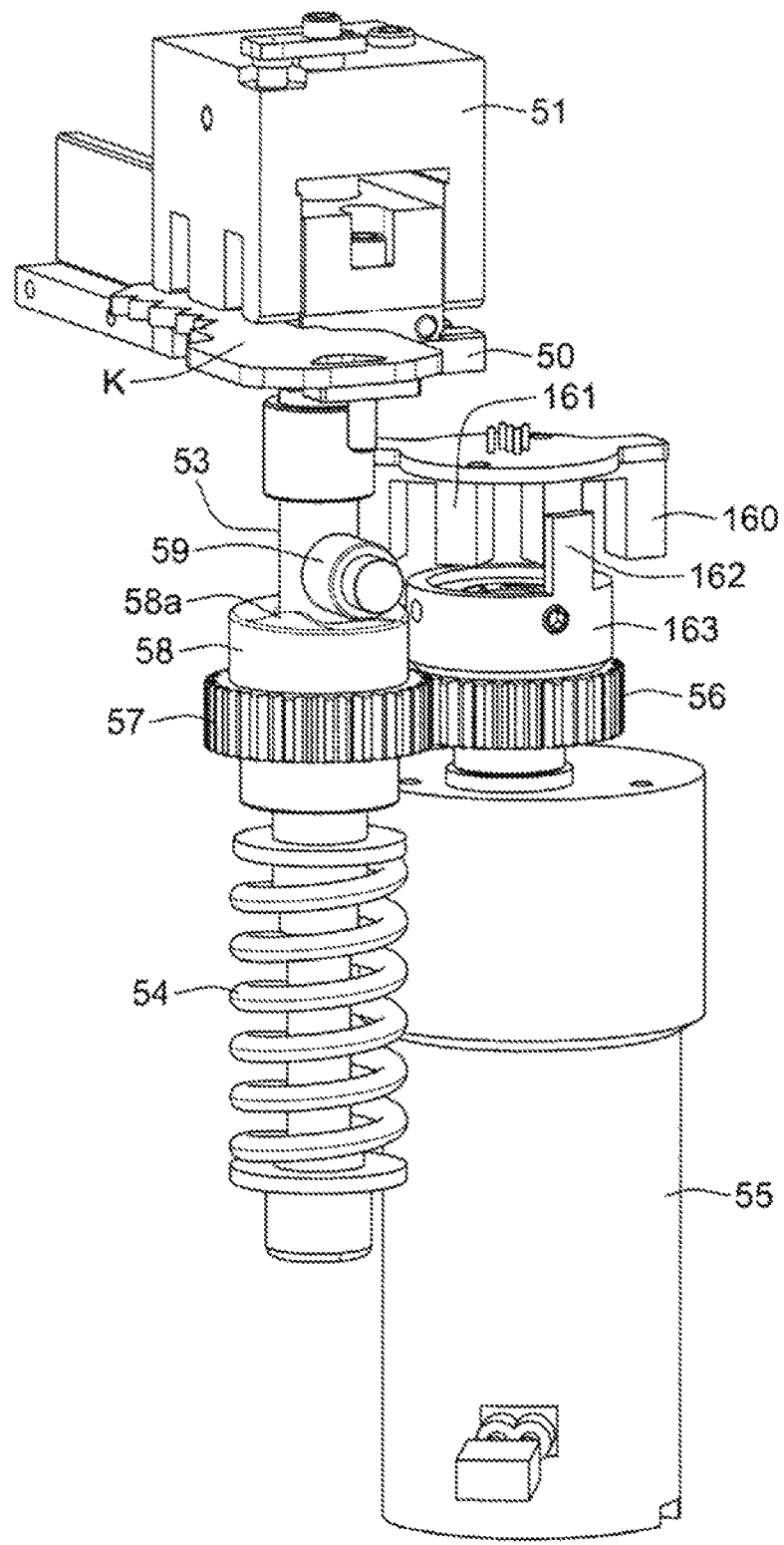
FIG. 28 is an enlarged perspective view of the master key clamping assembly, with a master key fully inserted into the open clamping assembly.

The master key clamp is shown in FIGS. 17-18 and 28, which depict a master key K being inserted, and then clamped, between the lower clamp 50 and the upper clamp 51. The upper clamp 51 is attached to a vertical shaft 53 that carries a coil spring 54 that applies a constant strong downward force to the shaft 53, which pulls the upper clamp 51 downwardly toward the lower clamp 50. To open the clamp, against the downward biasing force of the spring 54, a motor 55 turns a gear 56, which turns a meshing gear 57 that carries a cam 58. The cam surface 58 engages a cam follower 59 on the lower end of a shaft 53 so that the cam follower 59 is pulled down against the cam surface 58 by the force of the spring 54. When the cam follower 59 is registered with the valley 58b of the cam surface 58, the force of the spring 54 pulls the upper clamp 51 down tightly against the key K, thereby clamping the key tightly against the lower clamp 50. By controlling the motor 55 to rotate the gear 52 by a certain number of degrees, the cam follower 59 is aligned with a peak 58a of the cam surface 58, which raises the shaft 53 and the upper clamp 51 to open the clamping assembly and thereby release the key K.

To control the angular position of the cam follower 59, a pair of optical sensors 160 and 161 supply signals to the controller when a tab 162 on a collar 163 connected to the output shaft of the motor 55 passes through the sensors. While the tab 162 is moving from sensor 160 to sensor 161, the cam follower 59 is riding over the peak 58a on the cm surface 58, which is the interval during which the key clamp is open. Thus, the motor 55 can be precisely controlled to open and close the clamp.

The "Key Present" signal mentioned above is produced by an optical sensor 22 built into the master-key clamping assembly. Specifically, a light source 22a is built into the lower clamp 50 and a photodetector 22b is built into the upper clamp 51, with the light beam 21 passing through the master-key slot between the two clamps. Thus, when a master key is inserted between the two clamps 50 and 51, the light beam is interrupted, and the sensor supplies a corresponding output signal to the controller.

To check the position of the key after it has been clamped, the kiosk controller checks the signals from the "Key-Fully Inserted" sensor 23, the two length sensors 45a and 45b and the "Key Present" sensor 22. If the kiosk controller determines that the position of the key did not change during clamping, the controller causes the alignment mechanism 30 to fully retract by energizing the drive screw motor 37 to turn the drive screw 36 in the reverse direction. If the kiosk controller determines that the key position did change during clamping, the controller causes the alignment mechanism 30 to return from the high-force position to the low-force position, causes the master-key clamping assembly to be released, and changes the kiosk display to a screen that directs the customer to "Insert and Hold Your Key." This re-starts the entire process described above, starting with insertion of a key by the customer. If the customer re-inserts the key and the position of the key again changes during clamping, the kiosk changes the display to the screen to inform the customer that "We cannot copy your key," and directing the customer to remove the key from the kiosk.

As described in U.S. Patent Publication No. 2008/0145163, the blade of the master key can have one of several different cross-sectional profiles, and identifying the profile of the master key effectively determines what type of key it is. Because only a limited number of different types of key blanks can be stored in the kiosk, the cross-sectional profile of the profile master key is matched against only preselected profiles, which are the profiles for which blanks are available in the kiosk. For example, a first profile may correspond to a Schlage key, a second profile may correspond to a Kwikset key, and a third profile may correspond to a Weiser key. Other key types may be identified with other corresponding profiles.

Figure 29:
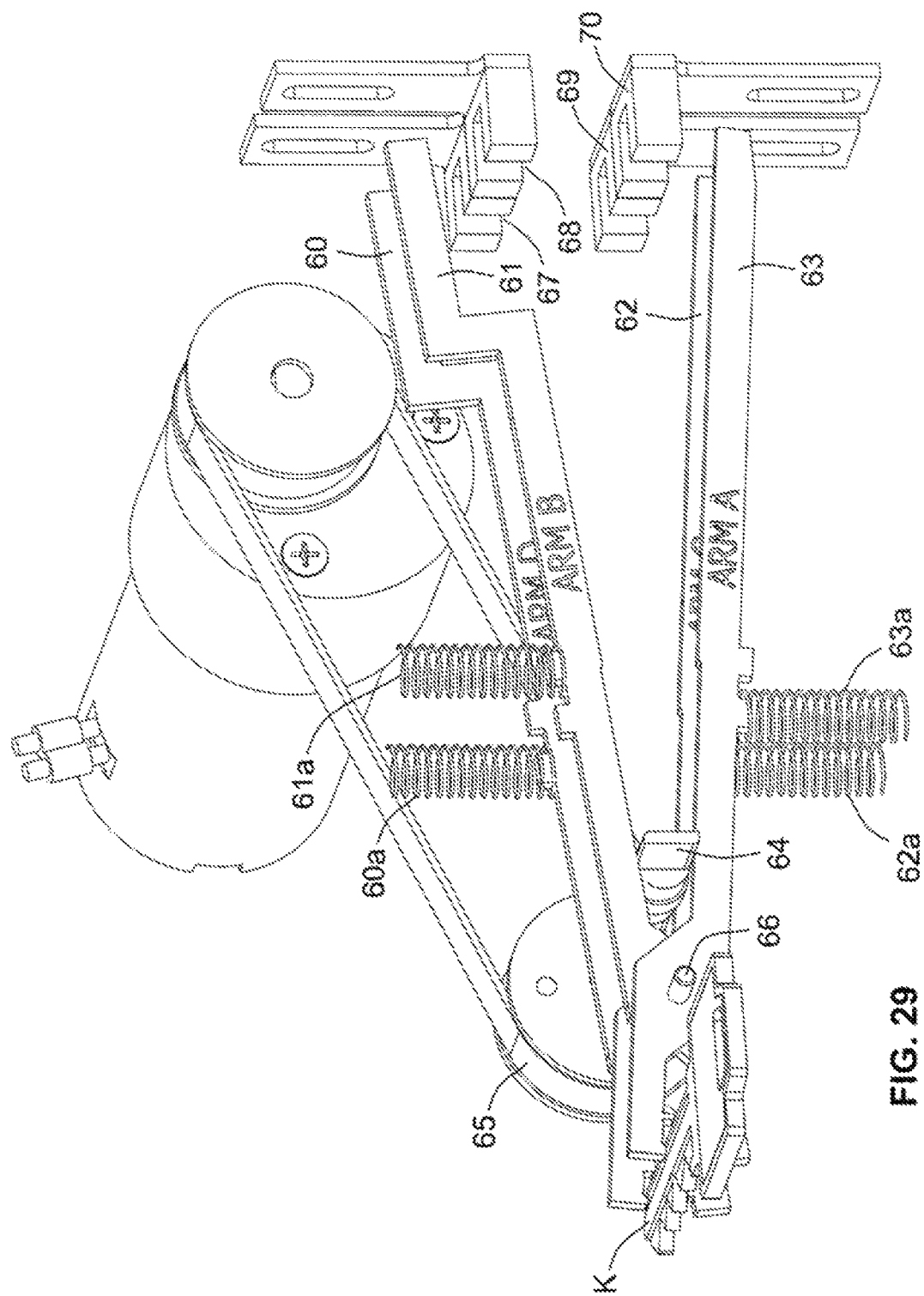
FIG. 29 is a perspective view of the master key-alignment mechanism in its retracted position and with the profile-matching gauges engaging a fully inserted master key.
Figure 30:
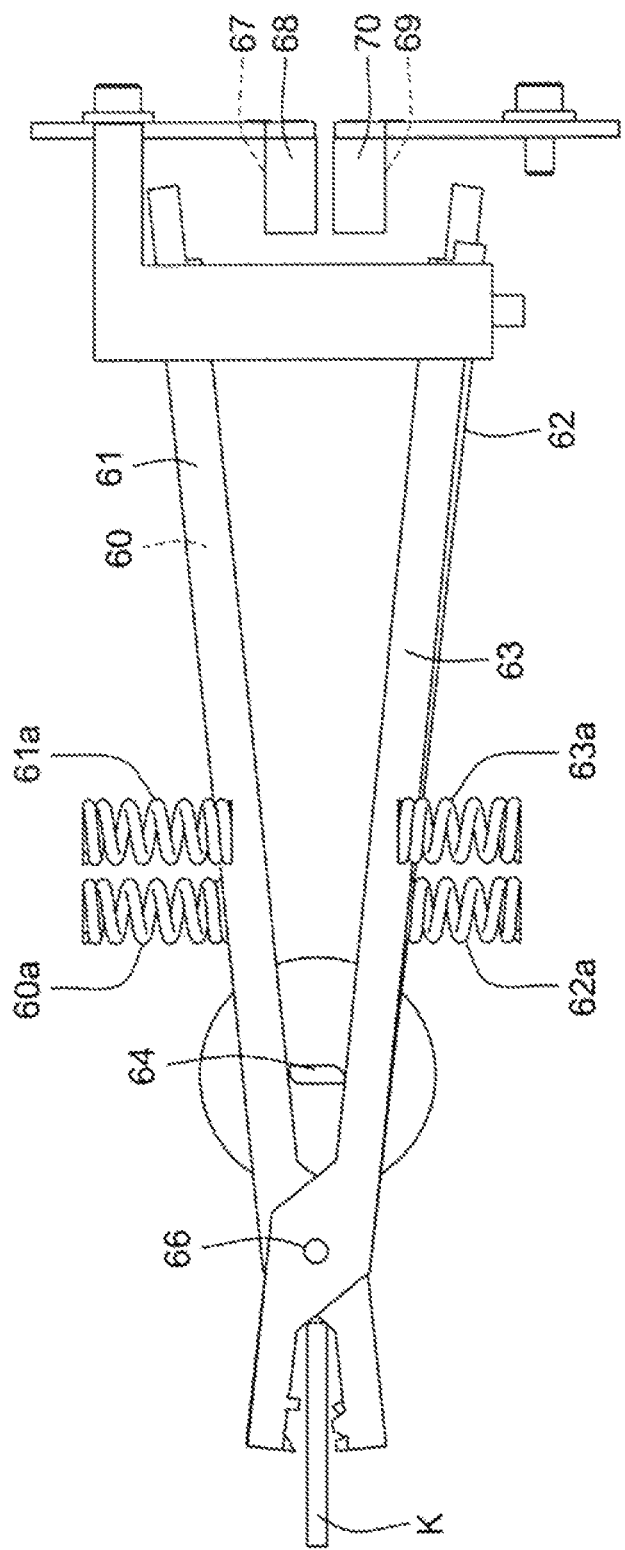
FIG. 30 is a further enlarged side elevation of the profile-matching gauges shown in FIG. 29 with the profile-matching gauges disengaged from the master key.

In the illustrative embodiment, the profile matching begins by engaging each side of the blade of the master key K with a plurality of gauges that correspond to the cross-sectional profile of one side of a specific type of key. Each gauge may have a profile that matches all or a portion of one of the grooves in a particular key type, or may simply sense the depth of the groove at a particular location that is common to several different key types, so that the combination of the depths at several different locations can be used to identify the key type. Referring to FIGS. 29 and 30, first and second gauges 60 and 61 extend through slots in the upper clamp 51 and are biased by springs 60a and 61a toward the upper surface of the master key K, and third and fourth gauges 62 and 63 extend through slots in the lower clamp 50 and are biased by springs 62a and 63a toward the lower surface of the master key K. A cam 64 has a first position (see FIG. 30) in which it holds the four gauges 60-63 in retracted positions while the master key is inserted and aligned, and a second position (see FIG. 29) in which the four gauges 60-63 are released to allow their biasing springs to move the gauges into advanced positions where they engage opposite sides of the master key K. The cam 64 is rotated between its first and second positions by a drive motor 65.

The four gauges 60-63 are all mounted for pivoting movement around a common shaft 66, for movement between their retracted and advanced positions. The left-hand ends of the four gauges 60-63, as viewed in FIGS. 29 and 30, are profiled to gauge the shape of the engaged surfaces of the blade of the master key K, and the right-hand ends of the gauges 60-63 move through four separate optical sensors 67-70 to detect the angular position of each gauge when it is engaging the master key. Each of the sensors 67-70 produces an output signal when the advanced position of its gauge corresponds to the cross-sectional profile of one of the preselected key types, which allows the matching gauge to pivot into the grooves that form the cross-sectional profile of the blade of the master key. This additional pivoting movement of a matching gauge causes the right-hand end of that gauge to move into register with its sensor, causing that sensor to produce a signal that is used by the kiosk controller to identify the type of master key in the clamp. Thus, each of the different preselected key types is identified by a different combination of output signals from the four sensors 67-70. The relatively small additional pivoting movement of the left-hand end of a gauge when it matches the profile of the key blade is amplified at the right-hand end of that gauge because of the longer lever arms of the gauges on the right side of the shaft 66.

If the combination of output signals from the four sensors 67-70 does not correspond to one of the preselected key types, the kiosk controller changes the display to the screen that informs the customer that the key inserted by the customer cannot be duplicated by the kiosk and that the customer should remove the key, and the master key clamp is released to permit removal of the key. If the combination of output signals does correspond to one of the preselected key types, the kiosk controller aligns that particular type of key blank in the key-blank magazine 80 with the key-blank extraction mechanism. If the magazine contains that type of key-blank in different styles, the particular style selected by the customer is aligned with the extraction mechanism.

Figure 31:
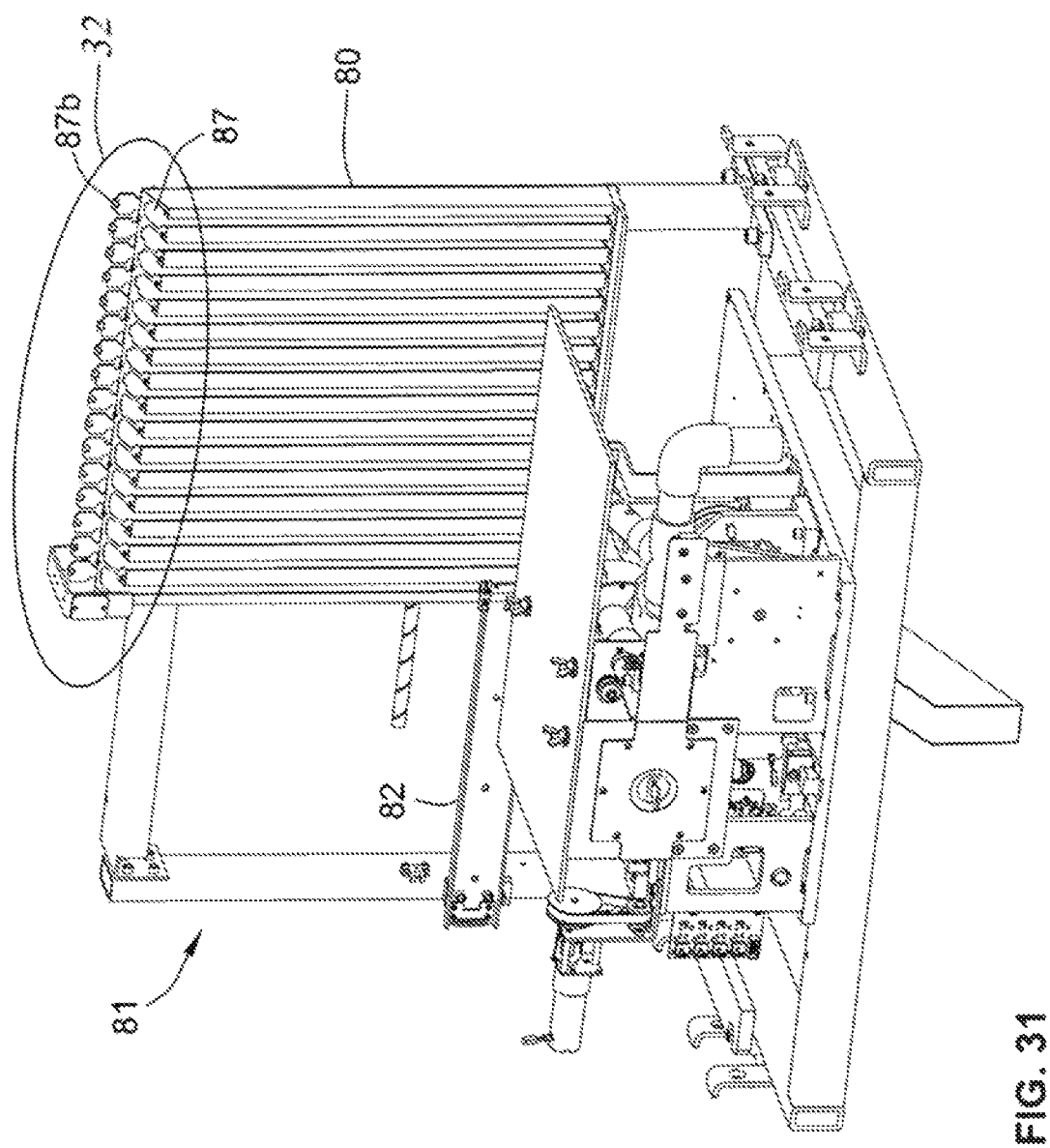
FIG. 31 is a front perspective view of the key-blank magazine and the key-entry door mechanisms in the kiosk of FIGS. 1 and 2.
Figure 41:
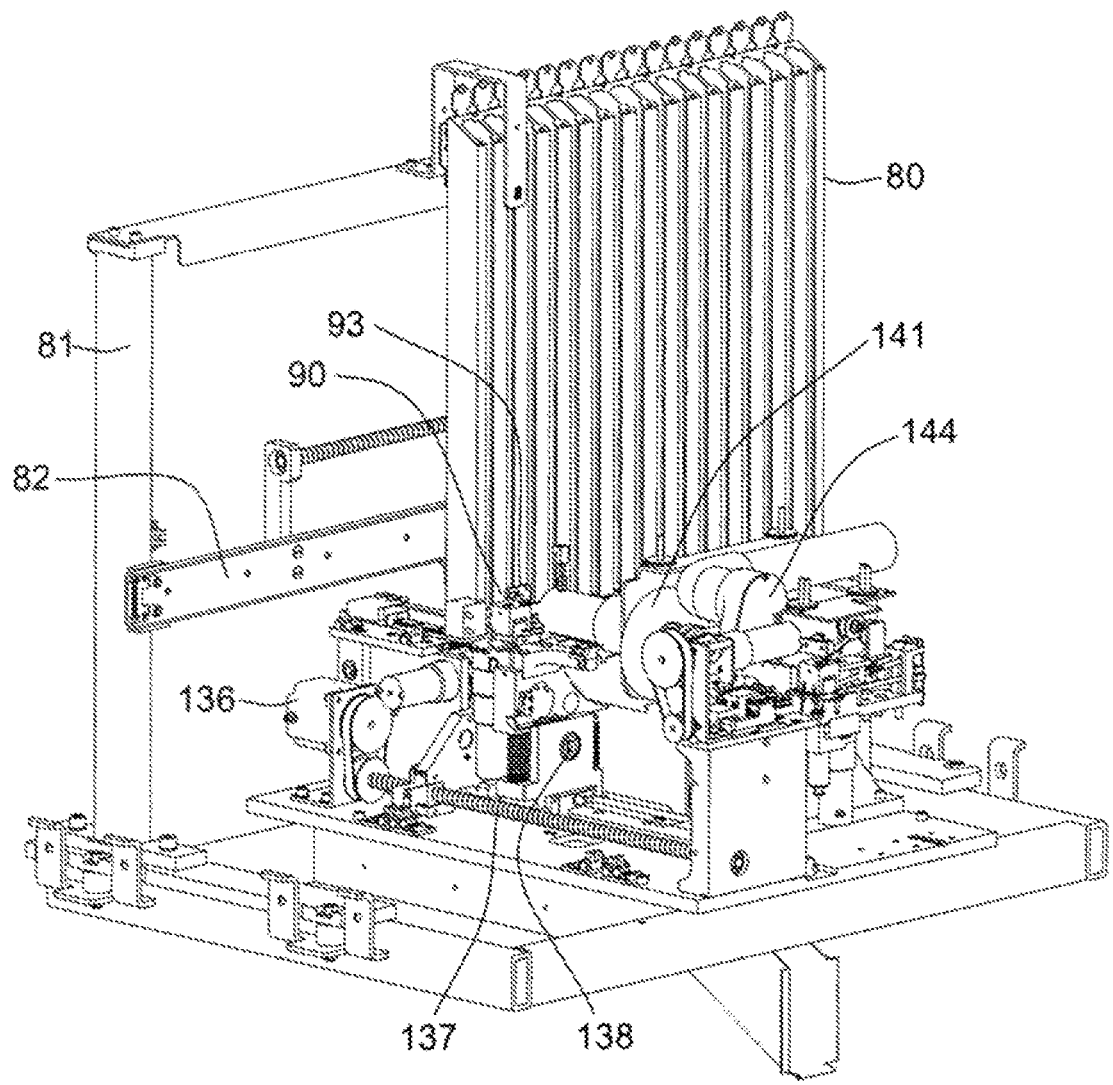
FIG. 41 is a front perspective view of the key-blank magazine and its transport mechanism, the key-blank clamping mechanism and carrier, the master-key clamping assembly and the cutting wheel and associated vacuum housing.
Figure 42:
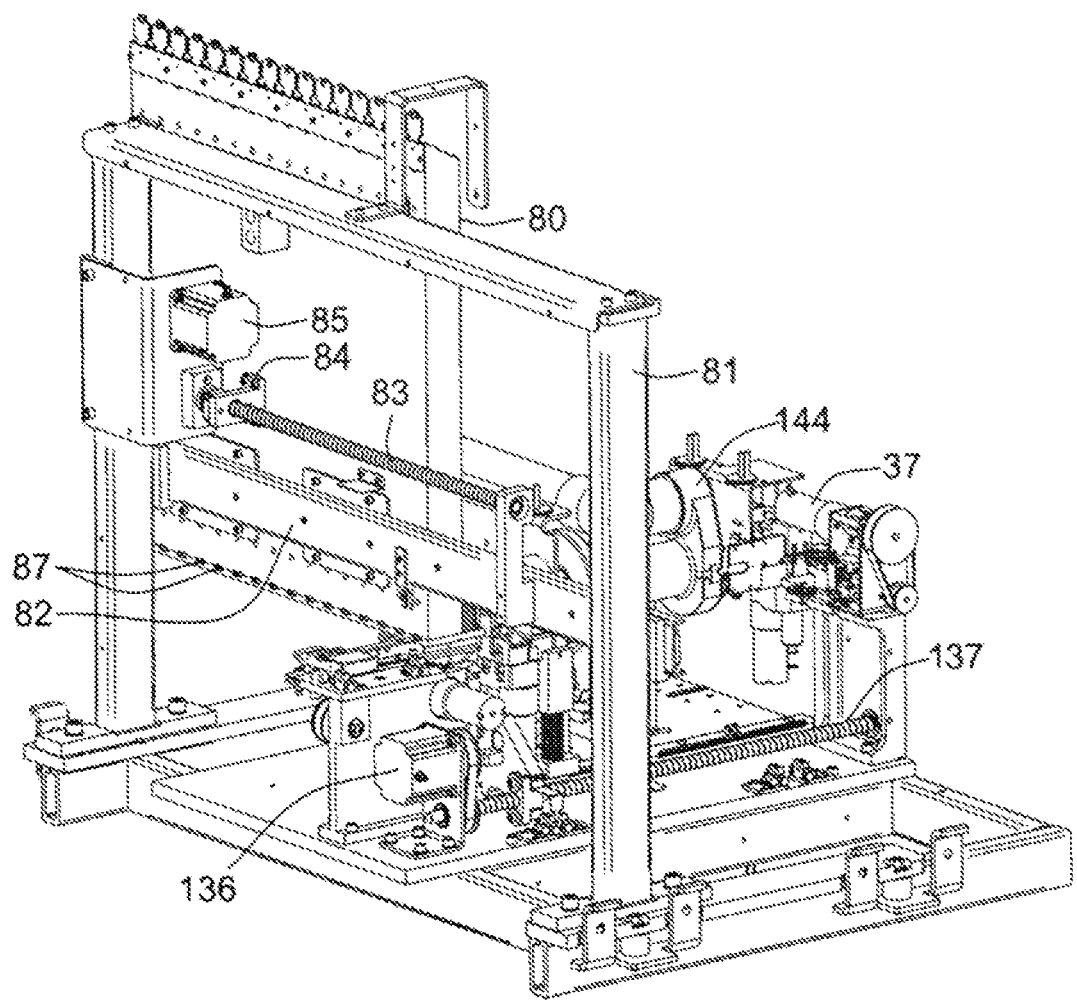
FIG. 42 is a top rear perspective view of the same mechanisms shown in FIG. 41.
Figure 43:
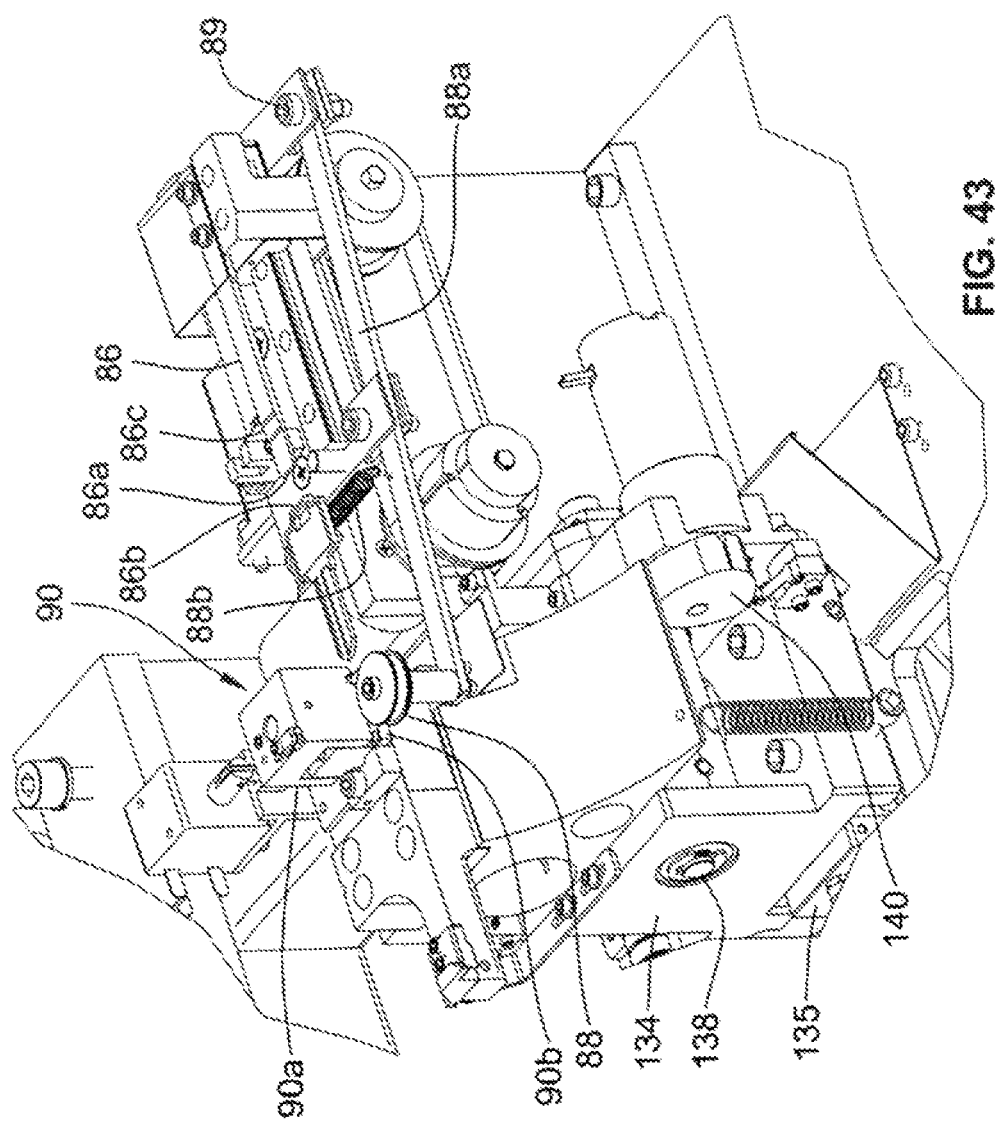
FIG. 43 is an enlarged perspective view of the mechanism for extracting a key blank from the key-blank magazine, with an extracted key blank about to engage the alignment and clamping mechanisms.
Figure 44:
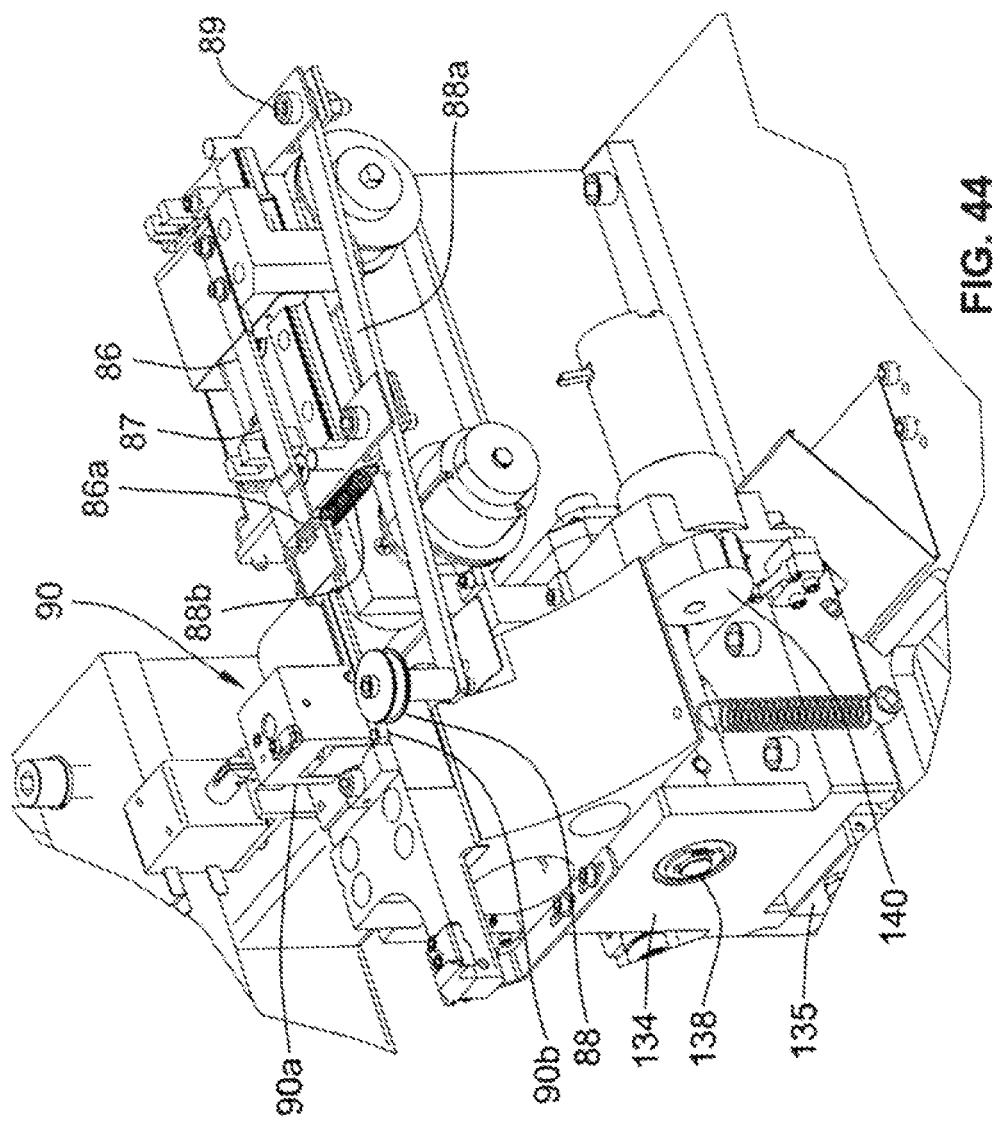
FIG. 44 is the same perspective view shown in FIG. 43 with the key-blank extraction mechanism engaging the extracted key blank and advancing that blank into the alignment and clamping mechanisms.

As can be seen in FIGS. 31 and 41-42, the key-blank magazine 80 is mounted for lateral movement on a frame 81 at the rear of the interior of the kiosk. The magazine 80 slides on a stationary horizontal rail 82 attached to the frame 81, and a drive screw 83 threaded through a bracket 84 projecting from the back of the magazine 80 is rotated by a reversible drive motor 85 (FIG. 42) to move the magazine 80 in either direction along the rail 82. After identification of the particular type of key blank needed to reproduce the master key, and the style selected by the customer, the kiosk controller energizes the motor 85 to move the magazine 80 to align that particular type and style of key blank with a key-blank extractor 86 (see FIGS. 43-46). The key blank B extracted from the magazine 80 is always the bottom key in the particular magazine compartment that contains a stack of key blanks of the type and style selected, and each magazine compartment has an aperture 87 in the back wall of the magazine to permit the extractor 86 to enter the magazine 80 and engage the lowermost key in the particular compartment that has been moved into alignment with the extractor.

The magazine 80 is also moved to pass each of the multiple vertical channels past an optical sensor 93 to detect when the supply of blanks in any channel drops below the level of the sensor, e.g., a height of 40 key blanks above the bottom of the magazine. As long as any given channel contains at least 40 keys, a light beam directed to the sensor 93 from a source behind the magazine 80 is interrupted by the stack of blanks in that channel. But when the supply of keys in a given channel drops below 40, the light beam is no longer interrupted, and thus the sensor 93 changes state to indicate that the supply of blanks in that channel is low and should be replenished.

In the illustrative embodiment, the extractor 86 is in the form of a flat bar that has a flat front end 86a that abuts a corresponding flat 86b on the top of each key blank. As a key blank B is pushed forwardly out of the magazine by the extractor 86, a taper 86c (see FIGS. 45 and 46) on the top surface of the extractor engages and slightly lifts the key blank directly above the blank being extracted to maintain a slight space between those two blanks, to avoid any drag on the blank being extracted from the weight of the stack of other blanks in that same compartment. This helps keep the extracted blank B moving along a straight line.

Figure 45:
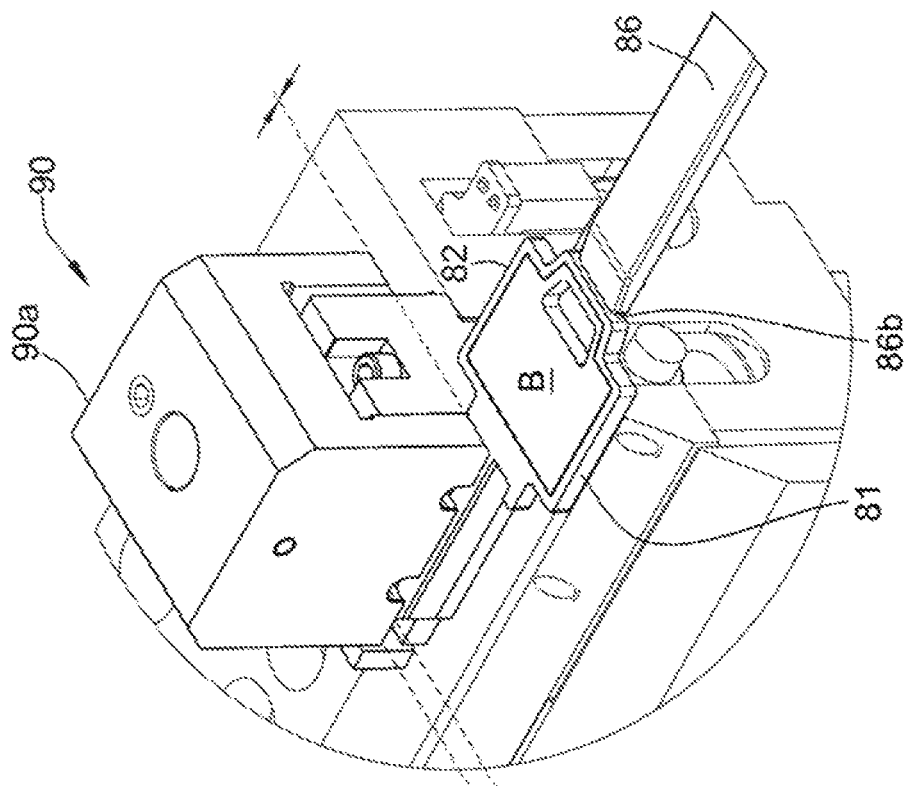
FIG. 45 is an enlarged perspective view of the key-blank clamping assembly with the extracted key blank fully inserted and the clamping mechanism still open.
Figure 46:
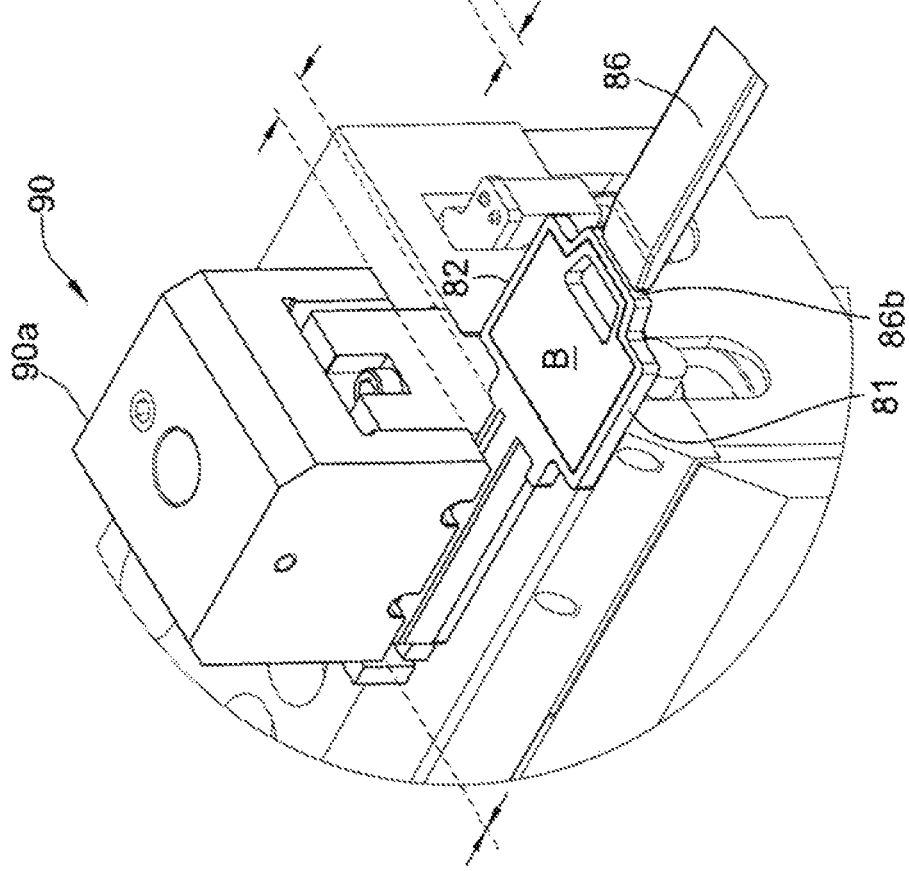
FIG. 46 is the same perspective view shown in FIG. 45 with the clamping mechanism closed to clamp the extracted key blank.
Figure 47:
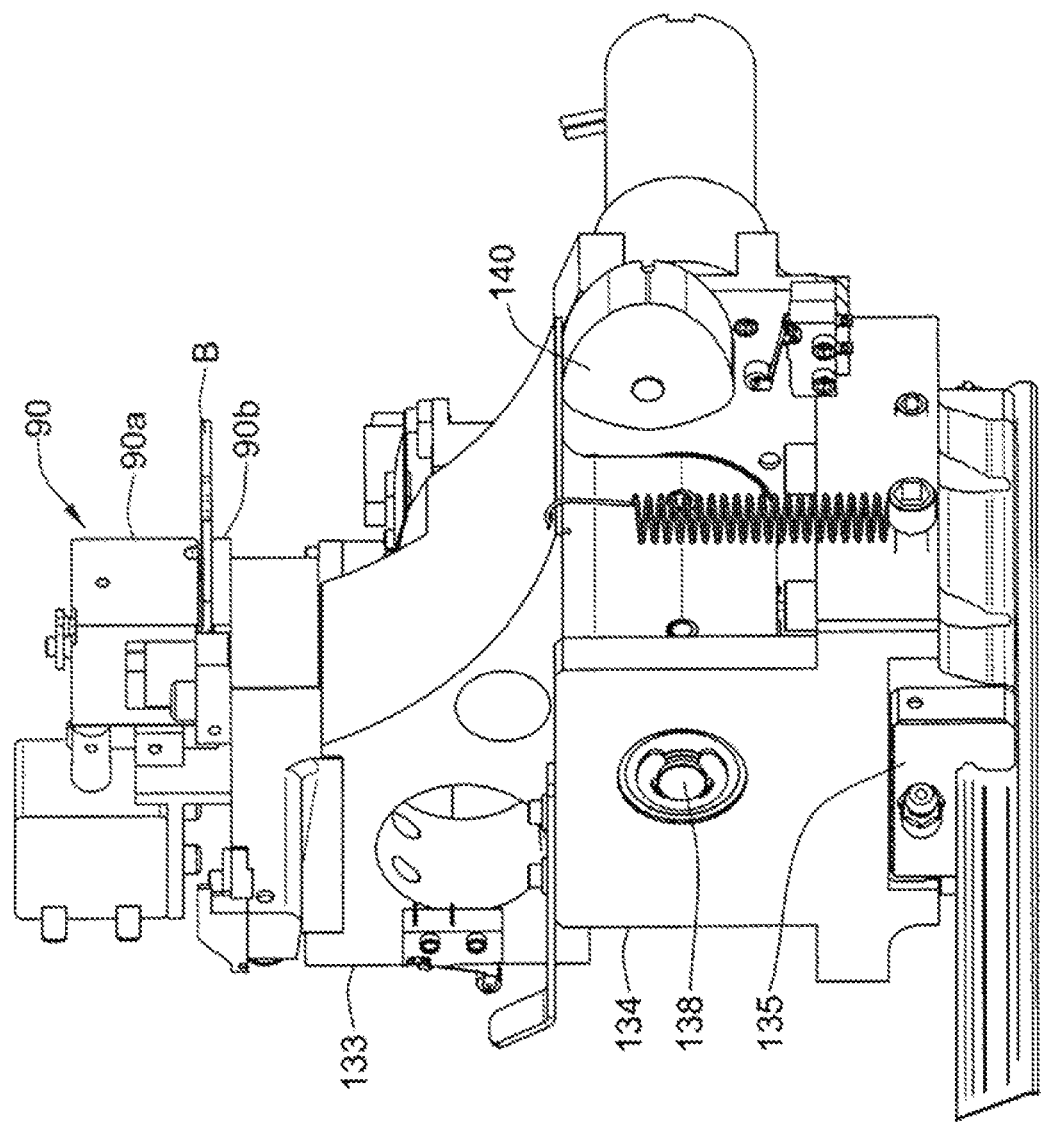
FIG. 47 is an enlarged perspective view of the key-blank clamping assembly clamping an extracted key blank, the base on which the clamping assembly is mounted, the carrier on which the base is mounted, and the cam mechanism for pivoting the base.

Referring to FIGS. 45 and 46, the key blanks preferably have special features that enable the controlled, accurate and precise movement of keys from manufacturing to cutting. As already mentioned, the head of the key blank B has a flat end surface 86b for engaging the flat front and surface 86a of the extractor 86. In addition, the head of the key blank B has long straight parallel sides 81 and 82, and a preselected width that does not exceed the width of the magazine channel. All these features are used to help guide the key blank B along a straight path as the blank is moved out of the magazine and into the clamping mechanism for the extracted blank.

Figure 32:
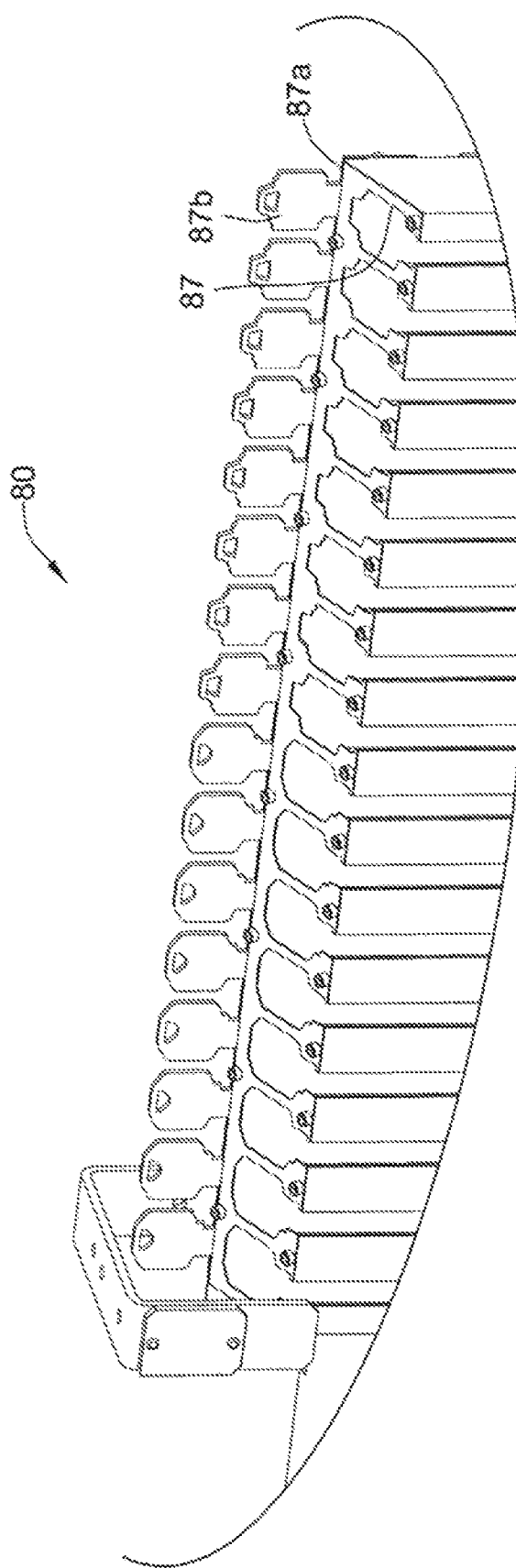
FIG. 32 is an enlarged front perspective view of the top of the key-blank magazine.
Figure 34:
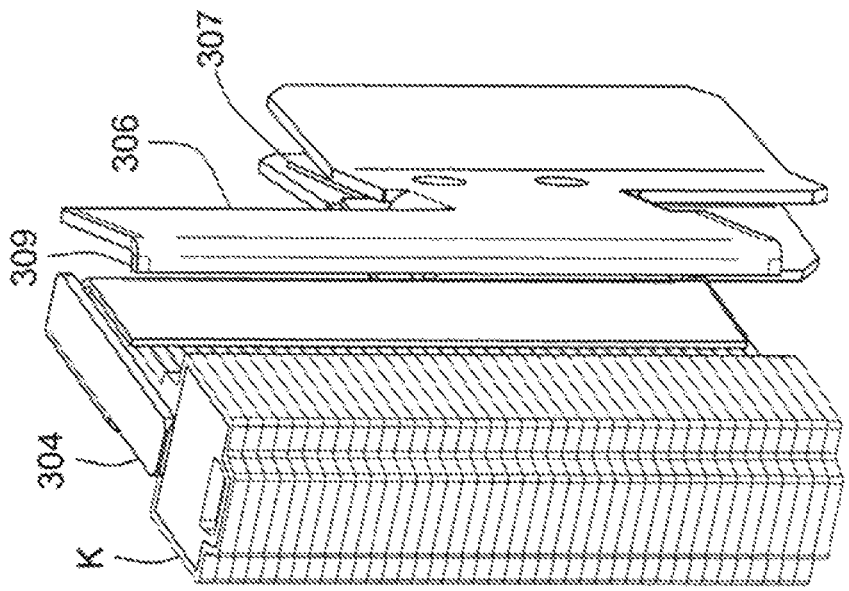
FIG. 34 is the same perspective view shown in FIG. 33, with the stack of key blanks engaged by the tool.
Figure 33:
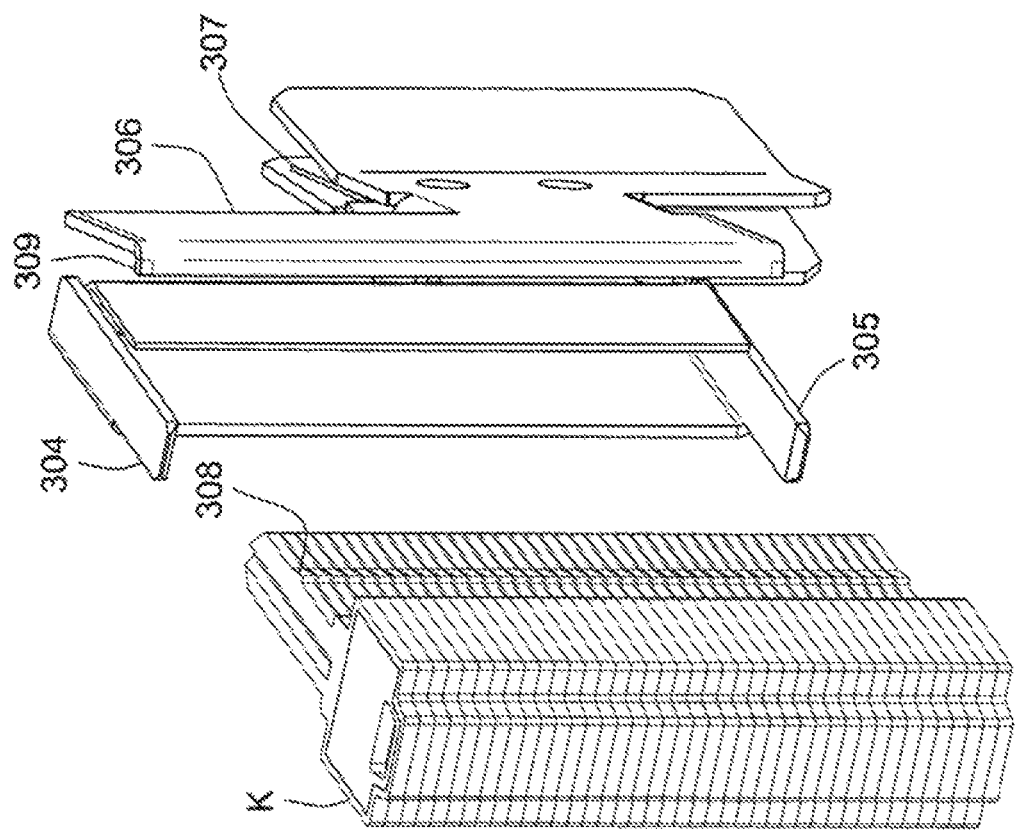
FIG. 33 is a perspective view of a stack of key blanks and a tool for loading the stack of key blanks into the key blank magazine.

To avoid errors when loading the key blanks into the magazine 80, such as inserting a particular type of blank or style of blank into the wrong compartment, and/or inserting a blank upside down in the correct compartment, the blanks have specific features that physically block any given blank from entering the wrong compartment and also block a key from entering the correct compartment but up-side-down. For example, as can be seen in FIGS. 31 and 32, key blanks are loaded into the magazine from the top of each compartment, and the access opening 87 at the top of each compartment is profiled to permit only blanks that match the profiled opening to be loaded into that compartment. The features used to distinguish the different types of blanks from each other for the loading profiles are primarily the shapes and dimensions of the head portions of the blanks.

To assist in the loading of different styles of blanks of the same type, a cavity 87a is provided at the top of the rear surface of each compartment to receive a sample 87b of the blank to be loaded into each compartment, as shown in FIGS. 31 and 32. Thus, the person loading the blanks can simply look at the samples to determine which compartment is to be loaded with blanks of any given style for any given type of blank.

To expedite the loading of the key blanks, the manual loading tool shown in FIGS. 33-38 can be used to quickly remove the entire contents of a box of blanks and load them into the magazine 80 as a single unit, in a one-step operation. This tool has a compartment 300 that is open at one end for receiving the blade portions of a batch of a predetermined number of blanks, e.g., 40 blanks, packaged in a box 301. The blanks are preferably packaged so that the entire stack of blanks in any given box has a dimension that matches the width of the tool compartment 300. That is, a box of thinner blanks will contain more blanks than a box of thicker blanks, so that the overall dimension of the stacked thicknesses will be substantially the same for all boxes even though they contain different types of blanks. This permits the use of a single universal tool.

The box 301 has spacers at opposite ends of the packaged batch of blanks to provide spaces for receiving a pair of tabs 304 and 305 projecting from opposite ends of the compartment 300. All the keys in a given box have the same orientation and length. A spring-loaded gripper 306 is manually opened slightly while the tabs 304, 305 are inserted into the box of blanks, and then released so that the spring 307 closes the gripper 306 against the entire batch of key blanks. A small bump 308 is formed on the top edge of the blade of each key blank when it is manufactured, and these bumps are engaged by a lip 309 on the free end of the gripper 306 to enable the entire batch of blanks to be captured and held together within the tool as they are removed from the box, transferred to the magazine, and loaded into the magazine. If a blank is oriented in the wrong direction, it will not be gripped and likely will drop out of the gripped stack, thereby avoiding the loading of that blank into the magazine. The bump 308 on each blank is ultimately removed as a part of the cutting operation that forms the desired tooth profile in the blank within the kiosk, as described in detail below.

FIGS. 35-38 show a key blank 400 custom made for use in the illustrative kiosk. For home and office keys, the shoulder 401 typically is the reference location for the X-direction (longitudinal direction). The shoulder 401 is typically referred to as the "top" shoulder in the key industry because it is on the toothed side of the key, which is normally the top edge of the key when it is inserted in a lock. This is the reference "stop" when a key is used in a lock and thus should also be used during duplication.

There are many key blank and key machine manufacturers, and they can and do manufacture their keys with different lengths and bottom shoulder locations. As such, conventional home and office key duplication theory discourages the referencing of key blanks using the bottom shoulder and/or the tip of the key, as it may result in keys that do not function. However, in the illustrative kiosk, the bottom shoulder and the tip of the extracted key blank are used as reference locations because the dimensions of the key blanks are controlled during the custom manufacture of those blanks. Specifically, the distance between the top shoulder and the tip, and the distance between the top shoulder and the bottom shoulder, are both controlled so that these dimensions may be used to control the position of a blank as it is automatically manipulated within the kiosk to ensure that the top shoulder of the blank is aligned in the correct location before that blank is cut.

Referring to FIGS. 39-46, as a blank B is pushed out of the magazine 80, the blade of the extracted blank enters a clamp assembly 90 that is similar in operation to the clamp assembly described above for the master key. As the extracted blank B is pushed into the slot between the upper clamp 90a and the lower clamp 90b, the outboard (top) edge of the blade of the key blank engages a guide roller 88 that has a circumferential channel or groove for ensuring proper guidance and alignment of the blank in the clamp assembly 90. The guide roller 88 is journaled on the end of an arm 88a that is pivotably attached to the kiosk frame at 89 and is biased to pivot toward the clamp assembly 90 by a spring 88b. The arm 88a passes through a sensor 88c that indicates when it is moved outwardly by a key blank, to produce a "Blank Present" signal that is sent to the kiosk controller (see FIGS. 43 and 44).

The clamp assembly 90 is open while the extracted key blank B is being advanced between the upper and lower clamps 90a, 90b, and an optical sensor in the clamp assembly 90 detects the entry of the blank into the clamp assembly and produces a "Blank Present" signal that is sent to the kiosk controller. The optical sensor 91 is built into the clamp assembly 90. Specifically, a light source 91a is built into the lower clamp 90b and a photodetector 91b is built into the upper clamp 90a, with the light beam passing through the key-blank slot between the two clamps. Thus, when the key blank being extracted enters between the two clamps 90a and 90b, the sensor is tripped by interruption of the light beam.

The final position at which the key blank B stops within the clamp assembly 90 is determined by one of two or more different stops. For longer key blanks, the tip of the blade of the key blank engages a stop block 92 on the front side of the clamp assembly 90. For shorter key blanks, the left-hand (bottom) shoulder of the key blank, as viewed from the front of the kiosk, engages the rear side wall of the lower clamp 90b. After the key-blank extractor 86 has reached its most advanced position, and the "Blank Present" signal is still present, the clamp assembly 90 is closed by lowering the upper clamp 90a, in the same manner described above for the master key clamp assembly, to press the key blank tightly down against the lower clamp 90b. The key blank is then ready to be cut to reproduce the clamped master key.

Figure 54:
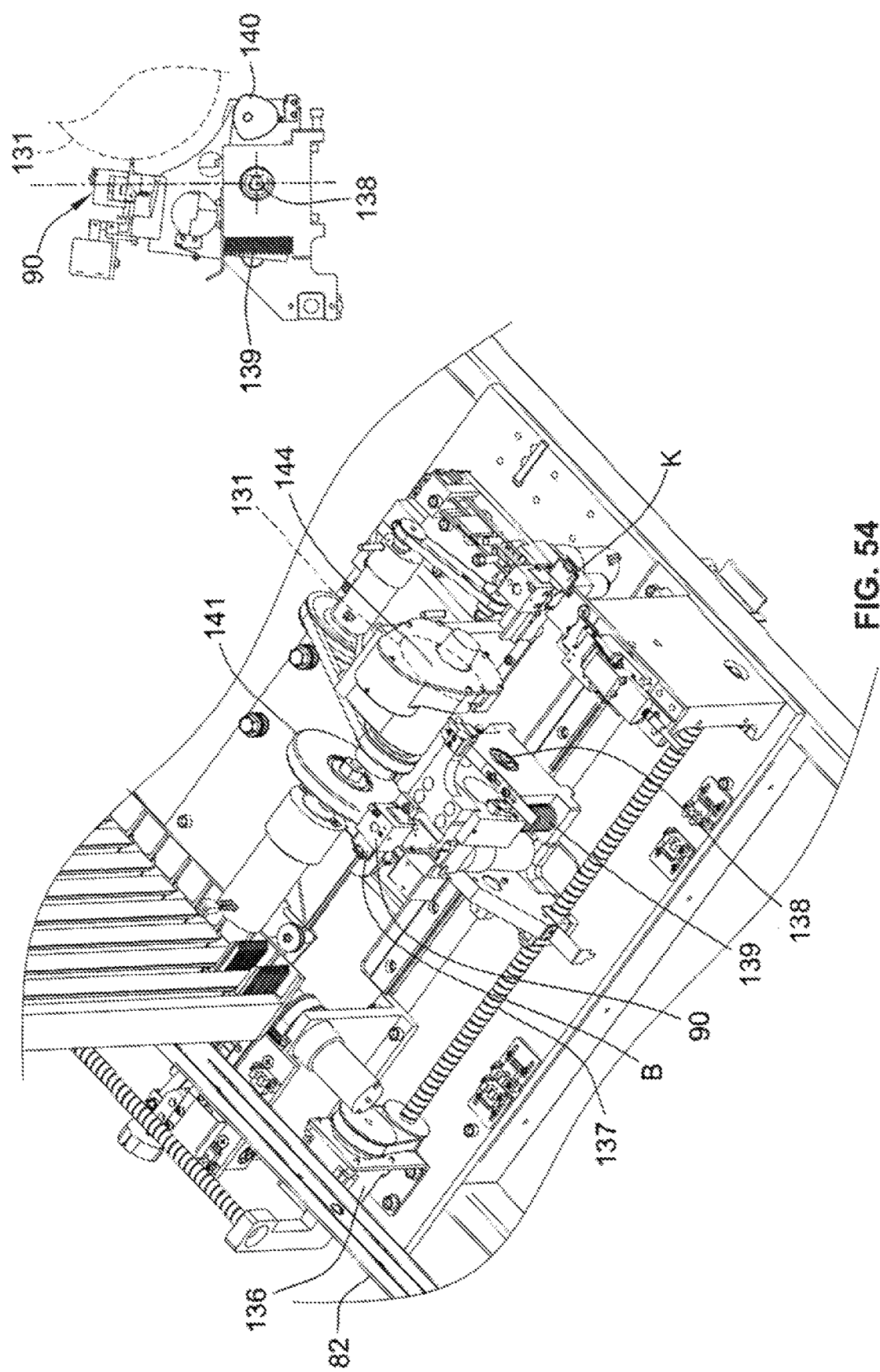
Figure 55:
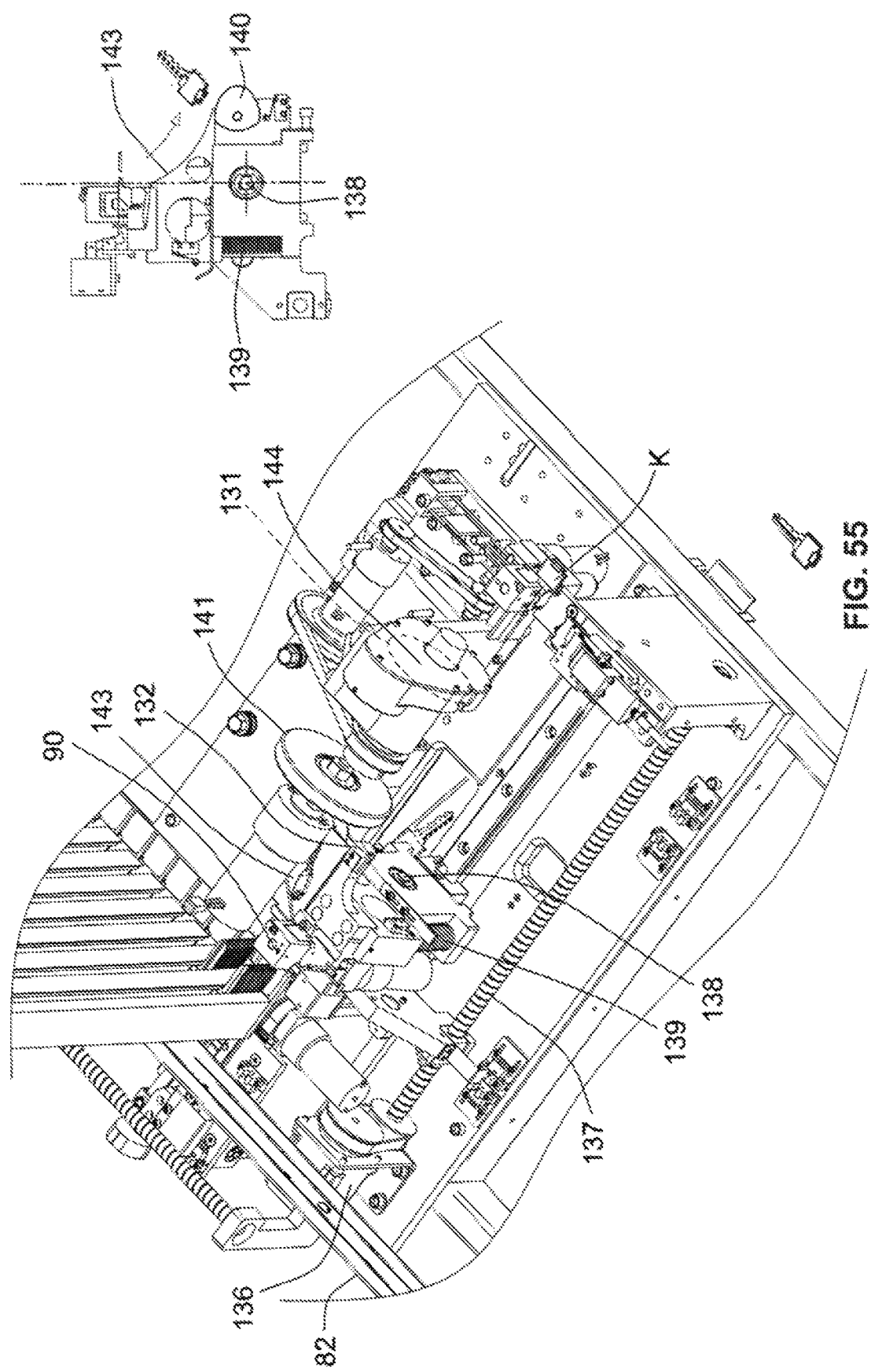
Figure 56:
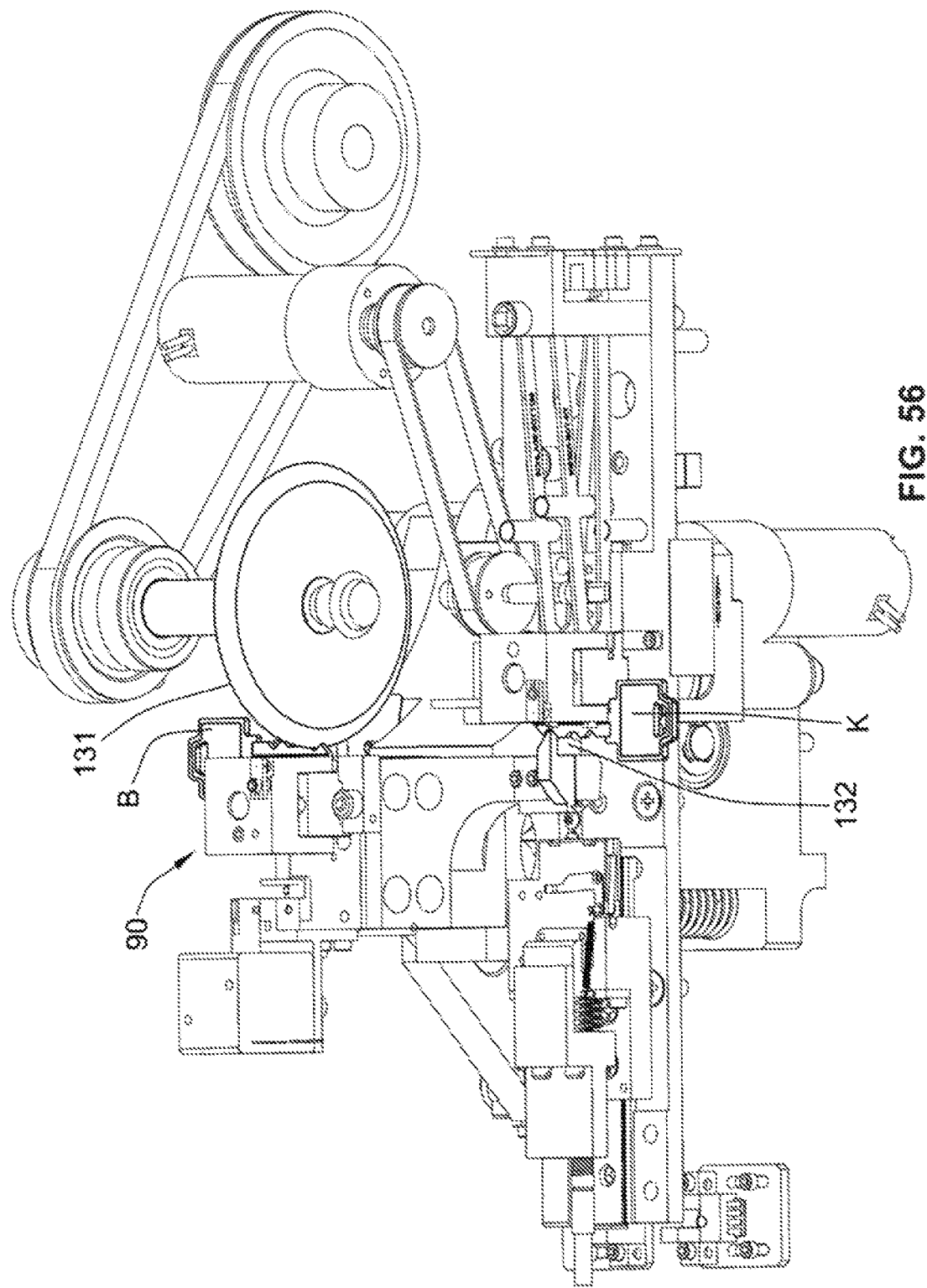
FIG. 56 is an enlarged top front perspective of a master key and a key blank in their respective clamping assemblies during a key-duplicating operation.
Figure 57:
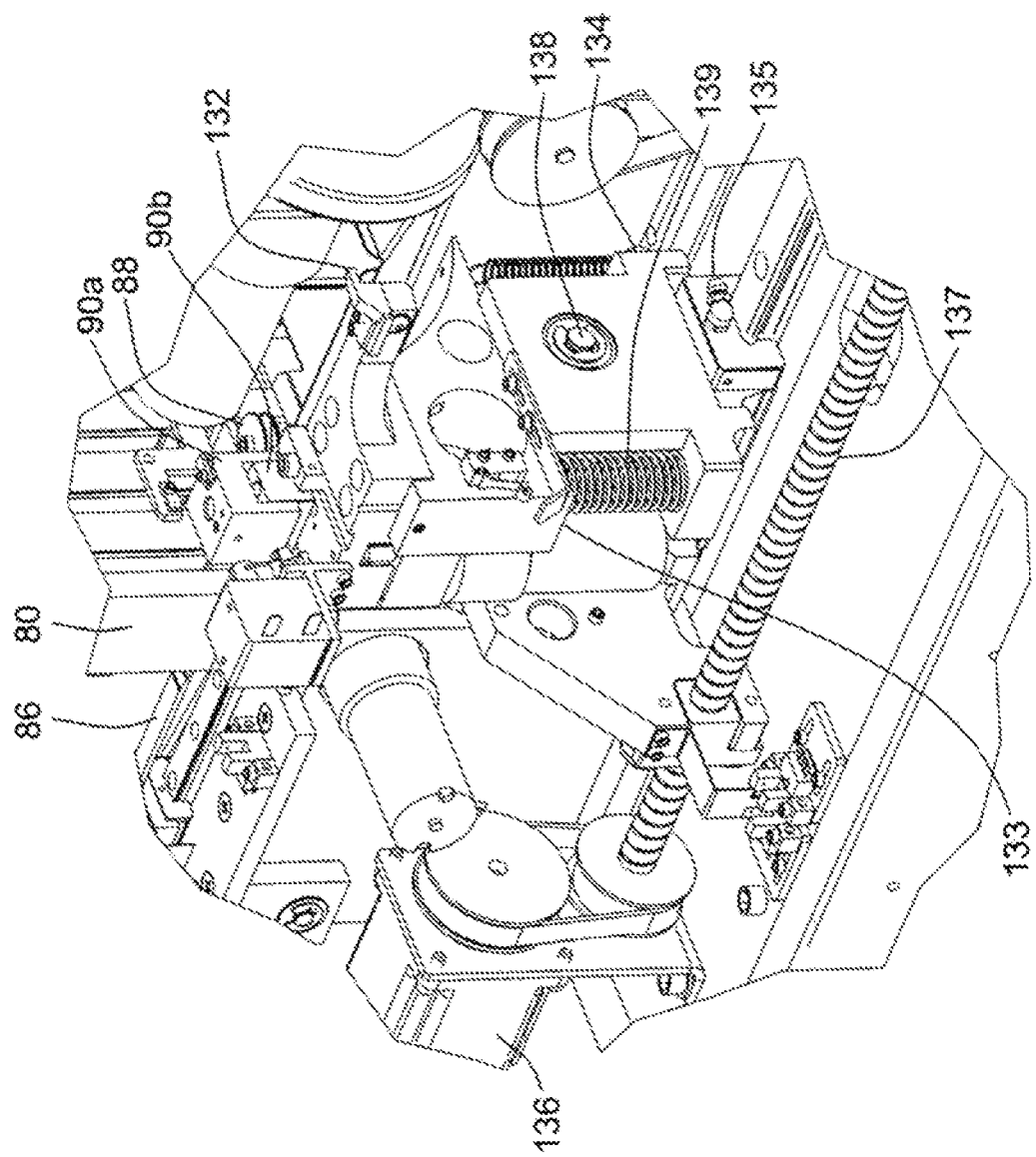
FIG. 57 is an enlarged perspective view from the front of the left-hand side of the key-blank clamping assembly, base, carrier and transport mechanism.
Figure 58:
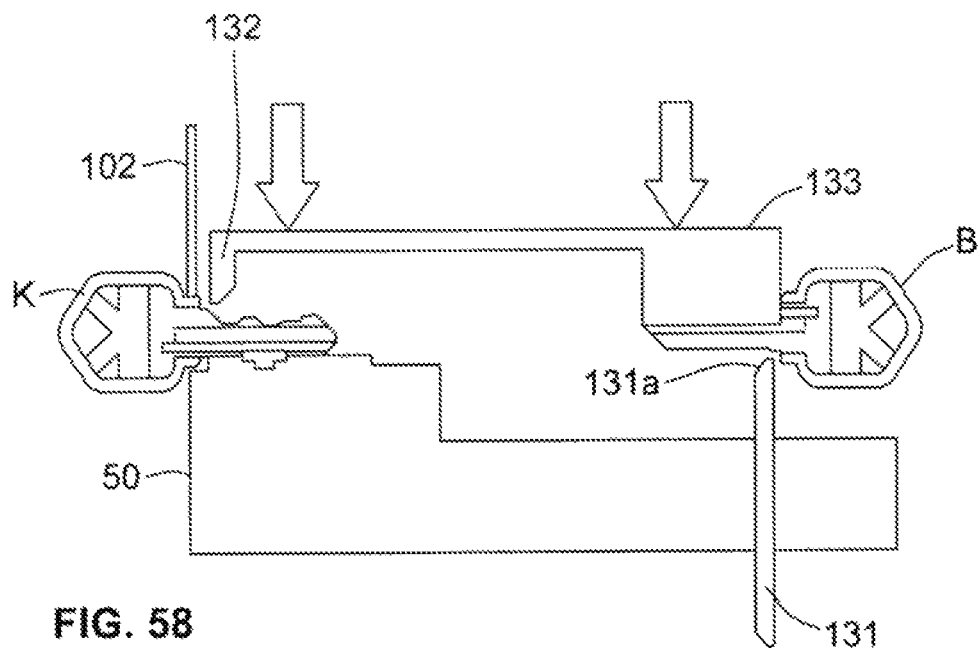
FIG. 58 is a diagrammatic plan view of a master key clamped for engagement by a follower and a key blank clamped to be cut to reproduce the tooth profile of the master key.
Figure 59:
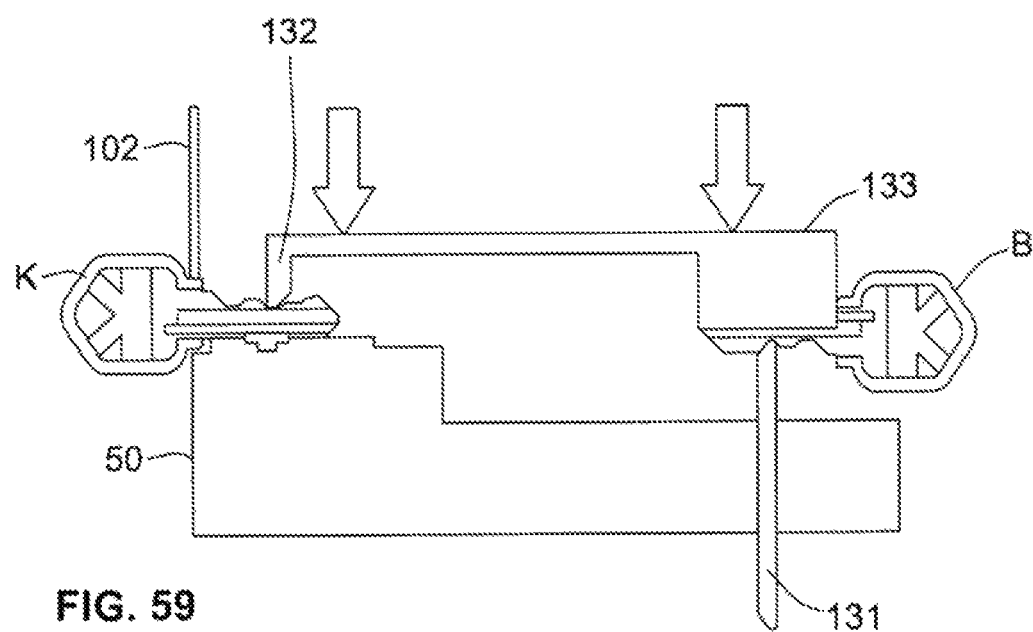
FIG. 59 is the same diagrammatic plan view as FIG. 58 with the follower moved about halfway along the teeth of the master key, and with the teeth already passed by the follower cut in the key blank.

Referring next to FIGS. 48-59, the edge of the key blank B that protrudes from the clamp assembly 90 is cut by a cutting wheel 131 (see FIGS. 56 and 58-59). During the cutting of the selected key blank, the master key and the cutting wheel 131 remain in fixed positions, while the key blank B to be cut and a follower 132 for tracing the tooth pattern on the master key move as a single unit along an axis that is parallel to the axes of the blades of the clamped master key K and the clamped key blank B. Specifically, the key-blank clamp assembly 90 and the follower 132 are both mounted on a base 133, which in turn is mounted on a carrier 134 that is driven along a rail 135 by a motor 136 that turns a drive screw 137 threaded through the carrier 134. Movement of the carrier 134 along the rail 135 moves both the key-blank clamp assembly 90 and the follower 132 in unison along an axis parallel to the axes of the blades of the clamped key and key blank. To permit movement of the blank clamp assembly 90 and the follower 132 in a direction substantially perpendicular to the axes of the blades of the clamped key and key blank, the base 133 is mounted on a shaft 138 journaled in the carrier 134, with a spring 139 urging the base 133 to pivot about the shaft 138 in a clockwise direction as viewed in FIGS. 48-55. This spring bias on the base 133 enables the follower 132 to follow the tooth pattern of the master key K, and enables the clamped key blank B to follow the pattern of movement of the follower 132 as the follower traverses the length of the blade of the master key K. Thus, the cutting wheel 131 cuts a tooth pattern in the clamped key blank B that reproduces the tooth pattern of the master key K, as depicted in FIGS. 58 and 59.

As can be seen in FIGS. 58 and 59, the cutting wheel 131 is oriented with an angled edge 131a facing the clamped key blank B. FIG. 59 shows the system in mid-operation with a portion of the tooth profile of the master key K already reproduced in the key blank B.

Figure 48:
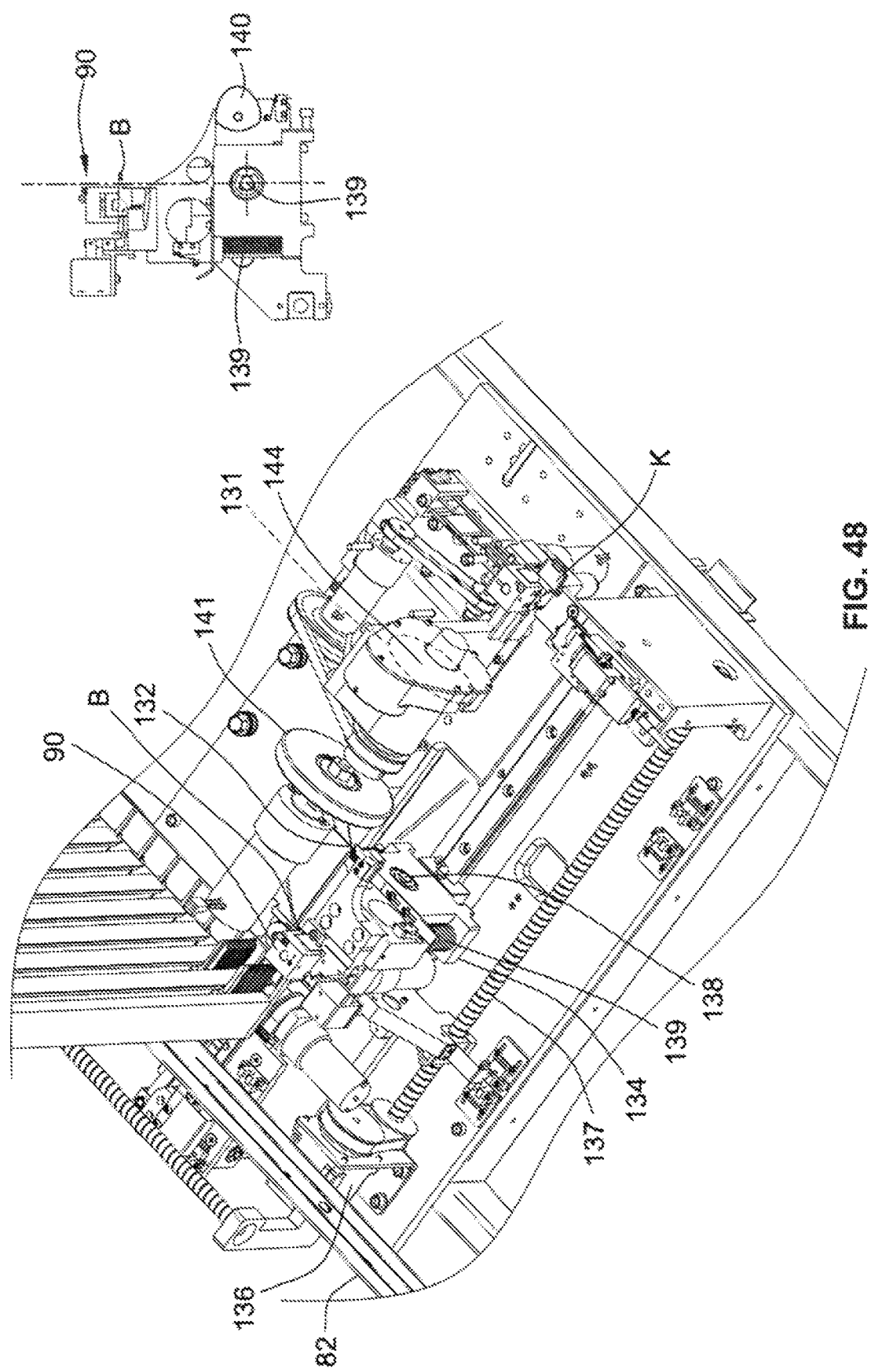
FIGS. 48 through 55 are perspective views of the key-duplicating mechanisms in successive stages of a duplicating operation, with a reduced end elevation showing the angular position of the key-blank clamping assembly and its base in each stage.
Figure 49:
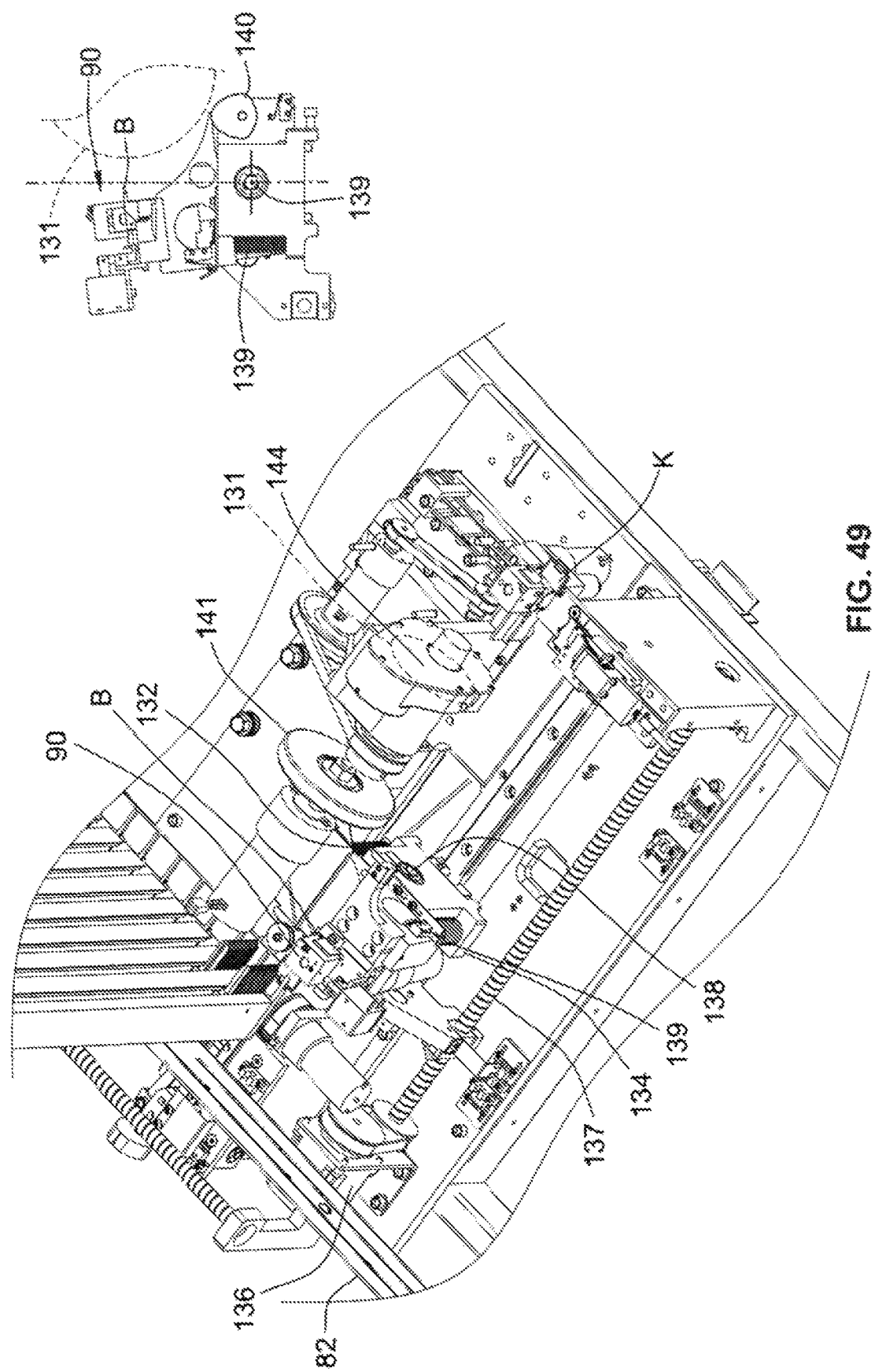

When the follower 132 is not aligned with the master key K, pivoting movement of the base 133 about the shaft 138 is limited by a cam 140, as shown in FIGS. 48-55. In addition, the cam 140 can be rotated to different positions to pivot the base 133, about the shaft 138, to retract the follower 132 and the key-blank clamp assembly 90 to positions where the follower 132 and the key blank B cannot engage the master key K and the cutting wheel 131, respectively. The different angular positions of the cam 140, and thus the base 133, during different stages of a key-duplicating process, are shown in FIGS. 48-55. In FIGS. 30-48, the cam 140 is in its intermediate position where the base 133 is level, while the extracted key blank Bis being clamped. In FIG. 49, the cam 140 is in its high position where the base 133 is tilted back, away from the cam 140 and against the bias of the spring 139, while the carrier 134 moves the clamped key blank into alignment with the cutting wheel 131 and the follower 132 into alignment with the clamped master key K and moves the follower 132 along the master key.

Figure 50:
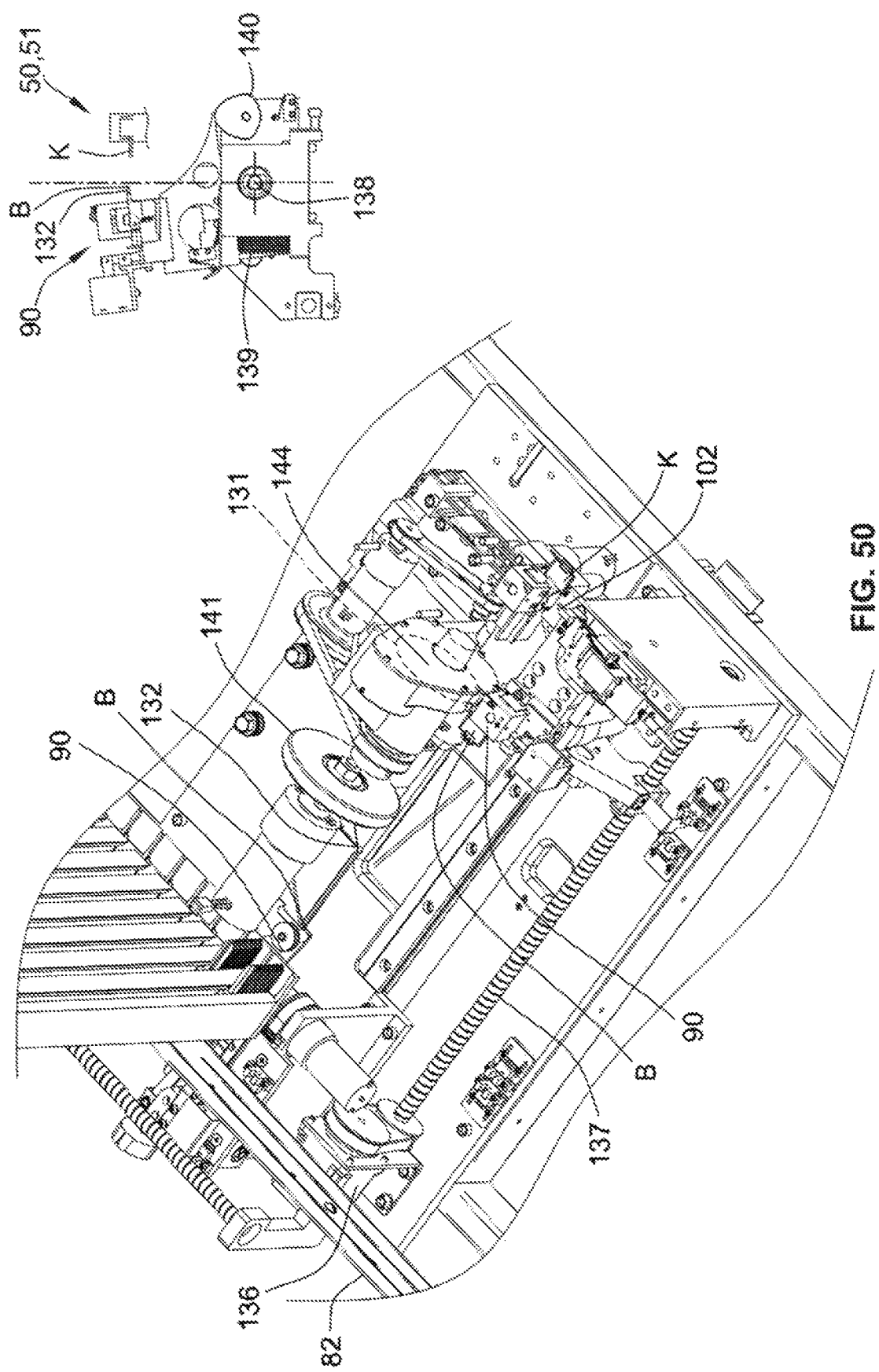
Figure 51:
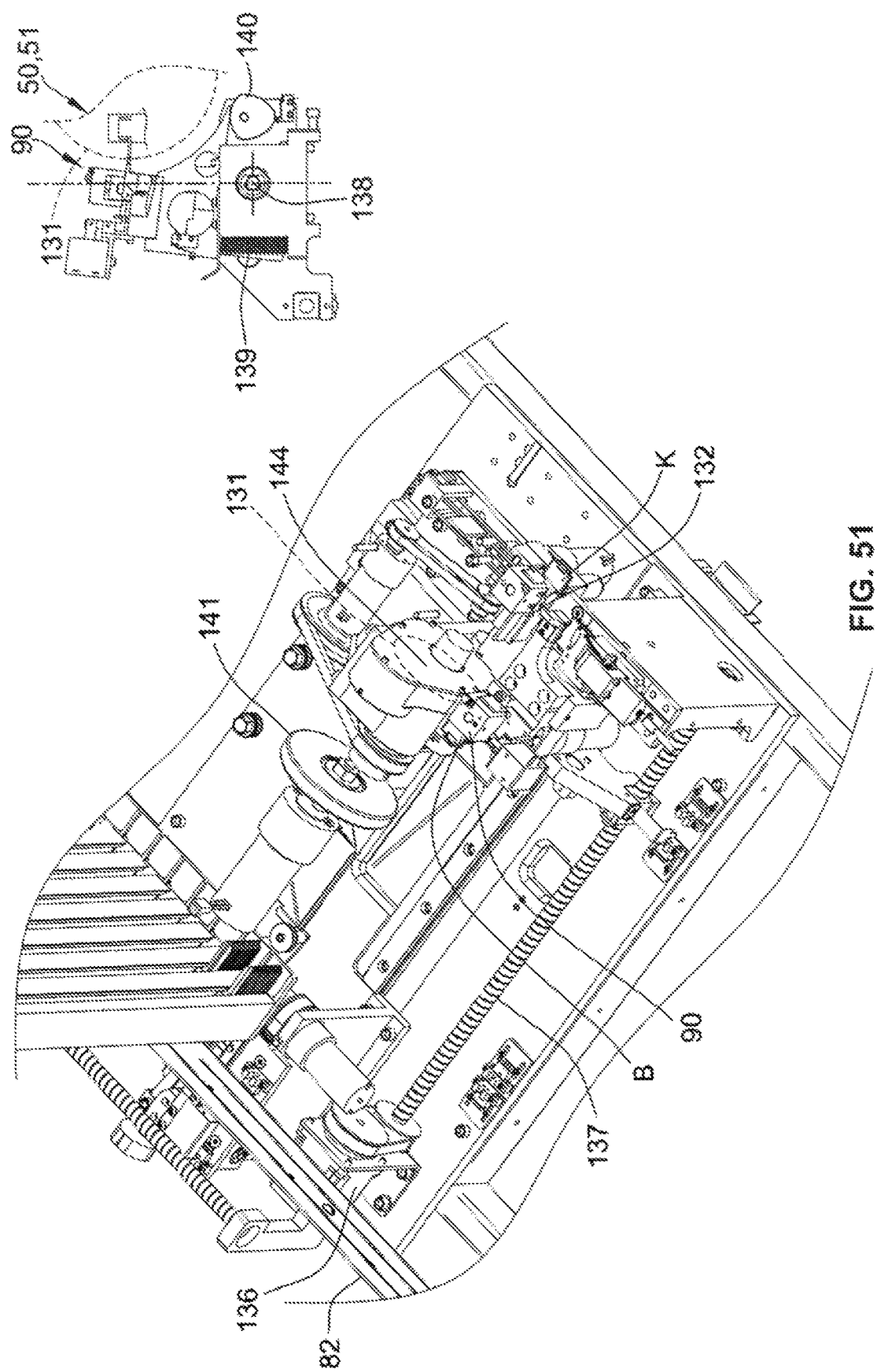
Figure 52:
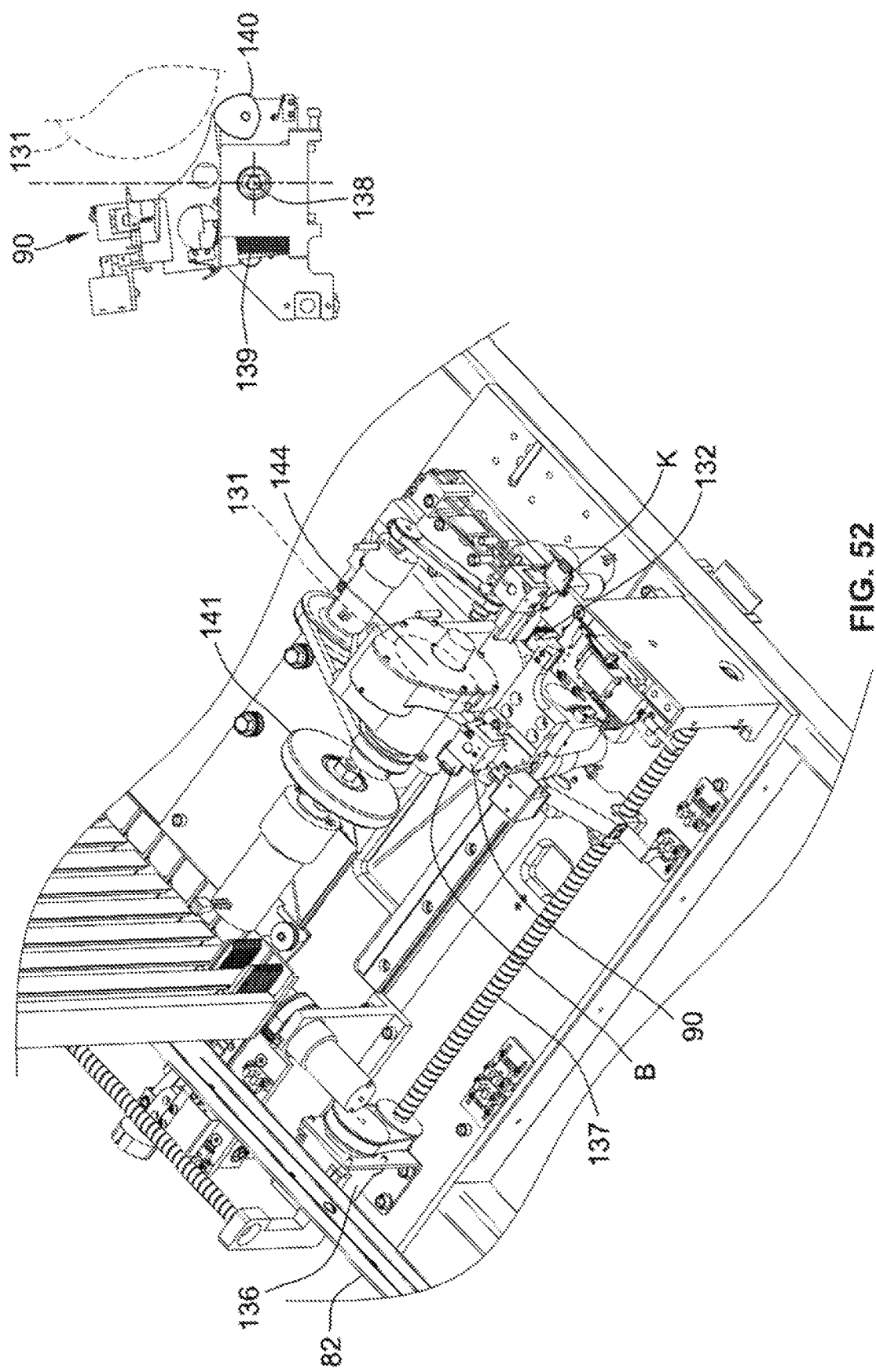

FIG. 50 shows the clamped key blank B aligned with the cutting wheel 131 and the follower 132 aligned with the master key K, with the cam 140 still in its high position. In FIG. 51, the cam 140 is in its low position where the base 133 is tilted forward, toward the cam 140, so that the spring 139 urges the key blank B against the cutting wheel 131, and also urges the follower 132 against the master key K, while the carrier 134 moves the follower along the blade of the master key K, and the blade of the key blank B across the cutting wheel 131, to cut a tooth pattern in the key blank that reproduces the tooth pattern of the master key. The tooth profiles of the clamped master key K and the clamped key blank B can be seen more clearly in the enlarged top plan views of this key-duplicating operation in FIGS. 58 and 59.

Figure 53:
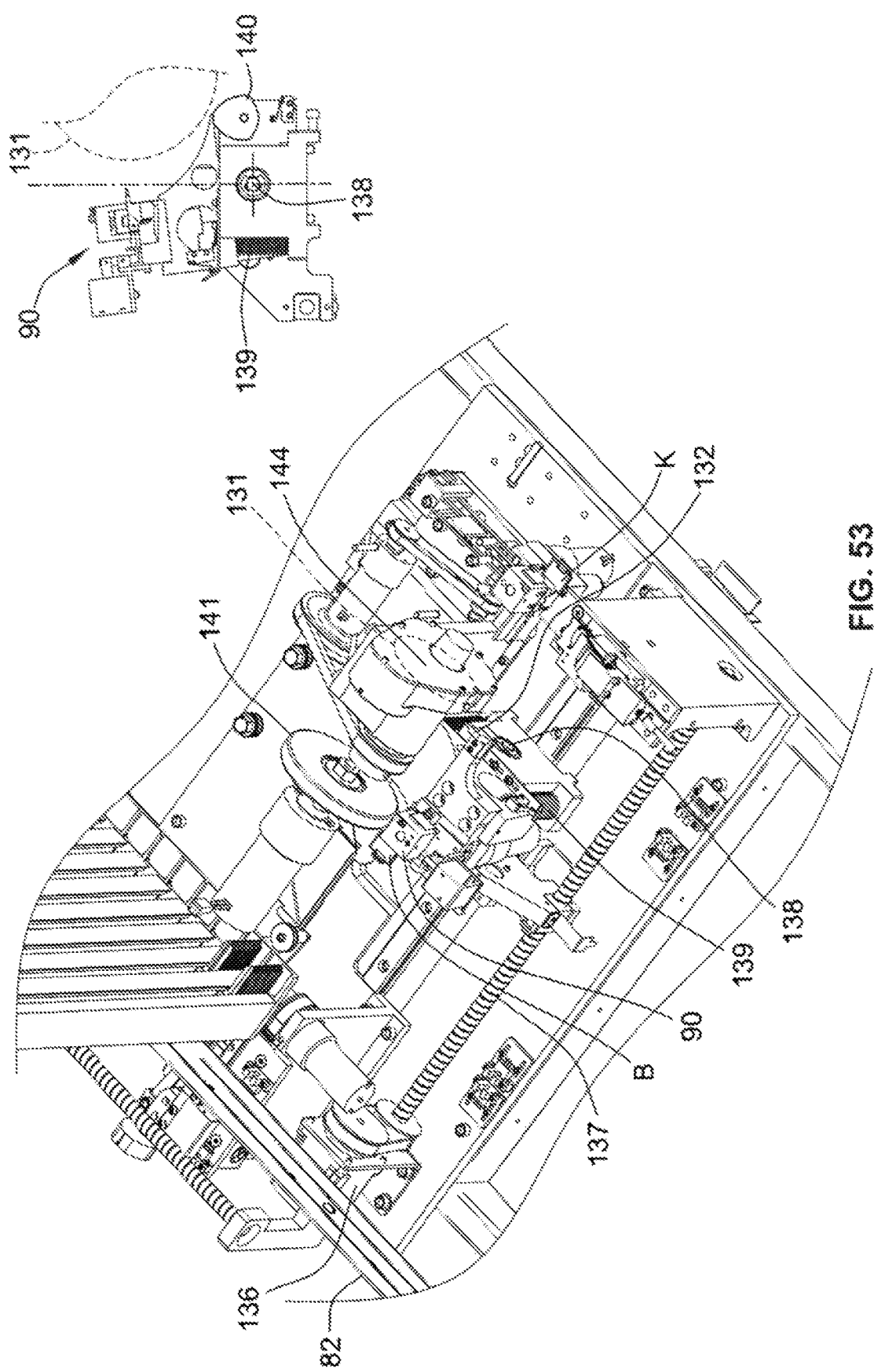

In FIG. 48, the cam 140 is in its intermediate position where the base 133 is level, while the extracted key blank B is being clamped. FIG. 53 shows the cut key blank B aligned with the de-burring (e.g., wire-brush) wheel 141, with the cam 140 is still in its high position. In FIG. 54, the cam 140 has been returned to its low position where the base 133 is tilted toward the cam 140, while the de-burring wheel 140 is driven to clean debris from the freshly cut teeth. After de-burring, the duplicate key is discharged from the clamp assembly by opening the clamp and energizing a solenoid to move an ejector pin 142. In FIG. 55, the carrier has been returned to its starting position where the key blank was first clamped. The ejected duplicate key slides down a dispensing chute 143 into the duplicate-key output tray 15 in the front of the kiosk.

Figure 60:
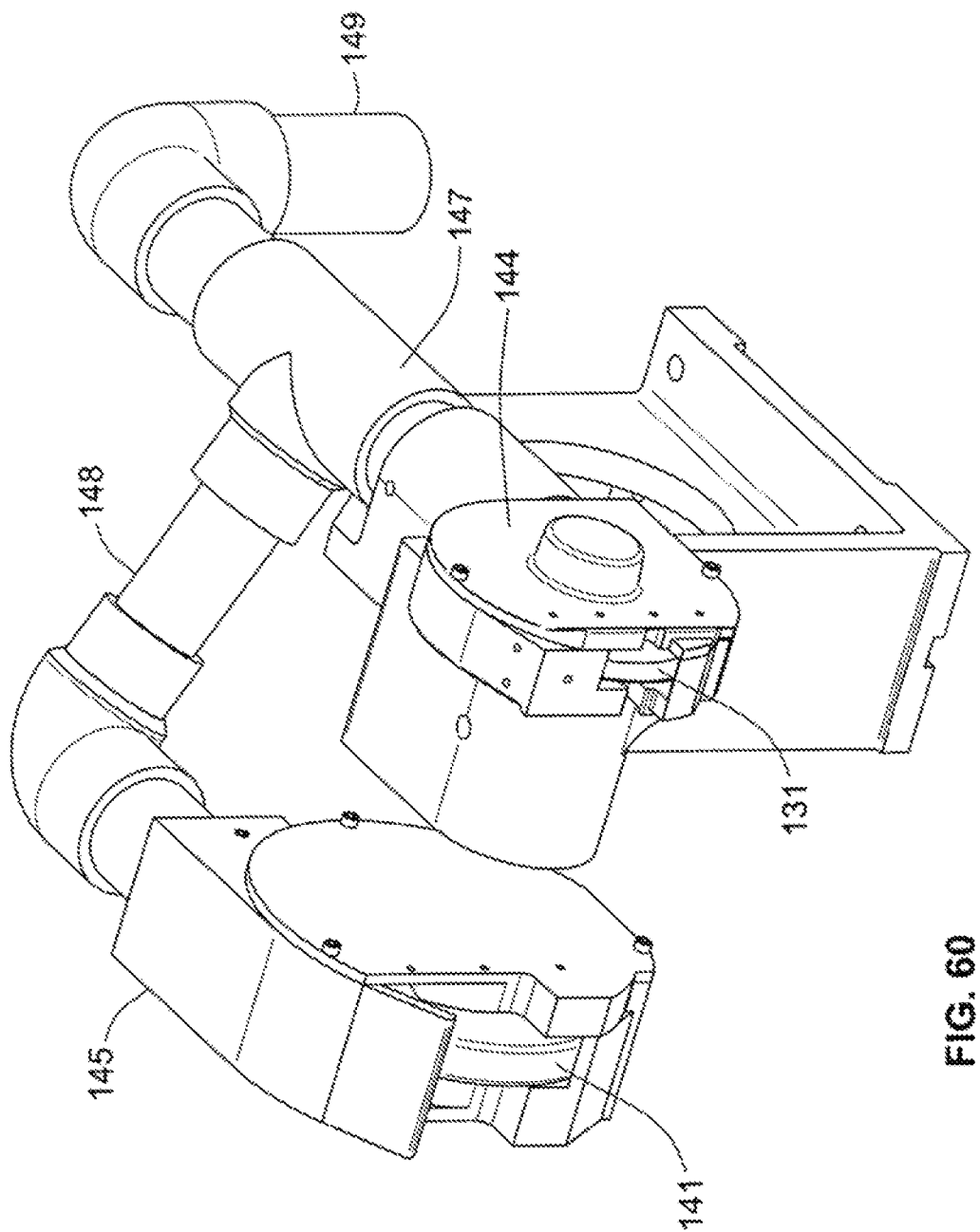
FIG. 60 is a perspective view of a vacuum system associated with the cutting and de-burring wheels in the key duplicating system.

Most of the key-cutting wheel 131 and the de-burring wheel 141 are enclosed in respective vacuum shrouds 144 and 145 coupled to a common vacuum source for removing debris caused by the cutting process. The two vacuum shrouds 144 and 145 are coupled to the common vacuum source by respective conduits 147 and 148, both of which join a single conduit 149 leading to the vacuum source. As can be seen in FIG. 60, the only parts of the cutting wheel 131 and de-burring wheel 141 that are not enclosed by the respective shrouds 144 and 145 are the segments of the wheel surfaces that engage the key blank to cut and de-burr the teeth of the duplicate key. In the illustrative embodiment, the cutting wheel 131 and the de-burring wheel 141 are mounted on two separate shafts 150 and 151. The axis of the de-burring-wheel shaft 151 is positioned slightly below the key blank, and the de-burring wheel shaft 151 is rotated in a direction opposite that of the cutting-wheel shaft 150 so that the tooth edges of the key blank that are first engaged by the de-burring wheel 141 are the edges last engaged by the cutting wheel 131, which are the edges that contain any burrs or other debris remaining from the cutting operation.

A small digital video camera, e.g., a webcam, is mounted in the interior of the kiosk for recording and transmitting video and photo images of different regions of the interior of the kiosk. These video images may be used for different purposes, such as troubleshooting a kiosk that has reported a malfunction such as an inability to complete a preselected number of customer-initiated transactions within a preselected time period, repairing detected malfunctions, monitoring the condition of parts that need periodic replacement such as cutting tools and cleaning brushes, monitoring the condition of items that require maintenance such as the vacuum system that accumulates the debris from the cutting and brushing operations, monitoring the numbers of different types of key blanks remaining in the key-blank magazines, etc. The video output of the digital video camera is coupled to the cell modem, for periodic transmission to the server 210 in the central office 204 and/or to a local service provider for a number of kiosks within a given geographic region. The video camera can also be remotely controlled for producing video images upon receipt of command signals from a remote computer such as the server 201. Video images from the camera can also be transmitted to the kiosk display, to replace or supplement the viewing window in the kiosk that allows customers to view the key-duplicating operations.

For example, if an error report is sent regarding malfunctioning sensors in the kiosk, the webcam allows a remote user to monitor the robot through the webcam and help determine which sensors are not working properly. The remote user can then remotely control the kiosk, or reset or re-initialize the kiosk if necessary. In addition to being able to monitor everything that is going on within the kiosk, the webcam can take high resolution photographs of a problematic area, which can then be further analyzed at a remote location to determine what mitigation steps need to be taken. For example, if the webcam shows that a key is jammed in the kiosk, that problem can be fixed by remotely commanding the kiosk to eject the jammed key.

Figure 61:
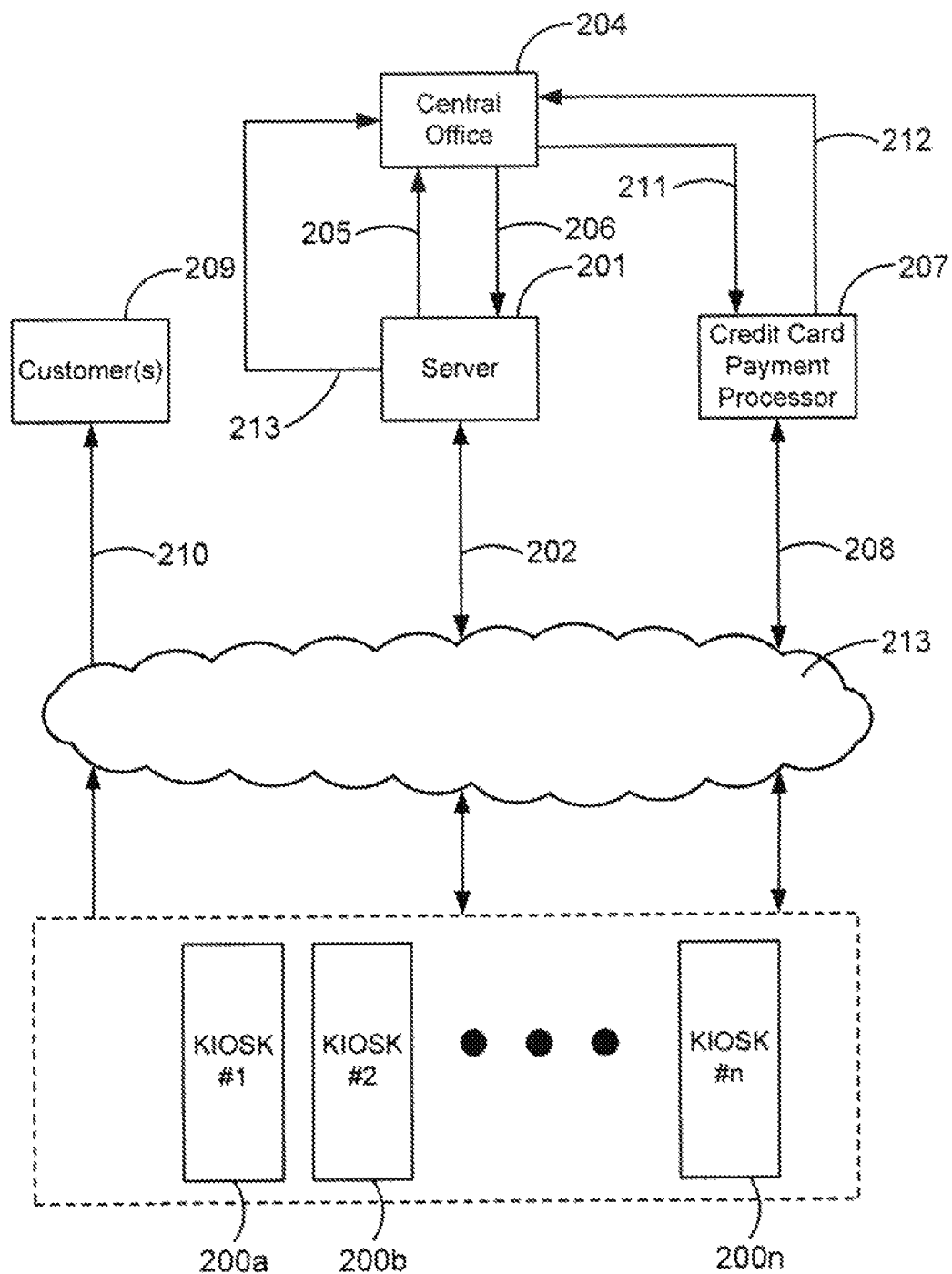
FIG. 61 is a functional block diagram of a kiosk network that includes a plurality of the kiosks of FIGS. 1 and 2 and an associated communication system connecting all the kiosks via the internet with a central office, a payment processor and an email server.

FIG. 61 is a diagram of a network of multiple interactive, key-duplicating kiosks 200a, 200b . . . 200n communicating with a remote server 201 via the communication interface 24b in each kiosk. The communication interface 24b in each kiosk connects that kiosk to a network 213 such as the Internet or a local network with Internet access. A computer system 204 in a remote central office has access via communication lines 205 and 206 to the server 201, which receives, stores and compiles data from all the kiosks 200a-200n and reports back to the central office computer system 204.

The kiosks 200a-200n communicate independently with a credit card payment processor 207 via communication line 208. The credit card payment processor 207 may also communicate with the central office 204 via lines 211 and 212. Upon reading customers' credit cards during the payment processes, the kiosks 200a-200n send the credit card data through a wireless connection to the processor 207, which checks to see if each card is authorized for the requested amount and reports the result to the kiosk. When a request for credit card payment reports is sent to the processor 207 from the central office via line 211, the payment processor 207 sends back the requested credit card payment notification via line 212.

The individual kiosks 200a-200n also communicate independently with individual customers 209 via communication line 210, such as when a kiosk sends an email receipt of a completed transaction to the customer at the email address supplied to the kiosk by that customer.

The server 201 maintains a list of all the kiosks available for remote access, and enables a connection to be made between the central office computer 204 and any kiosk linked to the server 201. This allows for close monitoring of the kiosks and provides the capability of remotely managing most issues that can arise with the kiosks 200a-200n. The kiosks periodically report order transaction information and error information to the server 201 via communication line 202. The order transaction information includes details of every completed transaction. The error information includes any technical, mechanical, electrical or other issues that a kiosk is experiencing, or has experienced. When the server 201 receives error information, it automatically sends an email notification regarding the errors to the central office 204. The server also maintains recorded information about each customer's keyway and key profile, allowing customers to later request a copy of their key to be mailed to them.

The processor 24 in each kiosk includes a "Remote Maintenance Tool" (RMT) program that produces displays of (1) the status of all the controllable devices and sensors within the kiosk, and (2) multiple commands that can be selected by an operator to energize or de-energize the controllable devices to permit remote manual control of those devices and their associated mechanisms. The Remote Management Tool (RMT) has several functions and uses, such as moving selected motors, solenoids and parts within the kiosk, testing systems and subsystems, viewing the signals from various sensors in the kiosk in real time, and commanding movement of specified motors incrementally or to bring them to specific defined positions. These tools, used together, and along with the live video, allows a remote expert to fix and/or troubleshoot issues efficiently and accurately. These extensive tools allow the remote expert to pinpoint the issue without visiting the complex kiosk. If the expert cannot fix the kiosk remotely, the expert can manage a field technician through the fix. The remote expert can upload photos and videos, send instructions to the kiosk, and walk the field technician through the fix, in real time using the various remote tools, webcam and on-screen commands. This allows a layman or a technician with little experience to fix an extremely complex kiosk.

Figure 62:
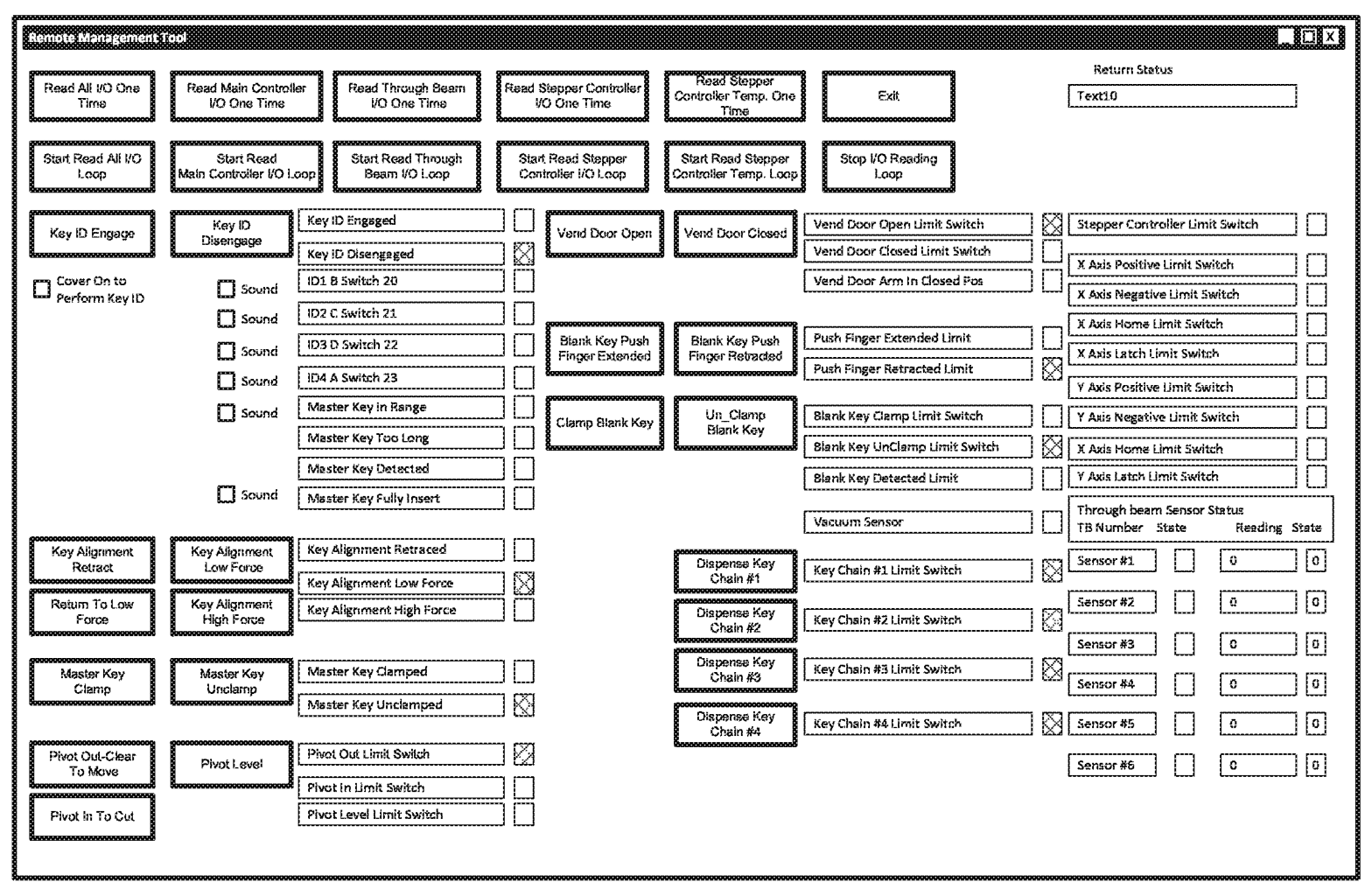
Figure 63:
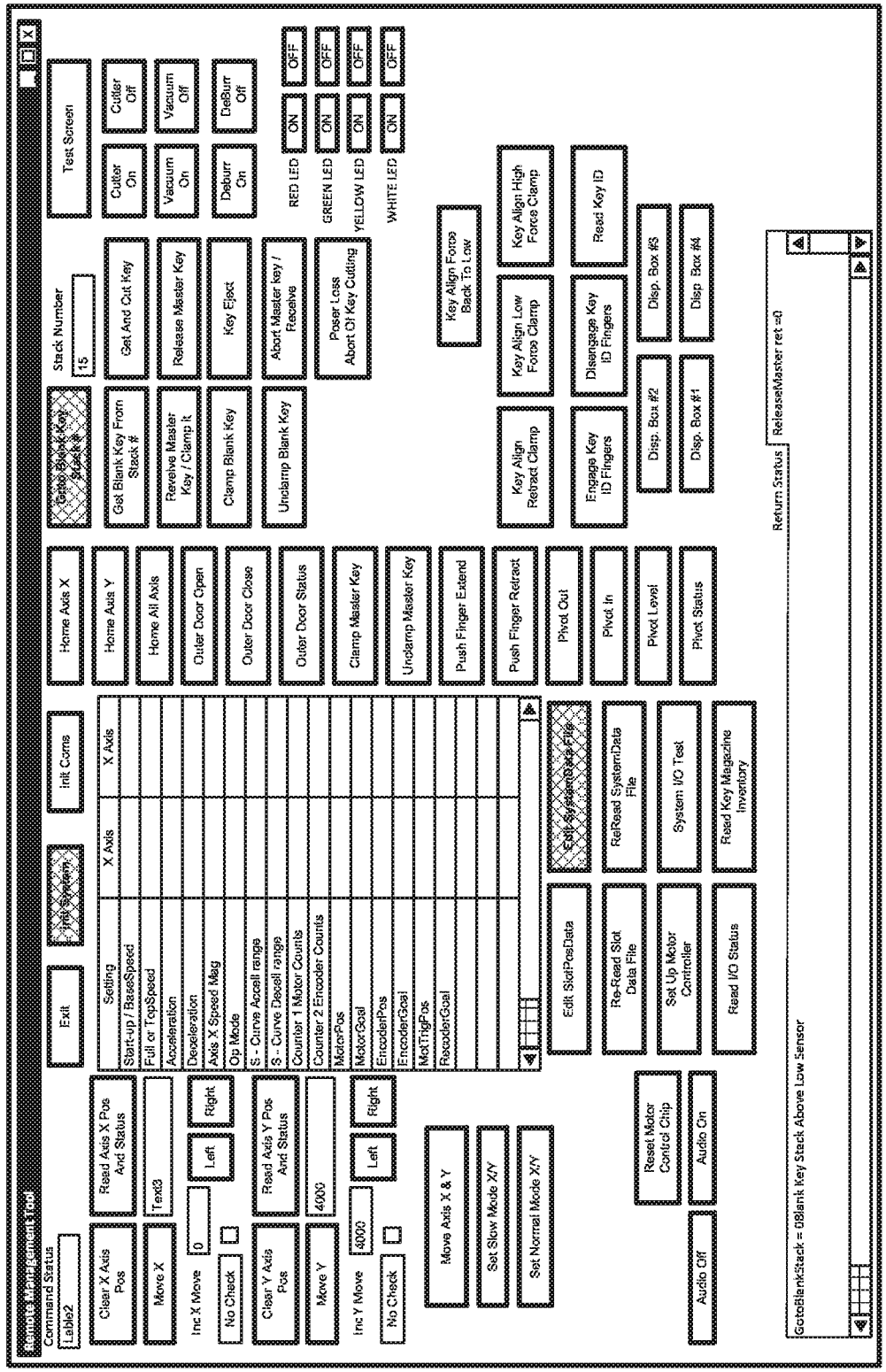
FIG. 63 is a second example of a Remote Management Tool display.

FIGS. 62 and 63 are screen shots of the two principal displays generated by the RMT. FIG. 62 is an example of the "I/O Test Form" display, which shows the status of all the sensors and controllable devices in the kiosk, and also includes command buttons that can be used for remote manual control of selected controllable devices in the kiosk. These buttons may take the form of touch-screen buttons, selected by touching the touch screen, or buttons to be selected by using a mouse to position a cursor over one of them and then clicking on it. The command buttons can be displayed simultaneously on the kiosk display and a remote display, but the kiosk processor is preferably programmed to disable the command buttons on the kiosk display when those buttons are being used remotely.

The key blank extractor is identified in the display in FIG. 62 as the "push finger," and the display shows whether it is in its advanced ("extended") position or its retracted position. In this example, the push finger is indicated to be in the retracted position. If neither of these position is indicated, that means the push finger is somewhere between the retracted and advanced positions. The two buttons labeled "Blank Key Push Finger Extended" and "Blank Key Push Finger Retracted," to the left of the position indicators for the push finger, can be used to energize the drive motor for the push finger to move it to its advanced or retracted position. For example, a kiosk may report that it failed in pushing a key blank from the magazine to the blank clamp (the blank is jammed). The remote expert logs in to that kiosk remotely and uses the RMT display in FIG. 62 to check the RETRACTED sensor and EXTENDED sensor positions for the extractor. The expert will find that it is either RETRACTED, EXTENDED or neither (in which case it is somewhere between the two positions). The remote expert can also check the sensor that indicates whether a key blank is detected in the blank clamp (another clue as to what is going on), and may look at the remote video to see whether the blank has been pushed partially out of the magazine. The remote expert may then choose to dislodge the jammed blank by "ramming it" with the extractor, by clicking (e.g., by use of a mouse at the central office computer) on the "Blank Key Push Finger Retract" button and then on the "Blank Key Push Finger Extend" button. Alternatively, the remote expert may choose to clamp a partially extracted blank (by clicking the "Clamp Blank Key" button), and then move the blank to the dump position for disposal (by clicking on the "MOVE Y 4000" button). Clicking on the "PIVOT IN" button brings the blank close to the discharge chute, and clicking on the UNCLAMP MASTER KEY button and then the KEY EJECT button dispenses the blank. The remote expert can watch all these operations, live, through the remote video camera.

The display in FIG. 63 includes command buttons for remote manual control of additional controllable devices in the kiosk. By clicking on the various buttons in this display in the remote central office, a remote operator can manually initiate individual movements of the various components and mechanisms in the kiosk, and can also control the energization and de-energization of components such as the indicator lights on the front panel of the kiosk, the vacuum source, the motors, etc. For example, the "Cutter On" and "Cutter Off" buttons in the upper right corner are used to turn the cutting wheel on and off. The upper left side of the display in FIG. 63 can be used to command selected motors to specified positions, or to move specified distances, along either a vertical ("X") axis or a horizontal ("Y") axis. For example, the motor that drives the key blank magazine can be commanded to move to any of its 16 positions along its X axis to bring any of its 16 vertical channels into alignment with the extractor mechanism. Buttons are also provided to select different speeds of movement. For any selected motor, the values of a number of different, parameters listed in the "Setting" column, are displayed for the commanded movement of that motor, in either the "X axis" column or the "Y axis" column.

Figure 64:
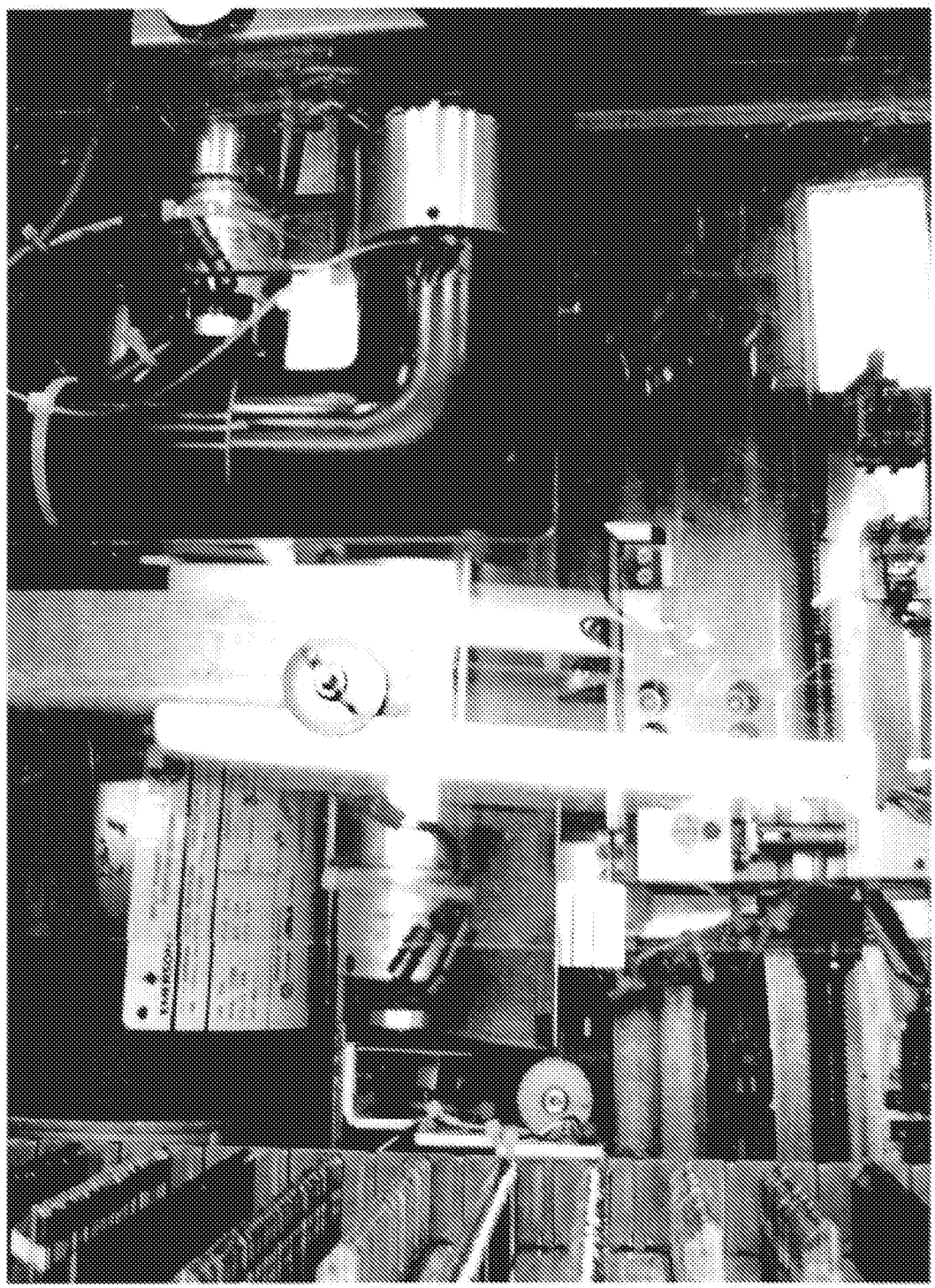
FIG. 64 is an example of an image produced by the video camera inside the FIG. 65 is a diagrammatic illustration of a key duplicating network having a central server in communication with multiple customer interfaces of different types, and coupled to multiple databases and running multiple programs.

FIG. 64 is an example of an image transmitted to the remote server 201 from the video camera in a kiosk, in this case showing a top view of the front side of the key blank magazine and the adjacent mechanism for receiving an extracted blank. The video image (FIG. 64) can be displayed side-by-side with the display of FIGS. 62 and/or 63 (either on the same display device or two different devices) at a site remote from the kiosk being inspected, while the operator examines and manipulates the mechanisms within the kiosk. Thus, the operator can observe the operations resulting from his or her manual commands, as well as the results of those operations. This process can often fix the problem being addressed, and, if not, can identify the specific task that needs to be performed by a visit to the kiosk in question. Consequently, the kiosk can be fixed on site by inexperienced personnel, e.g., the same personnel who replenish the supply of key blanks, because the central office personnel can tell the field personnel exactly what needs to be done and what repair parts will be needed.

Examples of information automatically reported by each kiosk 200a-200n to the remote server 201 are "invalid keyways" detected on master keys (which means such keys cannot be duplicated in the kiosks), the insertion of master keys that are too long or too short to be duplicated in the kiosks, detected misalignment of a master key after clamping, credit card rejections, insertions of credit cards that could not be read, etc. All this data is analyzed, either in the server 201 or in the central office computer, and reports of the results of these analyses are generated and either distributed automatically or stored for periodic reviews by authorized personnel. For example, one type of report compares the data collected from any given kiosk with the same type of data from other kiosks in a similar market or geographical region, or even all the other kiosks in the network. Another type of report compares the latest data from a given kiosk with the historical averages of the same types of data from that same kiosk, so that deviations from chronological trends can be detected and analyzed, and alerts can be generated if the current data falls outside an acceptable range.

For example, if a problem develops with the keyway identification system in a given kiosk, causing that kiosk to generate false rejections, the average percentage of master keys, and thus customers, that are rejected will increase for that kiosk. This increase will appear in the "health" reports for that kiosk, which can then be inspected, virtually and/or physically.

The kiosks 200a-200n also conduct self tests and report the results to the remote server 201. For example, after each order, readings are taken from all the sensors and compared to predetermined thresholds or ranges representing normal operation of each sensor. If the reading taken from any sensor deviates from the predetermined threshold or range, that sensor may not be functioning, not functioning properly, or even have a design flaw. Such a reading may also be indicative of malfunctioning hardware associated with that sensor. Regular reporting of the results of the automatic self tests enable early detection and correction of such issues, thereby reducing the down time for all the networked kiosks.

Another example of a self-test is the automatic cycling of moving parts in the kiosk at predetermined times to determine whether those parts successfully move to known positions within a specified time intervals. These self tests can indicate whether a specific motor is moving, whether a specific part is moving, whether specific movements occur within the specified time intervals, whether specific sensors are functional, etc. If any of the preselected criteria are not met in these self tests, the kiosk automatically sends an alert to the remote server so that the part in question can be quickly inspected and corrective action taken.

After an error has been corrected, a remote user in the central office may virtually run a test sequence to confirm that the problem has indeed been rectified. The server also allows troubleshooting of software-related issues, and can be used to update the software in the kiosks. Promotions and advertisements the customer sees on the kiosk display screen can also be updated and controlled via the server 201.

Other communications sent by the kiosks to the server 201 include daily sales and transaction reports which contain a compilation of sales and transaction data, including the total number of transactions and the corresponding dollar amount, for the day. These reports also help maintain the key blank inventory. If a key blank magazine, or certain compartments of a magazine, are reported as being depleted or low on stock, the webcam may be used to confirm the stock level and updates can then be made accordingly. The central server 201 can also monitor and correlate data from each kiosk with data from other sources, such as reports from the facilities in which the kiosks are located and historical records maintained for each kiosk. For example, returns of duplicate keys made by the kiosks are handled by customer calls to a toll-free number, and the server 201 maintains a rate-of-return record for each individual kiosk and for different groups of kiosks, e.g., by retail organization and/or by geographical region. An increase in the rate-of-return for a particular kiosk by more than a certain amount above the average for all kiosks indicates that a problem might exist for that particular kiosk and, therefore, it should be inspected. Another example is comparing the rate of rejection of customers, based on the insertion of keys having unsupported keyways, by a particular kiosk compared with other kiosks located in similar markets or stores. The maintenance record of each kiosk may also be periodically compared with other kiosks of similar age and usage rates. The results of these and other analyses can be used to identify issues before they become serious and before they have a significant effect on sales and/or relationships with store personnel.

A "log file" is preferably maintained for the entire history of each individual kiosk, and this historical log file may be consulted at any time to determine whether the kiosk has a history of experiencing a particular problem. For example, if a given kiosk experiences master key alignment problems, the remote operator may check the log file for that kiosk to determine whether it has a history of master key alignment problems and, if it does, to arrange for corrective action to be taken.

Kiosks of the type described above are capable of providing return rates of less than 1%, and the time required to produce a single duplicate of a master key is less than about 70 seconds. The remote communication system permits these and other performance parameters to be continuously monitored, so that any deviation can be promptly detected, and corrective actions can also be taken promptly. Mis-cut returns for each kiosk can be monitored in near real time by matching the customer making a return to the time, date and location of the kiosk used to make the returned key, and building a mis-cut timeline for each kiosk. Field personnel can also be provided with special master keys that are used to make duplicate keys that are returned to the central office for measurement and analysis for any corrective action that might be needed.

The remote communication system can minimize down time for all deployed kiosks by monitoring alert signals generated automatically by each kiosk when a questionable condition is detected. These signals can be investigated immediately by central office personnel who can take the necessary corrective action to ensure that a kiosk that sent an alert does not go down, or to promptly restore that kiosk to normal operation. This central-office monitoring and remote fixing reduces reaction time and also provides more consistent and accurate maintenance by field personnel with more limited experience on many issues that arise in maintaining a kiosk, as compared with highly trained personnel in the central office. Central remote fixing allows experts located at the central office to obtain a large amount of detailed information about any given kiosk in a large network, and to use the webcam to quickly identify a problem while a field technician is dispatched to the machine. When the technician arrives on scene, the central office can send visual and audio demonstrations to the kiosk display to remotely guide the technician in efficiently resolving the problem. Central monitoring is also more effective in dealing with a problem, such as a bad lot of key blanks, that originates from a single source but results in problems distributed over a number of different kiosks.

If an alert signal relates to a problem caused by the customer, a dialog can be initiated between the customer and an operator at the remote central computer. This dialog is initiated by displaying a message from the remote computer in a chat box on the display of the kiosk, along with a virtual keyboard so that the customer can respond. For example, if a customer neglects to remove his or her key from the kiosk after a transaction has been completed, an alert is sent to the central office computer at the expiration of a preselected time interval following the dispensing of a duplicate key. An operator at the central office can then cause the chat box to be displayed on the kiosk screen and send the customer a message asking if there is a problem in removing the customer's key from the kiosk. The customer can respond using the virtual keyboard displayed on the kiosk below the chat box, and the ensuing exchange of messages can result in removal of the customer's key from the kiosk.

Figure 65:
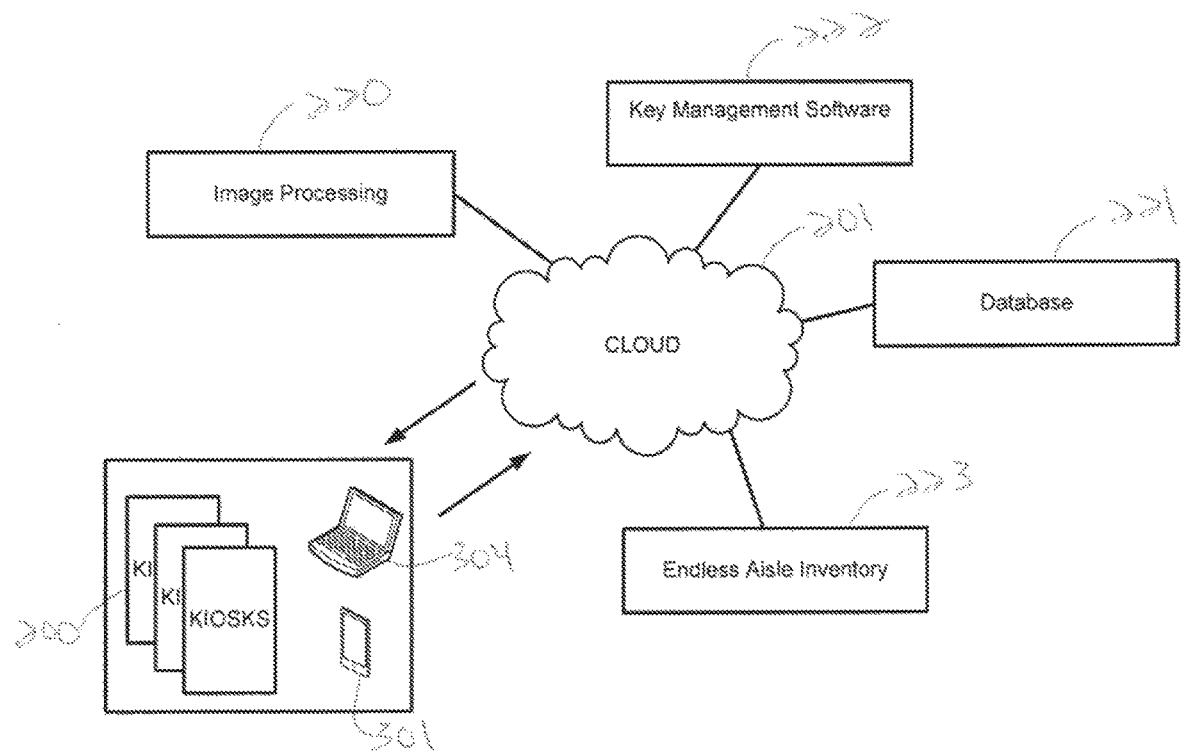

In FIG. 65, the remote central server 201, which is depicted as part of as part of the "cloud," communicates with customer interface devices that include not only the kiosks 200 but also customers' mobile devices (e.g., smart phones 301, tablets 302, laptop computers 303 etc.) and personal computers 304. For example, digital cameras in customers' smart phones may be used to take digital photographs (digital images) of master keys and send those images to the remote central computer 201, where known image processing algorithms 220 can be used to identify a master key from received digital images. One such algorithm is described in "Reconsidering Physical Key Secrecy: Teleduplication via Optical Decoding," Laxton et al., Vision.ucsd.edu/-blaxto/sneakey.html. As described in more detail below, the remote server 201 utilizes databases 221, key management software, and "Endless Aisle" inventory to communicate with the customer interface devices, to receive and process orders, and to manage the fabrication and delivery of ordered duplicate keys.

Figure 66:
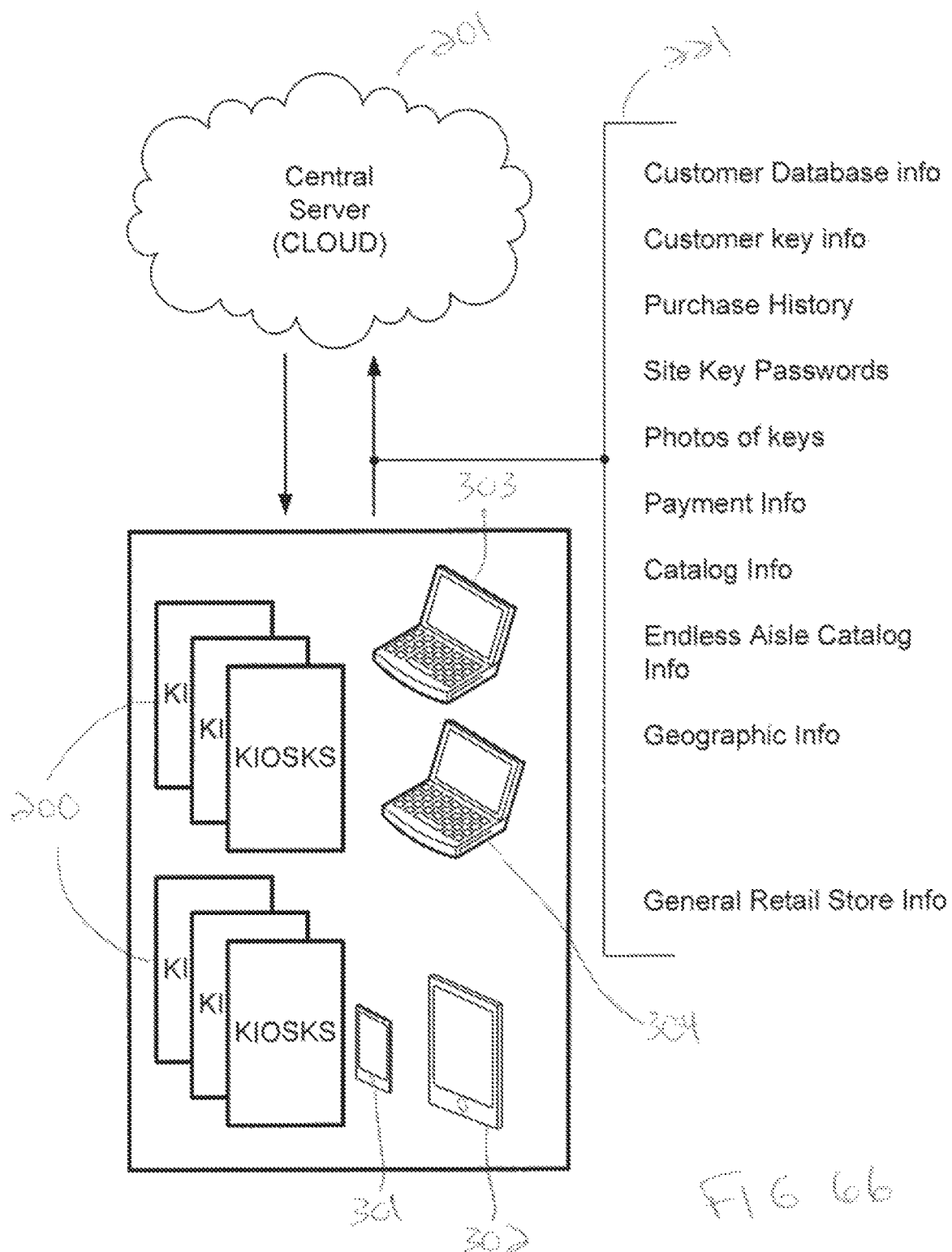
FIG. 66 is a diagrammatic illustration of the system of FIG. 65 with a more detailed depiction of the multiple databases.

FIG. 66 depicts exemplary databases 221, which include:
1. Customer information such as names and addresses.
2. Customers' key information, such the customers' names for identified keys that have been or will be duplicated.
3. Purchasing history of each customer, including the number of keys purchased and the dates, locations of the purchases and how the purchases were made.
4. Passwords for accessing the server and for accessing an accessing customer's key information.
5. Digital images of keys received from customers that requested storage of those images for future use.
6. Customer payment information, such as mode of payment used.
7. Kiosk catalog information, including the current inventory of key blanks and designs in each individual kiosk.
8. "Endless Aisle" catalog information.
9. Geographic information regarding kiosk locations.
10. Error information regarding kiosks.
11. Store information regarding kiosks.

Figure 67:
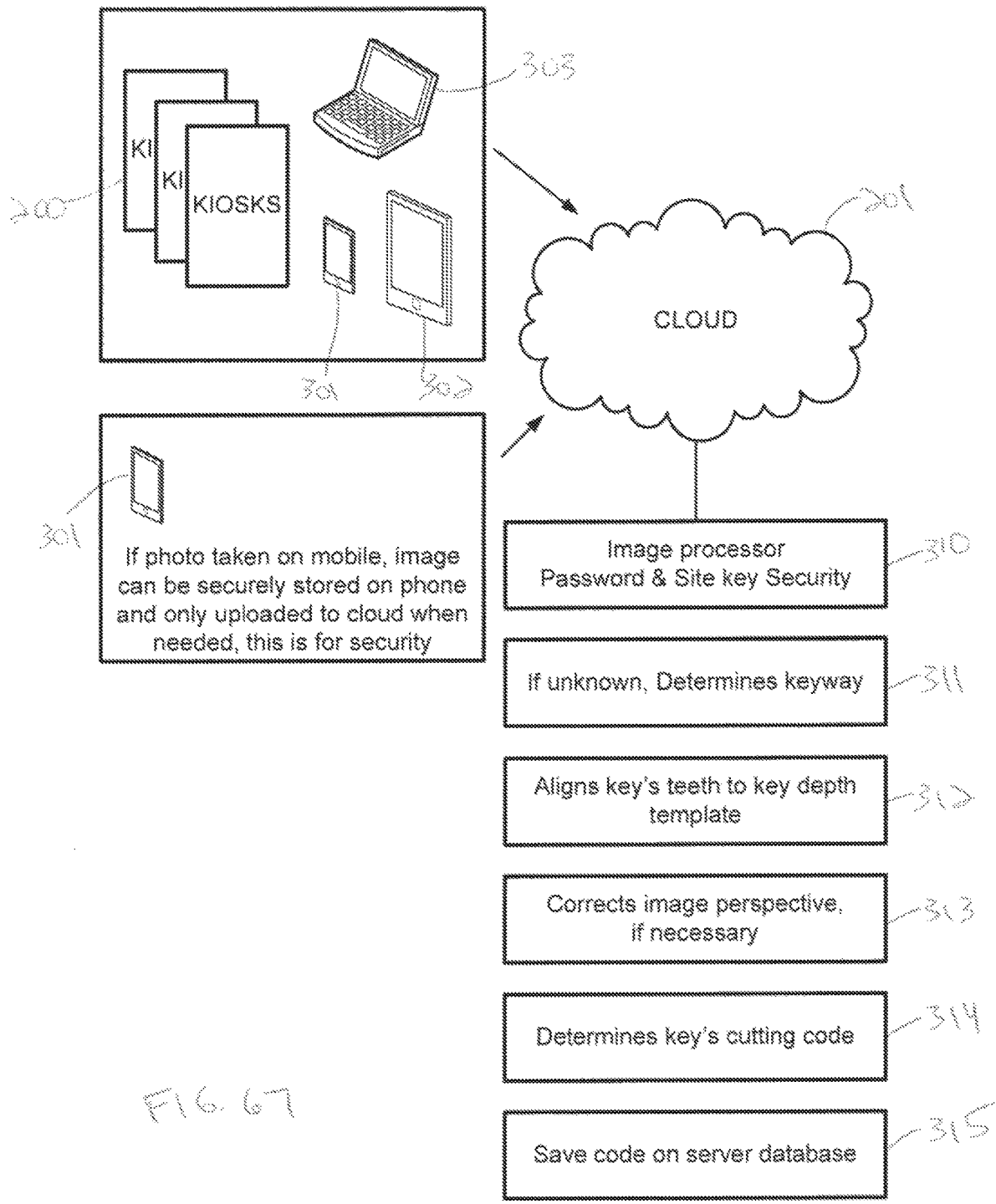
FIG. 67 is a diagrammatic illustration of the system of FIG. 65 used to analyze digital images of a master key to be duplicated.

FIG. 67 depicts an example where digital images (digital photographs) of a customer's master key are taken by the digital camera in the customer's smart phone 301 and transmitted to the remote server 201 directly from the smart phone. The smart phone 301 includes a controller coupled to its display and digital camera, and an image extraction component. The image extraction component can be a software or functional component of an "app" as they are colloquially referred, or more specifically, a mobile software application executed by the controller of the smart phone 301. The app produces one or more displays on the smart phone to inform the user exactly how to take the required photographs of the key, i.e., from which side(s) of the key, the preferred distance between the camera and the key, the preferred background and lighting, etc., and how to transmit the resulting digital images. The types of images required may vary with the particular algorithm to be used by the remote central server to analyze the digital images to derive the information required to make a duplicate of the imaged key, such as the type of key blank to be used and the cutting code for cutting teeth in the blade of the key blank. The app may also display a form to be used to order one or more duplicate keys and to specify or select a particular design, or the app may simply connect the smart phone to a web site hosted by the remote central server for processing orders.

The customer has the option of requesting that the digital images and/or the information derived from those images be saved or deleted by the remote server after they have been used to make the ordered duplicate key(s). If the customer requests that the images and/or the derived information be deleted, e.g., for security reasons, then the images can be saved on the customer's own computer, or on the smart phone, for possible future use, when the customer would need to transmit them to the remote server again. The customer also has the option of requesting that the information derived from the images be transmitted to the customer for saving, before it is deleted by the central server.

At the remote server, the digital images are assigned a password at step 310 and then processed to determine the type of keyway at step 311, which is information needed to select the proper type of key blank. At step 312, the key's teeth are aligned with a key depth template at step 312, and then the image perspective is corrected, if necessary, at step 313. The key's cutting code is then determined at step 314, and that code is then stored at step 315 for use in producing a duplicate key.

Figure 68:
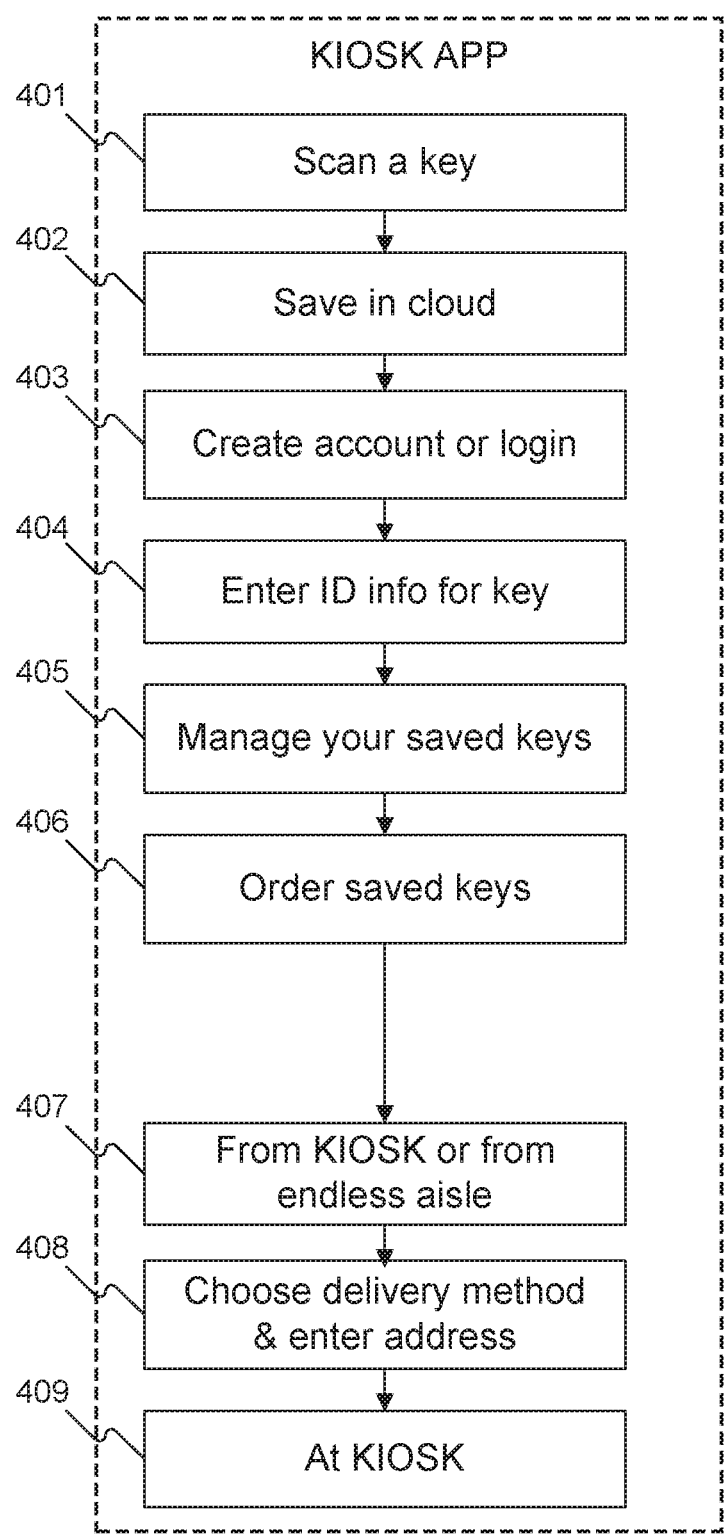
FIG. 68 is a flow chart of a program executed by the processor in a kiosk in the system of FIG. 65 after a master key has been inserted in the kiosk by a customer.

FIG. 68 depicts an example where digital images (digital photographs) of a customer's master key are taken by a digital camera in a kiosk 200 at step 401 and transmitted to the remote server 201 from the kiosk. The digital images may be stored by the remote server 201, or the server may save only the keyway type and cutting code derived from the digital images. At step 403, the kiosk displays a login screen for the customer to log in to the remote server, or create an account if it is a first-time customer. Again, the customer is given option of requesting that the digital images be saved or deleted by the remote server after they have been used to make the ordered duplicate key(s). The login screen also permits the customer to enter a personal identification of the key at step 404, such as "garage door," and also to manage the stored information for all of his or her keys at step 405, e.g., by changing key identifiers, arranging keys in groups, deleting obsolete keys, etc. The kiosk then displays an order screen at step 406, enabling the customer to order a selected number of duplicates of the key that was just imaged and/or keys for which information was previously saved. At step 407, the customer may elect to order key duplicate(s) from the kiosk, if the inventory of key blanks in that particular kiosk includes the proper type of key blank and the particular design (if any) selected by the customer, or from the virtual store described above. At step 408 the customer selects a delivery method and enters an address to which the ordered duplicate key(s) are to be delivered, if ordered from the virtual store. If the duplicate key(s) are ordered from the kiosk they are delivered to the customer via the discharge chute in the kiosk.

The remote central server 201 maintains a number of different databases, as depicted in FIGS. 65 and 66. One of these databases that can be made available to any customer interface device is the "Endless Aisle Catalog Info" database, which includes images of a large number of different types of key blanks available for purchase, and an even larger number of available designs that can be printed on any key blank. In addition, customized designs may be offered to customers, e.g., a customer can send an image or description of a preferred design, such as mixed pink and purple crescents on a light blue background, and the server forwards that design to a key fabricating module to produce the required duplicate key imprinted with that design. The key fabricating module may be located anywhere in the world, as long as it can communicate with the central server via the Internet or other communication network. The duplicated keys with selected or customized designs are mailed or shipped to the customers, and confirmed via emails or other communications sent to the customers directly from the fabricating module or via the remote central server. Alternatively, customized keys may be printed in kiosks that have key-duplicating capabilities plus a color printer adapted to print designs on duplicate keys that are cut in the kiosks.

A network system that includes both the remote central server and the remote key fabricating module (which may be at the same location or different locations) permits the kiosks, and the servicing of the kiosks, to be simplified. For example, the kiosks may contain only a couple of types of key blanks (e.g., without any stylized versions), for duplicating only the most common types of keys, along with the capability of offering the customer the option and opportunity to view and order a duplicate key from an unlimited variety of different styles and designs via the remote server and remote key fabricating module. Each kiosk can display menus of all the different styles and designs available for duplicates keys to be ordered by the customers, as well as color images of the actual keys to help the customers select the key or keys most attractive to them. The order can be placed instantly via the kiosk communicating with the remote central server, and the ordered key(s) can be fabricated immediately and shipped to the customer, for next-day delivery if selected by the customer.

The central server has the capability of storing any information it receives for making duplicate keys, including both keys made in the kiosks and keys made in the remote key duplicating module. The stored information is correlated with information identifying the respective customers from which the information was obtained, so that it can be retrieved to make additional duplicate keys for the same customer that originally provided the stored information. Each time the system receives such information from a customer, the customer is given the option of requesting that the information provided for making a duplicate key be deleted after use, i.e., not stored. When the information is stored, it is preferably encrypted and can be accessed only when the ordering customer provides a password or other identification provided when the customer's account was set up.

The remote central server may include a "website," i.e., a known Internet-accessible computer system that provides content provided by a website creator and operator. This content is made available to Internet users via known computer programs called "browsers" that run on a user's computer such as a laptop computer, a desktop computer, a tablet computer, a smart phone, a personal digital assistant (PDA) and the like. The websites may provide many different forms of content to users such as textual information, images, videos, audio and sounds, and the like.

The website preferably contains components such as a header, a footer, a body, columns of textual information, sidebars, image carousels and other types of components. These components in some cases are called "content containers" or "content items," because they serve as distinct regions in a website for holding and displaying specific types of content, which is sometimes dynamically updated by a computer system associated with the website. The website may be hosted on the remote central server using a web hosting service, sometimes referred to as "in the cloud." The "cloud" typically refers to the practice of using one or more remote servers hosted on a public access network such as the Internet to store, manage and process data, rather than the user's local system. Cloud computing is used to invoke computing resources that are delivered as a service over a network. In the case of website hosting, the remote server may be accessed by users via an Internet connection, and the server may be operated by a third party separately from the website's creator, owner or operator.

The website operates like an e-commerce virtual store, but there is no need for an inventory of each displayed type of key blank pre-printed with each displayed design, because any order placed by a customer via the website can be quickly printed and/or cut for immediate shipment to the customer. An inventory of the most popular key blanks pre-printed with the most popular designs may be maintained, but any order key blank can be quickly cut to duplicate the customer's master key and printed with the design ordered by the customer, in a few minutes. Thus, a large variety of different types of key blanks, printed with any of an even larger variety of different designs, and even customized designs, can be offered to a customer shopping in the virtual store.

When a customer accesses the virtual-store website, a welcoming screen identifies the different types of key blanks available for purchase, and identifies different categories of available designs, such as logos of sports teams, floral patterns, geometric patterns, animals, birds, etc. This may be the information and images contained in the "Endless Aisle Catalog Info" database discussed above. The customer may select any of the identified types of key blank types and designs by simply clicking on them to place them in the customer's "shopping cart." Payment may be made by any of the known techniques used in Internet shopping, such as by credit or debit card, PayPal, etc.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, the master key inserted by the customer could be analyzed and matched to an original code that is then used to control the cutting of the duplicate key(s), rather than using the master key as a real-time pattern for cutting the duplicate. In this case, the remote communication system could be used to pre-order the cutting of a duplicate key using a code identified by the customer. Another alternative is to add a printing station to create different styles of keys in the key, to avoid the need to store different styles of blanks for the same type.

It is claimed:

1. A network of self-service key duplication kiosks, comprising:
   a plurality of kiosks at different locations; and
   a remote central server in network communication with the plurality of kiosks and configured to receive information from and send information to the plurality of kiosks,
   each of the plurality of kiosks comprising,
      a digital camera configured to take a digital image of a customer's key,
      a key duplication system configured to replicate a tooth pattern on the customer's key using a cutting code, and
      a communications interface configured to enable network communication with the remote central server for sending the digital image of the customer's key to the remote central server and, in response, receive the cutting code for the customer's key from the remote central server,
   the remote central server configured to receive the digital image from a kiosk, identify the cutting code from the digital image, and send the cutting code to the kiosk for use in duplicating the customer's key.

2. The network of claim 1, wherein each of the plurality of kiosks further comprises:
   a customer interface configured to receive payment from a customer for the purchase of a duplicate of the customer's key,
   a key blank magazine configured to store key blanks, and
   a key blank extraction system configured to extract a key blank from the key blank magazine,
   wherein the extracted key blank is used by the key duplication system to duplicate the customer's key.

3. The network of claim 2, wherein each of the plurality of kiosks further comprises:
   a key analysis system configured to analyze the blade of the customer's key to determine a key type for the customer's key,
   wherein the key type is used to select the key blank from the key blank magazine.

4. The network of claim 1, wherein the remote central server is further configured to maintain information regarding the customer's key, including at least the cutting code, for subsequent retrieval by the customer from one of the plurality of kiosks.

5. The network of claim 1, wherein each of the plurality of kiosks are configured to send information to the remote central server, including:
   (a) information regarding purchases made and attempted at a kiosk,
   (b) information regarding key blanks contained in the kiosk, and
   (c) alert signals generated in response to operations conducted by the kiosk.

6. A self-service key duplication kiosk in a network that includes a plurality of kiosks at different locations and a remote central server in network communication with the plurality of kiosks, comprising:
   a digital camera configured to take a digital image of a customer's key,
   a key duplication system configured to replicate a tooth pattern on the customer's key using a cutting code, and
   a communications interface configured to enable network communication with the remote central server for sending the digital image of the customer's key to the remote central from server and, in response, receive the cutting code for the customer's key from the remote central server.

7. The self-service key duplication kiosk of claim 6, wherein the remote central server is configured to receive the digital image from a kiosk, identify the cutting code from the digital image, and send the cutting code to the kiosk for use in duplicating the customer's key.

8. The self-service key duplication kiosk of claim 6, further comprising
   a customer interface configured to receive payment from a customer for the purchase of a duplicate of the customer's key,
   a key blank magazine configured to store key blanks, and
   a key blank extraction system configured to extract a key blank from the key blank magazine,
   wherein the extracted key blank is used by the key duplication system to duplicate the customer's key.

9. The self-service key duplication kiosk of claim 8, further comprising:
a key analysis system configured to analyze the blade of the customer's key to determine a key type for the customer's key,
wherein the key type is used to select the key blank from the key blank magazine.

10. The self-service key duplication kiosk of claim 6, wherein the remote central server is configured to maintain information regarding the customer's key, including at least the cutting code, for subsequent retrieval by the customer from one of the plurality of kiosks.

11. The self-service key duplication kiosk of claim 6, wherein the kiosk is configured to send information to the remote central server, including:
(a) information regarding purchases made and attempted at a kiosk,
(b) information regarding key blanks contained in the kiosk, and
(c) alert signals generated in response to operations conducted by the kiosk.

12. A method of duplicating a customer's key, comprising:
receiving the customer's key in a self-service key duplication kiosk, the self-service key duplication kiosk being one of a plurality of kiosks at different locations and in network communication with a remote central server;
taking, using a digital camera in the self-service key duplication kiosk, a digital image of the customer's key;
sending the digital image from the self-service key duplication kiosk to the remote central server for determination of a cutting code for the customer's key;
receiving, at the self-service key duplication kiosk, the cutting code from the remote central server, wherein the cutting code is determined by the remote central server based on the digital image; and
automatically producing, by the self-service key duplication kiosk, a duplicate of the customer's key using the cutting code.

13. The method of claim 12, further comprising:
determining, by the self-service key duplication kiosk a key type for the customer's key based on an analysis of a blade of the customer's key,
selecting, by the self-service key duplication kiosk, a key blank for using in producing the duplicate of the customer's key, wherein the key blank is selected from a plurality of types of key blanks based on the key type of the customer's key.

14. The method of claim 12, further comprising:
maintaining information at the remote central server regarding the customer's key, including at least the cutting code; and
retrieving the information from the remote central server from one of the plurality of kiosks for use in producing an additional duplicate of the customer's key.

* * * * *

UNITED STATES PATENT AND TRADEMARK OFFICE
CERTIFICATE OF CORRECTION

PATENT NO. : 10,482,439 B2
APPLICATION NO. : 15/885366
DATED : November 19, 2019
INVENTOR(S) : Daniel Freeman Page 1 of 1

It is certified that error appears in the above-identified patent and that said Letters Patent is hereby corrected as shown below:

In the Claims

Claim 6, Column 28, Lines 48-49, "to the remote central from server" should read --to the remote central server--.

Signed and Sealed this
Thirty-first Day of March, 2020

Andrei Iancu
*Director of the United States Patent and Trademark Office*